US008214387B2

(12) United States Patent
King et al.

(10) Patent No.: US 8,214,387 B2
(45) Date of Patent: Jul. 3, 2012

(54) DOCUMENT ENHANCEMENT SYSTEM AND METHOD

(75) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 639 days.

(21) Appl. No.: 11/097,089

(22) Filed: Apr. 1, 2005

(65) Prior Publication Data

US 2006/0041590 A1 Feb. 23, 2006

Related U.S. Application Data

(63) Continuation-in-part of application No. 11/004,637, filed on Dec. 3, 2004, now Pat. No. 7,707,039.

(Continued)

(51) Int. Cl.
*G06F 17/30* (2006.01)

(52) U.S. Cl. ........ 707/770; 707/706; 707/713; 707/722; 707/736; 707/769; 707/758; 235/454; 235/375; 235/435; 235/494; 358/448; 358/452; 358/453; 382/305; 382/209

(58) Field of Classification Search .................. 707/102, 707/706, 713, 722, 736, 758, 769, 770, 999.003, 707/999.004, 999.005, 999.006; 715/700; 235/454, 375, 435, 494; 358/448, 452, 453; 382/305, 209
See application file for complete search history.

(56) References Cited

U.S. PATENT DOCUMENTS 3,899,687 A 8/1975 Jones
(Continued)

FOREIGN PATENT DOCUMENTS

EP 0424803 5/1991
(Continued)

OTHER PUBLICATIONS

"Automatic Computer Translation," www.lingolex.com/translationsoftware.htm, downloaded on Aug. 6, 2000.
Babylon—Online Dictionary and Translation Software, "Text Translations in 75 languages, all in a single click," 1997, 1 page.
Black et al., "The Festival Speech Synthesis System," Festival Speech Synthesis System—Table of Contents, http://www.cstr.ed.ac.uk/projects/festival manual/, Jun. 17, 1999, pp. 1-4 [internet accessed on Jan. 10, 2008].
eBooks, eBooks Quickstart Guide, nl-487, 2001, 2 pages.
Gildea and Miller, "How Children Learn Words," Scientific American, Sep. 1987, vol. 257, No. 3, pp. 94-99.
Globalink, Inc. "Globalink, Inc. announces Talk to Me, an interactive language learning software program," Talk to me Software, Business Wire, Jan. 21, 1997, Fairfax, VA, 4 pages [internet accessed on Jan. 4, 2008].

(Continued)

*Primary Examiner* — Syling Yen
(74) *Attorney, Agent, or Firm* — McDonnell Boehnen Hulbert & Berghoff LLP

(57) ABSTRACT

A system, apparatus and method for enhancing documents, including using a graphical capture device, are described herein.

12 Claims, 17 Drawing Sheets

Related U.S. Application Data

(60) Provisional application No. 60/559,226, filed on Apr. 1, 2004, provisional application No. 60/558,893, filed on Apr. 1, 2004, provisional application No. 60/558,968, filed on Apr. 1, 2004, provisional application No. 60/558,867, filed on Apr. 1, 2004, provisional application No. 60/559,278, filed on Apr. 1, 2004, provisional application No. 60/559,279, filed on Apr. 1, 2004, provisional application No. 60/559,265, filed on Apr. 1, 2004, provisional application No. 60/559,277, filed on Apr. 1, 2004, provisional application No. 60/558,969, filed on Apr. 1, 2004, provisional application No. 60/558,892, filed on Apr. 1, 2004, provisional application No. 60/558,760, filed on Apr. 1, 2004, provisional application No. 60/558,717, filed on Apr. 1, 2004, provisional application No. 60/558,499, filed on Apr. 1, 2004, provisional application No. 60/558,370, filed on Apr. 1, 2004, provisional application No. 60/558,789, filed on Apr. 1, 2004, provisional application No. 60/558,791, filed on Apr. 1, 2004, provisional application No. 60/558,527, filed on Apr. 1, 2004, provisional application No. 60/559,125, filed on Apr. 2, 2004, provisional application No. 60/558,909, filed on Apr. 2, 2004, provisional application No. 60/559,033, filed on Apr. 2, 2004, provisional application No. 60/559,127, filed on Apr. 2, 2004, provisional application No. 60/559,087, filed on Apr. 2, 2004, provisional application No. 60/559,131, filed on Apr. 2, 2004, provisional application No. 60/559,766, filed on Apr. 6, 2004, provisional application No. 60/561,768, filed on Apr. 12, 2004, provisional application No. 60/563,520, filed on Apr. 19, 2004, provisional application No. 60/563,485, filed on Apr. 19, 2004, provisional application No. 60/564,688, filed on Apr. 23, 2004, provisional application No. 60/564,846, filed on Apr. 23, 2004, provisional application No. 60/566,667, filed on Apr. 30, 2004, provisional application No. 60/571,381, filed on May 14, 2004, provisional application No. 60/571,560, filed on May 14, 2004, provisional application No. 60/571,715, filed on May 17, 2004, provisional application No. 60/589,203, filed on Jul. 19, 2004, provisional application No. 60/589,201, filed on Jul. 19, 2004, provisional application No. 60/589,202, filed on Jul. 19, 2004, provisional application No. 60/598,821, filed on Aug. 2, 2004, provisional application No. 60/602,956, filed on Aug. 18, 2004, provisional application No. 60/602,925, filed on Aug. 18, 2004, provisional application No. 60/602,947, filed on Aug. 18, 2004, provisional application No. 60/602,897, filed on Aug. 18, 2004, provisional application No. 60/602,896, filed on Aug. 18, 2004, provisional application No. 60/602,930, filed on Aug. 18, 2004, provisional application No. 60/602,898, filed on Aug. 18, 2004, provisional application No. 60/603,466, filed on Aug. 19, 2004, provisional application No. 60/603,082, filed on Aug. 19, 2004, provisional application No. 60/603,081, filed on Aug. 19, 2004, provisional application No. 60/603,498, filed on Aug. 20, 2004, provisional application No. 60/603,358, filed on Aug. 20, 2004, provisional application No. 60/604,103, filed on Aug. 23, 2004, provisional application No. 60/604,098, filed on Aug. 23, 2004, provisional application No. 60/604,100, filed on Aug. 23, 2004, provisional application No. 60/604,102, filed on Aug. 23, 2004, provisional application No. 60/605,229, filed on Aug. 27, 2004, provisional application No. 60/605,105, filed on Aug. 27, 2004, provisional application No. 60/613,243, filed on Sep. 27, 2004, provisional application No. 60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,361, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,538, filed on Oct. 1, 2004, provisional application No. 60/617,122, filed on Oct. 7, 2004, provisional application No. 60/622,906, filed on Oct. 28, 2004, provisional application No. 60/633,452, filed on Dec. 6, 2004, provisional application No. 60/633,678, filed on Dec. 6, 2004, provisional application No. 60/633,486, filed on Dec. 6, 2004, provisional application No. 60/633,453, filed on Dec. 6, 2004, provisional application No. 60/634,627, filed on Dec. 9, 2004, provisional application No. 60/634,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2005, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005.

U.S. PATENT DOCUMENTS

| | | |
|---|---|---|
| 4,052,058 A | 10/1977 | Hintz |
| 4,358,824 A | 11/1982 | Glickman et al. |
| 4,526,078 A | 7/1985 | Chadabe |
| 4,538,072 A | 8/1985 | Immler et al. |
| 4,553,261 A | 11/1985 | Froessl |
| 4,610,025 A | 9/1986 | Blum et al. |
| 4,633,507 A | 12/1986 | Cannistra et al. |
| 4,636,848 A | 1/1987 | Yamamoto et al. |
| 4,713,008 A | 12/1987 | Stocker et al. |
| 4,716,804 A | 1/1988 | Chadabe |
| 4,748,678 A | 5/1988 | Takeda et al. |
| 4,776,464 A | 10/1988 | Miller et al. |
| 4,804,949 A | 2/1989 | Faulkerson |
| 4,805,099 A | 2/1989 | Huber |
| 4,829,453 A | 5/1989 | Katsuta et al. |
| 4,829,872 A | 5/1989 | Topic et al. |
| 4,890,230 A | 12/1989 | Tanoshima et al. |
| D306,162 S | 2/1990 | Faulkerson et al. |
| 4,901,364 A | 2/1990 | Faulkerson et al. |
| 4,903,229 A | 2/1990 | Schmidt et al. |
| 4,914,709 A | 4/1990 | Rudak |
| 4,941,125 A | 7/1990 | Boyne |
| 4,947,261 A | 8/1990 | Ishikawa et al. |
| 4,949,391 A | 8/1990 | Faulkerson et al. |
| 4,958,379 A | 9/1990 | Yamaguchi et al. |
| 4,968,877 A | 11/1990 | McAvinney et al. |
| 4,985,863 A | 1/1991 | Fujisawa et al. |
| 4,988,981 A | 1/1991 | Zimmerman et al. |
| 5,010,500 A | 4/1991 | Makkuni et al. |
| 5,012,349 A | 4/1991 | de Fay et al. |
| 5,062,143 A | 10/1991 | Schmitt |
| 5,083,218 A | 1/1992 | Takasu et al. |
| 5,093,873 A | 3/1992 | Takahashi et al. |
| 5,107,256 A | 4/1992 | Ueno et al. |
| 5,109,439 A | 4/1992 | Froessl |
| 5,119,081 A | 6/1992 | Ikehira et al. |
| 5,133,024 A | 7/1992 | Froessl et al. |
| 5,133,052 A | 7/1992 | Bier et al. |
| 5,136,687 A | 8/1992 | Edelman et al. |
| 5,142,161 A | 8/1992 | Brackmann |
| 5,146,404 A | 9/1992 | Calloway et al. |
| 5,146,552 A | 9/1992 | Cassorla et al. |
| 5,157,384 A | 10/1992 | Greanias et al. |
| 5,159,668 A | 10/1992 | Kaasila |
| 5,168,147 A | 12/1992 | Bloomberg |
| 5,168,565 A | 12/1992 | Morita et al. |
| 5,179,652 A | 1/1993 | Rozmanith et al. |
| 5,185,857 A | 2/1993 | Rozmanith et al. |
| 5,201,010 A | 4/1993 | Deaton et al. |
| 5,202,985 A | 4/1993 | Goyal |
| 5,203,704 A | 4/1993 | McCloud |
| 5,212,739 A | 5/1993 | Johnson |
| 5,229,590 A | 7/1993 | Harden et al. |
| 5,231,698 A | 7/1993 | Forcier |
| 5,243,149 A | 9/1993 | Comerford et al. |
| 5,247,285 A | 9/1993 | Yokota et al. |
| 5,251,106 A | 10/1993 | Hui |
| 5,251,316 A | 10/1993 | Anick et al. |
| 5,252,951 A | 10/1993 | Tannenbaum et al. |
| RE34,476 E | 12/1993 | Norwood |
| 5,272,324 A | 12/1993 | Blevins |
| 5,288,938 A | 2/1994 | Wheaton |
| 5,301,243 A | 4/1994 | Olschafskie et al. |
| 5,347,295 A | 9/1994 | Agulnick et al. |
| 5,347,306 A | 9/1994 | Nitta |
| 5,347,477 A | 9/1994 | Lee |
| 5,355,146 A | 10/1994 | Chiu et al. |
| 5,360,971 A | 11/1994 | Kaufman et al. |
| 5,367,453 A | 11/1994 | Capps et al. |
| 5,371,348 A | 12/1994 | Kumar et al. |
| 5,377,706 A | 1/1995 | Huang |
| 5,398,310 A | 3/1995 | Tchao et al. |
| 5,404,442 A | 4/1995 | Foster et al. |
| 5,404,458 A | 4/1995 | Zetts |
| 5,418,684 A | 5/1995 | Koenck et al. |
| 5,418,717 A | 5/1995 | Su et al. |
| 5,418,951 A | 5/1995 | Damashek |
| 5,423,554 A | 6/1995 | Davis |
| 5,430,558 A | 7/1995 | Sohaei et al. |
| 5,438,630 A | 8/1995 | Chen et al. |
| 5,452,442 A | 9/1995 | Kephart |
| 5,454,043 A | 9/1995 | Freeman |
| 5,462,473 A | 10/1995 | Sheller |
| 5,465,325 A | 11/1995 | Capps et al. |
| 5,467,425 A | 11/1995 | Lau et al. |
| 5,481,278 A | 1/1996 | Shigematsu et al. |
| 5,485,565 A | 1/1996 | Saund et al. |
| 5,488,196 A | 1/1996 | Zimmerman et al. |
| 5,499,108 A | 3/1996 | Cotte et al. |
| 5,500,920 A * | 3/1996 | Kupiec ........................ 704/270.1 |
| 5,500,937 A | 3/1996 | Thompson-Rohrlich |
| 5,502,803 A | 3/1996 | Yoshida et al. |
| 5,512,707 A | 4/1996 | Ohshima |
| 5,517,578 A | 5/1996 | Altman et al. |
| 5,522,798 A | 6/1996 | Johnson et al. |
| 5,532,469 A | 7/1996 | Shepard et al. |
| 5,533,141 A | 7/1996 | Futatsugi et al. |
| 5,539,427 A | 7/1996 | Bricklin et al. |
| 5,541,419 A | 7/1996 | Arackellian |
| 5,543,591 A | 8/1996 | Gillespie et al. |
| 5,550,930 A | 8/1996 | Berman et al. |
| 5,555,363 A | 9/1996 | Tou et al. |
| 5,563,996 A | 10/1996 | Tchao |
| 5,568,452 A | 10/1996 | Kronenberg |
| 5,570,113 A | 10/1996 | Zetts |
| 5,574,804 A | 11/1996 | Olschafskie et al. |
| 5,581,276 A | 12/1996 | Cipolla et al. |
| 5,581,670 A | 12/1996 | Bier et al. |
| 5,581,681 A | 12/1996 | Tchao et al. |
| 5,583,542 A | 12/1996 | Capps et al. |
| 5,583,543 A | 12/1996 | Takahashi et al. |
| 5,583,980 A | 12/1996 | Anderson |
| 5,590,219 A | 12/1996 | Gourdol |
| 5,590,256 A | 12/1996 | Tchao et al. |
| 5,592,566 A | 1/1997 | Pagallo et al. |
| 5,594,469 A | 1/1997 | Freeman et al. |
| 5,594,640 A | 1/1997 | Capps et al. |
| 5,594,810 A | 1/1997 | Gourdol |
| 5,595,445 A | 1/1997 | Bobry |
| 5,596,697 A | 1/1997 | Foster et al. |
| 5,600,765 A | 2/1997 | Ando et al. |
| 5,602,570 A | 2/1997 | Capps et al. |
| 5,608,778 A | 3/1997 | Partridge, III |
| 5,612,719 A | 3/1997 | Beernink et al. |
| 5,624,265 A | 4/1997 | Redford |
| 5,625,833 A | 4/1997 | Levine et al. |
| 5,627,960 A | 5/1997 | Clifford et al. |
| 5,638,092 A | 6/1997 | Eng et al. |
| 5,649,060 A | 7/1997 | Ellozy et al. |
| 5,652,849 A | 7/1997 | Conway et al. |
| 5,656,804 A | 8/1997 | Barkan et al. |
| 5,659,638 A | 8/1997 | Bengtson |
| 5,663,514 A | 9/1997 | Usa |
| 5,663,808 A | 9/1997 | Park et al. |
| 5,668,573 A | 9/1997 | Favot et al. |
| 5,677,710 A | 10/1997 | Thompson-Rohrlich |
| 5,682,439 A | 10/1997 | Beernink et al. |
| 5,684,873 A | 11/1997 | Tiilikainen |
| 5,684,891 A | 11/1997 | Tanaka et al. |
| 5,687,254 A | 11/1997 | Poon et al. |
| 5,692,073 A | 11/1997 | Cass |
| 5,699,441 A | 12/1997 | Sagawa et al. |
| 5,701,424 A | 12/1997 | Atkinson |
| 5,701,497 A | 12/1997 | Yamauchi et al. |
| 5,708,825 A | 1/1998 | Sotomayor |
| 5,710,831 A | 1/1998 | Beernink et al. |
| 5,713,045 A | 1/1998 | Berdahl |
| 5,714,698 A | 2/1998 | Tokioka et al. |
| 5,717,846 A | 2/1998 | Iida et al. |
| 5,724,521 A | 3/1998 | Dedrick |
| 5,724,985 A | 3/1998 | Snell et al. |
| 5,732,214 A | 3/1998 | Subrahmanyam |
| 5,732,227 A | 3/1998 | Kuzunuki et al. |
| 5,734,923 A | 3/1998 | Sagawa et al. |
| 5,737,507 A | 4/1998 | Smith |
| 5,745,116 A | 4/1998 | Pisutha-Arnond |
| 5,748,805 A * | 5/1998 | Withgott et al. .............. 382/306 |

| | | | | | | |
|---|---|---|---|---|---|---|
| 5,748,926 A | 5/1998 | Fukuda et al. | | 5,986,655 A | 11/1999 | Chiu et al. |
| 5,752,051 A | 5/1998 | Cohen | | 5,990,878 A | 11/1999 | Ikeda et al. |
| 5,754,308 A | 5/1998 | Lopresti et al. | | 5,990,893 A | 11/1999 | Numazaki |
| 5,754,939 A | 5/1998 | Herz et al. | | 5,991,441 A | 11/1999 | Jourjine |
| 5,756,981 A | 5/1998 | Roustaei et al. | | 5,995,643 A | 11/1999 | Saito |
| 5,764,794 A | 6/1998 | Perlin | | 5,999,664 A | 12/1999 | Mahoney et al. |
| 5,767,457 A | 6/1998 | Gerpheide et al. | | 6,002,798 A | 12/1999 | Palmer et al. |
| 5,768,418 A | 6/1998 | Berman et al. | | 6,002,808 A | 12/1999 | Freeman |
| 5,768,607 A | 6/1998 | Drews et al. | | 6,003,775 A | 12/1999 | Ackley |
| 5,774,357 A | 6/1998 | Hoffberg et al. | | 6,011,905 A | 1/2000 | Huttenlocher et al. |
| 5,774,591 A | 6/1998 | Black et al. | | 6,012,071 A * | 1/2000 | Krishna et al. ............... 715/201 |
| 5,777,614 A | 7/1998 | Ando et al. | | 6,018,342 A | 1/2000 | Bristor |
| 5,781,662 A | 7/1998 | Mori et al. | | 6,018,346 A | 1/2000 | Moran et al. |
| 5,781,723 A | 7/1998 | Yee et al. | | 6,021,218 A | 2/2000 | Capps et al. |
| 5,784,061 A | 7/1998 | Moran et al. | | 6,021,403 A | 2/2000 | Horvitz et al. |
| 5,784,504 A | 7/1998 | Anderson et al. | | 6,025,844 A | 2/2000 | Parsons |
| 5,796,866 A | 8/1998 | Sakurai et al. | | 6,026,388 A | 2/2000 | Liddy et al. |
| 5,798,693 A | 8/1998 | Engellenner | | 6,028,271 A | 2/2000 | Gillespie et al. |
| 5,798,758 A | 8/1998 | Harada et al. | | 6,029,141 A | 2/2000 | Bezos et al. |
| 5,799,219 A | 8/1998 | Moghadam et al. | | 6,029,195 A | 2/2000 | Herz |
| 5,805,167 A | 9/1998 | Van Cruyningen | | 6,031,525 A | 2/2000 | Perlin |
| 5,809,172 A | 9/1998 | Melen | | 6,036,086 A | 3/2000 | Sizer et al. |
| 5,809,267 A | 9/1998 | Moran et al. | | 6,038,342 A | 3/2000 | Bernzott et al. |
| 5,809,476 A | 9/1998 | Ryan | | 6,040,840 A | 3/2000 | Koshiba et al. |
| 5,818,965 A | 10/1998 | Davies | | 6,042,012 A | 3/2000 | Olmstead et al. |
| 5,821,925 A | 10/1998 | Carey et al. | | 6,044,378 A | 3/2000 | Gladney |
| 5,822,539 A | 10/1998 | Van Hoff | | 6,049,034 A | 4/2000 | Cook |
| 5,825,943 A | 10/1998 | DeVito et al. | | 6,049,327 A | 4/2000 | Walker et al. |
| 5,832,474 A | 11/1998 | Lopresti et al. | | 6,052,481 A | 4/2000 | Grajski et al. |
| 5,837,987 A | 11/1998 | Koenck et al. | | 6,053,413 A | 4/2000 | Swift et al. |
| 5,838,326 A | 11/1998 | Card et al. | | 6,055,333 A | 4/2000 | Guzik et al. |
| 5,838,889 A | 11/1998 | Booker | | 6,055,513 A | 4/2000 | Katz et al. |
| 5,845,301 A | 12/1998 | Rivette et al. | | 6,057,844 A | 5/2000 | Strauss |
| 5,848,187 A | 12/1998 | Bricklin et al. | | 6,057,845 A | 5/2000 | Dupouy |
| 5,852,676 A | 12/1998 | Lazar | | 6,061,050 A | 5/2000 | Allport et al. |
| 5,861,886 A | 1/1999 | Moran et al. | | 6,064,854 A | 5/2000 | Peters et al. |
| 5,862,256 A | 1/1999 | Zetts et al. | | 6,066,794 A | 5/2000 | Longo |
| 5,862,260 A | 1/1999 | Rhoads | | 6,069,622 A | 5/2000 | Kurlander |
| 5,864,635 A | 1/1999 | Zetts et al. | | 6,072,494 A | 6/2000 | Nguyen |
| 5,864,848 A | 1/1999 | Horvitz et al. | | 6,072,502 A | 6/2000 | Gupta |
| 5,867,150 A | 2/1999 | Bricklin et al. | | 6,075,895 A | 6/2000 | Qiao et al. |
| 5,867,597 A | 2/1999 | Peairs et al. | | 6,078,308 A | 6/2000 | Rosenberg et al. |
| 5,867,795 A | 2/1999 | Novis et al. | | 6,081,621 A | 6/2000 | Ackner |
| 5,880,411 A | 3/1999 | Gillespie et al. | | 6,081,629 A | 6/2000 | Browning |
| 5,880,731 A | 3/1999 | Liles et al. | | 6,085,162 A | 7/2000 | Cherny |
| 5,880,743 A | 3/1999 | Moran et al. | | 6,088,484 A | 7/2000 | Mead |
| 5,884,267 A | 3/1999 | Goldenthal et al. | | 6,088,731 A | 7/2000 | Kiraly et al. |
| 5,889,236 A | 3/1999 | Gillespie et al. | | 6,092,038 A | 7/2000 | Kanevsky et al. |
| 5,889,523 A | 3/1999 | Wilcox et al. | | 6,092,068 A | 7/2000 | Dinkelacker |
| 5,889,896 A | 3/1999 | Meshinsky et al. | | 6,094,689 A | 7/2000 | Embry et al. |
| 5,890,147 A | 3/1999 | Peltonen et al. | | 6,095,418 A | 8/2000 | Swartz et al. |
| 5,893,095 A | 4/1999 | Jain et al. | | 6,097,392 A | 8/2000 | Leyerle |
| 5,893,126 A | 4/1999 | Drews et al. | | 6,098,106 A | 8/2000 | Philyaw et al. |
| 5,893,130 A | 4/1999 | Inoue et al. | | 6,104,401 A | 8/2000 | Parsons |
| 5,895,470 A | 4/1999 | Pirolli et al. | | 6,104,845 A | 8/2000 | Lipman et al. |
| 5,905,251 A | 5/1999 | Knowles | | 6,107,994 A | 8/2000 | Harada et al. |
| 5,907,328 A | 5/1999 | Brush, II et al. | | 6,108,656 A | 8/2000 | Durst et al. |
| 5,913,185 A | 6/1999 | Martino et al. | | 6,111,580 A | 8/2000 | Kazama et al. |
| 5,917,491 A | 6/1999 | Bauersfeld | | 6,111,588 A | 8/2000 | Newell |
| 5,920,477 A | 7/1999 | Hoffberg et al. | | 6,115,053 A | 9/2000 | Perlin |
| 5,920,694 A | 7/1999 | Carleton et al. | | 6,115,482 A | 9/2000 | Sears et al. |
| 5,932,863 A | 8/1999 | Rathus et al. | | 6,115,724 A | 9/2000 | Booker |
| 5,933,829 A | 8/1999 | Durst et al. | | 6,118,888 A | 9/2000 | Chino et al. |
| 5,937,422 A | 8/1999 | Nelson et al. | | 6,118,899 A | 9/2000 | Bloomfield et al. |
| 5,946,406 A | 8/1999 | Frink et al. | | D432,539 S | 10/2000 | Philyaw |
| 5,949,921 A | 9/1999 | Kojima et al. | | 6,128,003 A | 10/2000 | Smith et al. |
| 5,952,599 A | 9/1999 | Dolby et al. | | 6,134,532 A | 10/2000 | Lazarus et al. |
| 5,953,541 A | 9/1999 | King et al. | | 6,138,915 A | 10/2000 | Danielson et al. |
| 5,956,423 A | 9/1999 | Frink et al. | | 6,140,140 A | 10/2000 | Hopper |
| 5,960,383 A | 9/1999 | Fleischer | | 6,144,366 A | 11/2000 | Numazaki et al. |
| 5,963,966 A | 10/1999 | Mitchell et al. | | 6,147,678 A | 11/2000 | Kumar et al. |
| 5,966,126 A | 10/1999 | Szabo | | 6,151,208 A | 11/2000 | Bartlett |
| 5,970,455 A | 10/1999 | Wilcox et al. | | 6,154,222 A | 11/2000 | Haratsch et al. |
| 5,982,853 A | 11/1999 | Liebermann | | 6,154,723 A | 11/2000 | Cox et al. |
| 5,982,928 A | 11/1999 | Shimada et al. | | 6,154,737 A | 11/2000 | Inaba et al. |
| 5,982,929 A | 11/1999 | Ilan et al. | | 6,154,758 A | 11/2000 | Chiang |
| 5,983,171 A | 11/1999 | Yokoyama et al. | | 6,157,465 A | 12/2000 | Suda et al. |
| 5,983,295 A | 11/1999 | Cotugno | | 6,157,935 A | 12/2000 | Tran et al. |
| 5,986,200 A | 11/1999 | Curtin | | 6,164,534 A | 12/2000 | Rathus et al. |

| Patent | Type | Date | Inventor |
|---|---|---|---|
| 6,167,369 | A | 12/2000 | Schulze |
| 6,169,969 | B1 | 1/2001 | Cohen |
| 6,175,772 | B1 | 1/2001 | Kamiya et al. |
| 6,175,922 | B1 | 1/2001 | Wang |
| 6,178,261 | B1 | 1/2001 | Williams et al. |
| 6,178,263 | B1 | 1/2001 | Fan et al. |
| 6,181,343 | B1 | 1/2001 | Lyons |
| 6,181,778 | B1 | 1/2001 | Ohki et al. |
| 6,184,847 | B1 | 2/2001 | Fateh et al. |
| 6,192,165 | B1 | 2/2001 | Irons |
| 6,192,478 | B1 | 2/2001 | Elledge |
| 6,195,104 | B1 | 2/2001 | Lyons |
| 6,195,475 | B1 | 2/2001 | Beausoleil, Jr. et al. |
| 6,199,048 | B1 | 3/2001 | Hudetz et al. |
| 6,201,903 | B1 | 3/2001 | Wolff et al. |
| 6,204,852 | B1 | 3/2001 | Kumar et al. |
| 6,208,355 | B1 | 3/2001 | Schuster |
| 6,208,435 | B1 | 3/2001 | Zwolinski |
| 6,215,890 | B1 | 4/2001 | Matsuo et al. |
| 6,218,964 | B1 | 4/2001 | Ellis |
| 6,219,057 | B1 | 4/2001 | Carey et al. |
| 6,222,465 | B1 | 4/2001 | Kumar et al. |
| 6,226,631 | B1 | 5/2001 | Evans |
| 6,229,137 | B1 | 5/2001 | Bohn |
| 6,229,542 | B1 | 5/2001 | Miller |
| 6,233,591 | B1 | 5/2001 | Sherman et al. |
| 6,240,207 | B1 | 5/2001 | Shinozuka et al. |
| 6,243,683 | B1 | 6/2001 | Peters |
| 6,244,873 | B1 | 6/2001 | Hill et al. |
| 6,249,292 | B1 | 6/2001 | Christian et al. |
| 6,249,606 | B1 | 6/2001 | Kiraly et al. |
| 6,252,598 | B1 | 6/2001 | Segen |
| 6,256,400 | B1 | 7/2001 | Takata et al. |
| 6,265,844 | B1 | 7/2001 | Wakefield |
| 6,269,187 | B1 | 7/2001 | Frink et al. |
| 6,269,188 | B1 | 7/2001 | Jamali |
| 6,270,013 | B1 | 8/2001 | Lipman et al. |
| 6,285,794 | B1 | 9/2001 | Georgiev et al. |
| 6,289,304 | B1 | 9/2001 | Grefenstette et al. |
| 6,292,274 | B1 | 9/2001 | Bohn |
| 6,304,674 | B1 | 10/2001 | Cass et al. |
| 6,307,952 | B1 | 10/2001 | Dietz |
| 6,307,955 | B1 | 10/2001 | Zank et al. |
| 6,310,971 | B1 | 10/2001 | Shiiyama et al. |
| 6,310,988 | B1 | 10/2001 | Flores et al. |
| 6,311,152 | B1 | 10/2001 | Bai et al. |
| 6,312,175 | B1 | 11/2001 | Lum |
| 6,313,853 | B1 | 11/2001 | Lamontagne et al. |
| 6,314,406 | B1 | 11/2001 | O'Hagan et al. |
| 6,314,457 | B1 | 11/2001 | Schena et al. |
| 6,316,710 | B1 | 11/2001 | Lindemann |
| 6,317,132 | B1 | 11/2001 | Perlin |
| 6,318,087 | B1 | 11/2001 | Baumann et al. |
| 6,321,991 | B1 | 11/2001 | Knowles |
| 6,323,846 | B1 | 11/2001 | Westerman et al. |
| 6,326,962 | B1 | 12/2001 | Szabo |
| 6,330,976 | B1 * | 12/2001 | Dymetman et al. .......... 235/487 |
| 6,335,725 | B1 | 1/2002 | Koh et al. |
| 6,341,280 | B1 | 1/2002 | Glass et al. |
| 6,341,290 | B1 | 1/2002 | Lombardo et al. |
| 6,344,906 | B1 | 2/2002 | Gatto et al. |
| 6,346,933 | B1 | 2/2002 | Lin |
| 6,347,290 | B1 | 2/2002 | Bartlett |
| 6,349,308 | B1 | 2/2002 | Whang et al. |
| 6,351,222 | B1 | 2/2002 | Swan et al. |
| 6,356,281 | B1 | 3/2002 | Isenman |
| 6,356,899 | B1 | 3/2002 | Chakrabarti et al. |
| 6,360,951 | B1 | 3/2002 | Swinehart |
| 6,363,160 | B1 | 3/2002 | Bradski et al. |
| RE37,654 | E | 4/2002 | Longo |
| 6,366,288 | B1 | 4/2002 | Naruki et al. |
| 6,369,811 | B1 | 4/2002 | Graham et al. |
| 6,377,296 | B1 | 4/2002 | Zlatsin et al. |
| 6,377,712 | B1 | 4/2002 | Georgiev et al. |
| 6,377,986 | B1 | 4/2002 | Philyaw et al. |
| 6,378,075 | B1 | 4/2002 | Goldstein et al. |
| 6,380,931 | B1 | 4/2002 | Gillespie et al. |
| 6,381,602 | B1 | 4/2002 | Shoroff et al. |
| 6,384,744 | B1 | 5/2002 | Philyaw et al. |
| 6,384,829 | B1 | 5/2002 | Prevost et al. |
| 6,393,443 | B1 | 5/2002 | Rubin et al. |
| 6,396,523 | B1 | 5/2002 | Segal et al. |
| 6,396,951 | B1 | 5/2002 | Grefenstette et al. |
| 6,400,845 | B1 | 6/2002 | Volino |
| 6,404,438 | B1 | 6/2002 | Hatlelid et al. |
| 6,408,257 | B1 | 6/2002 | Harrington et al. |
| 6,409,401 | B1 | 6/2002 | Petteruti et al. |
| 6,414,671 | B1 | 7/2002 | Gillespie et al. |
| 6,417,797 | B1 | 7/2002 | Cousins et al. |
| 6,418,433 | B1 | 7/2002 | Chakrabarti et al. |
| 6,421,453 | B1 | 7/2002 | Kanevsky et al. |
| 6,421,675 | B1 | 7/2002 | Ryan et al. |
| 6,427,032 | B1 | 7/2002 | Irons et al. |
| 6,429,899 | B1 | 8/2002 | Nio et al. |
| 6,430,554 | B1 | 8/2002 | Rothschild |
| 6,430,567 | B2 | 8/2002 | Burridge |
| 6,433,784 | B1 | 8/2002 | Merrick et al. |
| 6,434,561 | B1 | 8/2002 | Durst, Jr. et al. |
| 6,434,581 | B1 | 8/2002 | Forcier |
| 6,438,523 | B1 | 8/2002 | Oberteuffer et al. |
| 6,448,979 | B1 | 9/2002 | Schena et al. |
| 6,449,616 | B1 | 9/2002 | Walker et al. |
| 6,454,626 | B1 | 9/2002 | An |
| 6,459,823 | B2 | 10/2002 | Altunbasak et al. |
| 6,460,036 | B1 | 10/2002 | Herz |
| 6,466,198 | B1 | 10/2002 | Feinstein |
| 6,466,336 | B1 | 10/2002 | Sturgeon et al. |
| 6,476,830 | B1 | 11/2002 | Farmer et al. |
| 6,476,834 | B1 | 11/2002 | Doval et al. |
| 6,477,239 | B1 | 11/2002 | Ohki et al. |
| 6,483,513 | B1 | 11/2002 | Haratsch et al. |
| 6,484,156 | B1 | 11/2002 | Gupta et al. |
| 6,486,874 | B1 | 11/2002 | Muthuswamy et al. |
| 6,486,892 | B1 | 11/2002 | Stern |
| 6,489,970 | B1 | 12/2002 | Pazel |
| 6,490,553 | B2 | 12/2002 | Van Thong et al. |
| 6,491,217 | B2 | 12/2002 | Catan |
| 6,493,707 | B1 | 12/2002 | Dey et al. |
| 6,498,970 | B2 | 12/2002 | Colmenarez et al. |
| 6,504,138 | B1 | 1/2003 | Mangerson |
| 6,507,349 | B1 | 1/2003 | Balassanian |
| 6,508,706 | B2 | 1/2003 | Sitrick et al. |
| 6,509,707 | B2 | 1/2003 | Yamashita et al. |
| 6,509,912 | B1 | 1/2003 | Moran et al. |
| 6,510,387 | B2 | 1/2003 | Fuchs et al. |
| 6,510,417 | B1 | 1/2003 | Woods et al. |
| 6,518,950 | B1 | 2/2003 | Dougherty et al. |
| 6,520,407 | B1 | 2/2003 | Nieswand et al. |
| 6,522,333 | B1 | 2/2003 | Hatlelid et al. |
| 6,525,749 | B1 | 2/2003 | Moran et al. |
| 6,526,395 | B1 | 2/2003 | Morris |
| 6,526,449 | B1 | 2/2003 | Philyaw et al. |
| 6,532,007 | B1 | 3/2003 | Matsuda |
| 6,537,324 | B1 | 3/2003 | Tabata et al. |
| 6,538,187 | B2 | 3/2003 | Beigi |
| 6,539,931 | B2 | 4/2003 | Trajkovic et al. |
| 6,540,141 | B1 | 4/2003 | Dougherty et al. |
| 6,542,933 | B1 | 4/2003 | Durst, Jr. et al. |
| 6,543,052 | B1 | 4/2003 | Ogasawara |
| 6,545,669 | B1 | 4/2003 | Kinawi et al. |
| 6,546,385 | B1 | 4/2003 | Mao et al. |
| 6,546,405 | B2 | 4/2003 | Gupta et al. |
| 6,549,751 | B1 | 4/2003 | Mandri |
| 6,549,891 | B1 * | 4/2003 | Rauber et al. ................... 705/28 |
| 6,554,433 | B1 | 4/2003 | Holler |
| 6,560,281 | B1 | 5/2003 | Black et al. |
| 6,564,144 | B1 | 5/2003 | Cherveny |
| 6,570,555 | B1 | 5/2003 | Prevost et al. |
| 6,571,193 | B1 | 5/2003 | Unuma et al. |
| 6,571,235 | B1 | 5/2003 | Marpe et al. |
| 6,573,883 | B1 | 6/2003 | Bartlett |
| 6,577,329 | B1 | 6/2003 | Flickner et al. |
| 6,577,953 | B1 | 6/2003 | Swope et al. |
| 6,587,835 | B1 | 7/2003 | Treyz et al. |
| 6,593,723 | B1 | 7/2003 | Johnson |
| 6,594,616 | B2 | 7/2003 | Zhang et al. |
| 6,594,705 | B1 | 7/2003 | Philyaw |
| 6,597,443 | B2 | 7/2003 | Boman |

| | | | | | | |
|---|---|---|---|---|---|---|
| 6,597,812 B1 | 7/2003 | Fallon et al. | | 6,748,306 B2 | 6/2004 | Lipowicz |
| 6,599,130 B2 | 7/2003 | Moehrle | | 6,750,852 B2 | 6/2004 | Gillespie et al. |
| 6,600,475 B2 | 7/2003 | Gutta et al. | | 6,752,498 B2 | 6/2004 | Covannon et al. |
| 6,610,936 B2 | 8/2003 | Gillespie et al. | | 6,753,883 B2 | 6/2004 | Schena et al. |
| 6,611,598 B1 | 8/2003 | Hayosh | | 6,754,632 B1 | 6/2004 | Kalinowski et al. |
| 6,615,136 B1 | 9/2003 | Swope et al. | | 6,754,698 B1 | 6/2004 | Philyaw et al. |
| 6,615,268 B1 | 9/2003 | Philyaw et al. | | 6,757,715 B1 | 6/2004 | Philyaw |
| 6,616,038 B1 * | 9/2003 | Olschafskie et al. ......... 235/454 | | 6,757,783 B2 | 6/2004 | Koh |
| 6,617,369 B2 | 9/2003 | Parfondry et al. | | 6,758,398 B1 | 7/2004 | Philyaw et al. |
| 6,618,504 B1 | 9/2003 | Yoshino et al. | | 6,760,661 B2 | 7/2004 | Klein et al. |
| 6,618,732 B1 | 9/2003 | White et al. | | 6,766,494 B1 | 7/2004 | Price et al. |
| 6,622,165 B1 | 9/2003 | Philyaw | | 6,766,956 B1 | 7/2004 | Boylan, III et al. |
| 6,624,833 B1 | 9/2003 | Kumar et al. | | 6,772,047 B2 | 8/2004 | Butikofer |
| 6,625,335 B1 | 9/2003 | Kanai | | 6,772,338 B1 | 8/2004 | Hull |
| 6,625,581 B1 | 9/2003 | Perkowski | | 6,773,177 B2 | 8/2004 | Denoue et al. |
| 6,628,295 B2 | 9/2003 | Wilensky | | 6,775,422 B1 | 8/2004 | Altman |
| 6,629,133 B1 | 9/2003 | Philyaw et al. | | 6,778,988 B2 | 8/2004 | Bengtson |
| 6,630,924 B1 | 10/2003 | Peck | | 6,783,071 B2 | 8/2004 | Levine et al. |
| 6,631,404 B1 | 10/2003 | Philyaw | | 6,785,421 B1 * | 8/2004 | Gindele et al. ................ 382/217 |
| 6,636,763 B1 | 10/2003 | Junker et al. | | 6,786,793 B1 | 9/2004 | Wang |
| 6,636,892 B1 | 10/2003 | Philyaw | | 6,788,809 B1 | 9/2004 | Grzeszczuk et al. |
| 6,636,896 B1 | 10/2003 | Philyaw | | 6,788,815 B2 | 9/2004 | Lui et al. |
| 6,638,314 B1 | 10/2003 | Meyerzon et al. | | 6,791,536 B2 | 9/2004 | Keely et al. |
| 6,638,317 B2 | 10/2003 | Nakao et al. | | 6,791,588 B1 | 9/2004 | Philyaw |
| 6,640,145 B2 | 10/2003 | Hoffberg et al. | | 6,792,112 B1 | 9/2004 | Campbell et al. |
| 6,641,037 B2 | 11/2003 | Williams | | 6,792,452 B1 | 9/2004 | Philyaw |
| 6,643,692 B1 | 11/2003 | Philyaw et al. | | 6,798,429 B2 | 9/2004 | Bradski |
| 6,643,696 B2 | 11/2003 | Davis et al. | | 6,801,637 B2 | 10/2004 | Voronka et al. |
| 6,650,761 B1 | 11/2003 | Rodriguez et al. | | 6,801,658 B2 | 10/2004 | Morita et al. |
| 6,651,053 B1 | 11/2003 | Rothschild | | 6,801,907 B1 | 10/2004 | Zagami |
| 6,658,151 B2 | 12/2003 | Lee et al. | | 6,804,396 B2 | 10/2004 | Higaki et al. |
| 6,661,919 B2 | 12/2003 | Nicholson et al. | | 6,804,659 B1 | 10/2004 | Graham et al. |
| 6,664,991 B1 | 12/2003 | Chew et al. | | 6,813,039 B1 | 11/2004 | Silverbrook et al. |
| 6,669,088 B2 | 12/2003 | Veeneman | | 6,816,894 B1 | 11/2004 | Philyaw et al. |
| 6,671,684 B1 | 12/2003 | Hull et al. | | 6,820,237 B1 | 11/2004 | Abu-Hakima et al. |
| 6,677,969 B1 | 1/2004 | Hongo | | 6,822,639 B1 | 11/2004 | Silverbrook et al. |
| 6,678,075 B1 | 1/2004 | Tsai et al. | | 6,823,075 B2 | 11/2004 | Perry |
| 6,678,664 B1 | 1/2004 | Ganesan | | 6,823,388 B1 | 11/2004 | Philyaw et al. |
| 6,678,687 B2 | 1/2004 | Watanabe et al. | | 6,824,044 B1 | 11/2004 | Lapstun et al. |
| 6,681,031 B2 | 1/2004 | Cohen et al. | | 6,824,057 B2 | 11/2004 | Rathus et al. |
| 6,686,844 B2 | 2/2004 | Watanabe et al. | | 6,825,956 B2 | 11/2004 | Silverbrook et al. |
| 6,687,612 B2 | 2/2004 | Cherveny | | 6,826,592 B1 | 11/2004 | Philyaw et al. |
| 6,688,081 B2 | 2/2004 | Boyd | | 6,827,259 B2 | 12/2004 | Rathus et al. |
| 6,688,522 B1 | 2/2004 | Philyaw et al. | | 6,827,267 B2 | 12/2004 | Rathus et al. |
| 6,688,523 B1 | 2/2004 | Koenck | | 6,829,650 B1 | 12/2004 | Philyaw et al. |
| 6,688,525 B1 | 2/2004 | Nelson et al. | | 6,830,187 B2 | 12/2004 | Rathus et al. |
| 6,690,358 B2 | 2/2004 | Kaplan | | 6,830,188 B2 | 12/2004 | Rathus et al. |
| 6,691,107 B1 | 2/2004 | Dockter et al. | | 6,832,116 B1 | 12/2004 | Tillgren et al. |
| 6,691,123 B1 | 2/2004 | Gulliksen | | 6,833,936 B1 | 12/2004 | Seymour |
| 6,691,151 B1 | 2/2004 | Cheyer et al. | | 6,834,804 B2 | 12/2004 | Rathus et al. |
| 6,691,194 B1 | 2/2004 | Ofer | | 6,836,799 B1 | 12/2004 | Philyaw et al. |
| 6,691,914 B2 | 2/2004 | Isherwood et al. | | 6,845,913 B2 | 1/2005 | Madding et al. |
| 6,692,259 B2 | 2/2004 | Kumar et al. | | 6,850,252 B1 | 2/2005 | Hoffberg |
| 6,694,356 B1 | 2/2004 | Philyaw | | 6,862,046 B2 | 3/2005 | Ko |
| 6,697,838 B1 | 2/2004 | Jakobson | | 6,868,193 B1 | 3/2005 | Gharbia et al. |
| 6,697,949 B1 | 2/2004 | Philyaw et al. | | 6,877,001 B2 | 4/2005 | Wolf et al. |
| H2098 H | 3/2004 | Morin | | 6,879,957 B1 | 4/2005 | Pechter et al. |
| 6,701,354 B1 | 3/2004 | Philyaw et al. | | 6,880,122 B1 * | 4/2005 | Lee et al. ...................... 715/209 |
| 6,701,369 B1 | 3/2004 | Philyaw | | 6,880,124 B1 | 4/2005 | Moore |
| 6,704,024 B2 | 3/2004 | Robotham et al. | | 6,886,104 B1 | 4/2005 | McClurg et al. |
| 6,704,699 B2 | 3/2004 | Nir et al. | | 6,892,264 B2 | 5/2005 | Lamb |
| 6,707,581 B1 | 3/2004 | Browning | | 6,898,592 B2 | 5/2005 | Peltonen et al. |
| 6,708,208 B1 | 3/2004 | Philyaw | | 6,917,722 B1 | 7/2005 | Bloomfield |
| 6,714,677 B1 | 3/2004 | Stearns et al. | | 6,917,724 B2 | 7/2005 | Seder et al. |
| 6,714,969 B1 | 3/2004 | Klein et al. | | 6,922,725 B2 | 7/2005 | Lamming et al. |
| 6,718,308 B1 | 4/2004 | Nolting | | 6,925,182 B1 | 8/2005 | Epstein |
| 6,720,984 B1 | 4/2004 | Jorgensen et al. | | 6,931,592 B1 * | 8/2005 | Ramaley et al. .............. 715/209 |
| 6,721,921 B1 | 4/2004 | Altman | | 6,938,024 B1 | 8/2005 | Horvitz |
| 6,725,125 B2 | 4/2004 | Basson et al. | | 6,947,571 B1 | 9/2005 | Rhoads et al. |
| 6,725,203 B1 | 4/2004 | Seet et al. | | 6,947,930 B2 | 9/2005 | Anick et al. |
| 6,725,260 B1 | 4/2004 | Philyaw | | 6,957,384 B2 | 10/2005 | Jeffery et al. |
| 6,728,000 B1 | 4/2004 | Lapstun et al. | | 6,970,915 B1 | 11/2005 | Partovi et al. |
| 6,735,632 B1 | 5/2004 | Kiraly et al. | | 6,978,297 B1 | 12/2005 | Piersol |
| 6,738,519 B1 | 5/2004 | Nishiwaki | | 6,985,169 B1 | 1/2006 | Deng et al. |
| 6,741,745 B2 | 5/2004 | Dance et al. | | 6,990,548 B1 | 1/2006 | Kaylor |
| 6,744,938 B1 | 6/2004 | Rantze et al. | | 6,991,158 B2 | 1/2006 | Munte |
| 6,745,234 B1 | 6/2004 | Philyaw et al. | | 6,992,655 B2 | 1/2006 | Ericson et al. |
| 6,745,937 B2 | 6/2004 | Walsh et al. | | 6,993,580 B2 | 1/2006 | Isherwood et al. |
| 6,747,632 B2 | 6/2004 | Howard | | 7,001,681 B2 | 2/2006 | Wood |

| Patent No. | Date | Inventor(s) |
|---|---|---|
| 7,006,881 B1 | 2/2006 | Hoffberg |
| 7,010,616 B2 | 3/2006 | Carlson et al. |
| 7,016,084 B2 | 3/2006 | Tsai |
| 7,020,663 B2 | 3/2006 | Hay et al. |
| 7,043,489 B1 | 5/2006 | Kelley |
| 7,047,491 B2 | 5/2006 | Schubert et al. |
| 7,051,943 B2 | 5/2006 | Leone et al. |
| 7,057,607 B2 | 6/2006 | Mayoraz et al. |
| 7,058,223 B2 | 6/2006 | Cox |
| 7,062,437 B2 | 6/2006 | Kovales et al. |
| 7,062,706 B2 | 6/2006 | Maxwell et al. |
| 7,069,240 B2 | 6/2006 | Spero et al. |
| 7,069,272 B2 | 6/2006 | Sndyer |
| 7,079,713 B2 | 7/2006 | Simmons |
| 7,093,759 B2 | 8/2006 | Walsh |
| 7,096,218 B2 | 8/2006 | Schirmer et al. |
| 7,103,848 B2 | 9/2006 | Barsness et al. |
| 7,110,576 B2 | 9/2006 | Norris, Jr. et al. |
| 7,111,787 B2 | 9/2006 | Ehrhart |
| 7,117,374 B2 | 10/2006 | Hill et al. |
| 7,121,469 B2 | 10/2006 | Dorai et al. |
| 7,124,093 B1 * | 10/2006 | Graham et al. .............. 705/14 |
| 7,130,885 B2 | 10/2006 | Chandra et al. |
| 7,131,061 B2 | 10/2006 | MacLean et al. |
| 7,133,862 B2 | 11/2006 | Hubert et al. |
| 7,136,814 B1 | 11/2006 | McConnell |
| 7,137,077 B2 | 11/2006 | Iwema et al. |
| 7,139,445 B2 | 11/2006 | Pilu et al. |
| 7,151,864 B2 | 12/2006 | Henry et al. |
| 7,165,268 B1 | 1/2007 | Moore et al. |
| 7,167,586 B2 | 1/2007 | Braun et al. |
| 7,174,054 B2 | 2/2007 | Manber et al. |
| 7,174,332 B2 | 2/2007 | Baxter et al. |
| 7,185,275 B2 | 2/2007 | Roberts et al. |
| 7,188,307 B2 | 3/2007 | Ohsawa |
| 7,190,480 B2 | 3/2007 | Sturgeon et al. |
| 7,197,716 B2 | 3/2007 | Newell et al. |
| 7,203,158 B2 | 4/2007 | Oshima et al. |
| 7,216,224 B2 | 5/2007 | Lapstun et al. |
| 7,224,480 B2 | 5/2007 | Tanaka et al. |
| 7,224,820 B2 | 5/2007 | Inomata et al. |
| 7,225,979 B2 | 6/2007 | Silverbrook et al. |
| 7,234,645 B2 | 6/2007 | Silverbrook et al. |
| 7,240,843 B2 | 7/2007 | Paul et al. |
| 7,242,492 B2 | 7/2007 | Currans et al. |
| 7,246,118 B2 | 7/2007 | Chastain et al. |
| 7,260,534 B2 | 8/2007 | Gandhi et al. |
| 7,262,798 B2 | 8/2007 | Stavely et al. |
| 7,263,521 B2 | 8/2007 | Carpentier et al. |
| 7,275,049 B2 | 9/2007 | Clausner et al. |
| 7,283,992 B2 | 10/2007 | Liu et al. |
| 7,284,192 B2 | 10/2007 | Kashi et al. |
| 7,289,806 B2 | 10/2007 | Morris et al. |
| 7,295,101 B2 | 11/2007 | Ward et al. |
| 7,299,186 B2 | 11/2007 | Kuzunuki et al. |
| 7,299,969 B2 | 11/2007 | Paul et al. |
| 7,331,523 B2 | 2/2008 | Meier et al. |
| 7,339,467 B2 | 3/2008 | Lamb |
| 7,349,552 B2 | 3/2008 | Levy et al. |
| 7,353,199 B1 | 4/2008 | DiStefano, III |
| 7,376,581 B2 | 5/2008 | DeRose et al. |
| 7,383,263 B2 | 6/2008 | Goger |
| 7,392,287 B2 | 6/2008 | Ratcliff, III |
| 7,392,475 B1 | 6/2008 | Leban et al. |
| 7,404,520 B2 | 7/2008 | Vesuna |
| 7,409,434 B2 | 8/2008 | Lamming et al. |
| 7,412,158 B2 | 8/2008 | Kakkori |
| 7,415,670 B2 | 8/2008 | Hull et al. |
| 7,421,155 B2 | 9/2008 | King et al. |
| 7,424,543 B2 | 9/2008 | Rice, III |
| 7,426,486 B2 | 9/2008 | Treibach-Heck et al. |
| 7,433,068 B2 | 10/2008 | Stevens et al. |
| 7,433,893 B2 | 10/2008 | Lowry |
| 7,437,023 B2 | 10/2008 | King et al. |
| 7,487,112 B2 | 2/2009 | Barnes, Jr. |
| 7,493,487 B2 | 2/2009 | Phillips et al. |
| 7,496,638 B2 | 2/2009 | Philyaw |
| 7,505,785 B2 | 3/2009 | Callaghan et al. |
| 7,505,956 B2 | 3/2009 | Ibbotson |
| 7,512,254 B2 | 3/2009 | Vollkommer et al. |
| 7,523,067 B1 | 4/2009 | Nakajima |
| 7,533,040 B2 | 5/2009 | Perkowski |
| 7,536,547 B2 | 5/2009 | Van Den Tillaart |
| 7,552,075 B1 | 6/2009 | Walsh |
| 7,552,381 B2 | 6/2009 | Barrus |
| 7,587,412 B2 | 9/2009 | Weyl et al. |
| 7,591,597 B2 | 9/2009 | Pasqualini et al. |
| 7,593,605 B2 | 9/2009 | King et al. |
| 7,596,269 B2 | 9/2009 | King et al. |
| 7,599,580 B2 | 10/2009 | King et al. |
| 7,599,844 B2 | 10/2009 | King et al. |
| 7,606,741 B2 | 10/2009 | King et al. |
| 7,613,634 B2 | 11/2009 | Siegel et al. |
| 7,616,840 B2 | 11/2009 | Erol et al. |
| 7,660,813 B2 | 2/2010 | Milic-Frayling et al. |
| 7,664,734 B2 | 2/2010 | Lawrence et al. |
| 7,672,543 B2 | 3/2010 | Hull et al. |
| 7,680,067 B2 | 3/2010 | Prasad et al. |
| 7,689,712 B2 | 3/2010 | Lee et al. |
| 7,689,832 B2 | 3/2010 | Talmor et al. |
| 7,698,344 B2 | 4/2010 | Sareen et al. |
| 7,702,624 B2 | 4/2010 | King et al. |
| 7,706,611 B2 | 4/2010 | King et al. |
| 7,707,039 B2 | 4/2010 | King et al. |
| 7,710,598 B2 | 5/2010 | Harrison, Jr. |
| 7,742,953 B2 | 6/2010 | King et al. |
| 7,788,248 B2 | 8/2010 | Forstall et al. |
| 7,796,116 B2 | 9/2010 | Salsman et al. |
| 7,806,322 B2 | 10/2010 | Brundage et al. |
| 7,812,860 B2 | 10/2010 | King et al. |
| 7,818,215 B2 | 10/2010 | King et al. |
| 7,831,912 B2 | 11/2010 | King et al. |
| 7,872,669 B2 | 1/2011 | Darrell et al. |
| 7,894,670 B2 | 2/2011 | King et al. |
| 2001/0001854 A1 * | 5/2001 | Schena et al. .............. 705/27 |
| 2001/0003176 A1 | 6/2001 | Schena et al. |
| 2001/0003177 A1 | 6/2001 | Schena et al. |
| 2001/0032252 A1 | 10/2001 | Durst et al. |
| 2001/0034237 A1 | 10/2001 | Garahi |
| 2001/0049636 A1 | 12/2001 | Hudda et al. |
| 2001/0053252 A1 | 12/2001 | Creque |
| 2001/0056463 A1 * | 12/2001 | Grady et al. .............. 709/203 |
| 2002/0002504 A1 | 1/2002 | Engel et al. |
| 2002/0012065 A1 | 1/2002 | Watanabe |
| 2002/0013781 A1 | 1/2002 | Petersen |
| 2002/0016750 A1 | 2/2002 | Attia |
| 2002/0020750 A1 | 2/2002 | Dymetman et al. |
| 2002/0022993 A1 | 2/2002 | Miller et al. |
| 2002/0023158 A1 | 2/2002 | Polizzi et al. |
| 2002/0023215 A1 | 2/2002 | Wang et al. |
| 2002/0023957 A1 | 2/2002 | Michaelis et al. |
| 2002/0023959 A1 | 2/2002 | Miller et al. |
| 2002/0029350 A1 | 3/2002 | Cooper et al. |
| 2002/0038456 A1 | 3/2002 | Hansen et al. |
| 2002/0049781 A1 | 4/2002 | Bengtson |
| 2002/0051262 A1 | 5/2002 | Nuttall et al. |
| 2002/0052747 A1 | 5/2002 | Sarukkai |
| 2002/0055906 A1 | 5/2002 | Katz et al. |
| 2002/0055919 A1 | 5/2002 | Mikheev |
| 2002/0067308 A1 | 6/2002 | Robertson |
| 2002/0073000 A1 | 6/2002 | Sage |
| 2002/0075298 A1 | 6/2002 | Schena et al. |
| 2002/0076110 A1 | 6/2002 | Zee |
| 2002/0087598 A1 | 7/2002 | Carro |
| 2002/0090132 A1 | 7/2002 | Boncyk et al. |
| 2002/0091569 A1 | 7/2002 | Kitaura et al. |
| 2002/0091928 A1 | 7/2002 | Bouchard et al. |
| 2002/0099812 A1 | 7/2002 | Davis et al. |
| 2002/0102966 A1 | 8/2002 | Lev et al. |
| 2002/0133725 A1 | 9/2002 | Roy et al. |
| 2002/0135815 A1 | 9/2002 | Finn |
| 2002/0139859 A1 | 10/2002 | Catan |
| 2002/0161658 A1 | 10/2002 | Sussman |
| 2002/0191847 A1 | 12/2002 | Newman et al. |
| 2002/0194143 A1 | 12/2002 | Banerjee et al. |
| 2002/0199198 A1 | 12/2002 | Stonedahl |
| 2003/0001018 A1 | 1/2003 | Hussey et al. |
| 2003/0004724 A1 | 1/2003 | Kahn et al. |

| | | | | | | |
|---|---|---|---|---|---|---|
| 2003/0009495 A1 | 1/2003 | Adjaoute | | 2005/0086309 A1 | 4/2005 | Galli et al. |
| 2003/0019939 A1 | 1/2003 | Sellen | | 2005/0097335 A1 | 5/2005 | Shenoy et al. |
| 2003/0028889 A1 | 2/2003 | McCoskey et al. | | 2005/0136949 A1 | 6/2005 | Barnes, Jr. |
| 2003/0040957 A1 | 2/2003 | Rodriguez et al. | | 2005/0139649 A1 | 6/2005 | Metcalf et al. |
| 2003/0043042 A1 | 3/2003 | Moores, Jr. et al. | | 2005/0144074 A1 | 6/2005 | Fredregill et al. |
| 2003/0046307 A1 | 3/2003 | Rivette et al. | | 2005/0149516 A1 | 7/2005 | Wolf et al. |
| 2003/0050854 A1 | 3/2003 | Showghi et al. | | 2005/0149538 A1 | 7/2005 | Singh et al. |
| 2003/0065770 A1 | 4/2003 | Davis et al. | | 2005/0154760 A1 | 7/2005 | Bhakta et al. |
| 2003/0093384 A1 | 5/2003 | Durst et al. | | 2005/0220359 A1 | 10/2005 | Sun et al. |
| 2003/0093400 A1 | 5/2003 | Santosuosso | | 2005/0222801 A1 | 10/2005 | Wulff et al. |
| 2003/0093545 A1 | 5/2003 | Liu et al. | | 2005/0228683 A1 | 10/2005 | Saylor et al. |
| 2003/0098352 A1 | 5/2003 | Schnee et al. | | 2005/0231746 A1 | 10/2005 | Parry et al. |
| 2003/0106018 A1 | 6/2003 | Silverbrook et al. | | 2005/0278179 A1 | 12/2005 | Overend et al. |
| 2003/0130904 A1 | 7/2003 | Katz et al. | | 2005/0288954 A1 | 12/2005 | McCarthy et al. |
| 2003/0132298 A1 | 7/2003 | Swartz et al. | | 2005/0289054 A1 | 12/2005 | Silverbrook et al. |
| 2003/0144865 A1 | 7/2003 | Lin et al. | | 2006/0023945 A1 | 2/2006 | King et al. |
| 2003/0150907 A1 | 8/2003 | Metcalf et al. | | 2006/0036462 A1 | 2/2006 | King et al. |
| 2003/0152293 A1* | 8/2003 | Bresler et al. ............... 382/305 | | 2006/0041484 A1 | 2/2006 | King et al. |
| 2003/0160975 A1 | 8/2003 | Skurdal et al. | | 2006/0041538 A1 | 2/2006 | King et al. |
| 2003/0173405 A1 | 9/2003 | Wilz, Sr. et al. | | 2006/0041605 A1 | 2/2006 | King et al. |
| 2003/0179908 A1 | 9/2003 | Mahoney et al. | | 2006/0045374 A1 | 3/2006 | Kim et al. |
| 2003/0187751 A1 | 10/2003 | Watson et al. | | 2006/0053097 A1 | 3/2006 | King et al. |
| 2003/0187886 A1 | 10/2003 | Hull et al. | | 2006/0069616 A1 | 3/2006 | Bau |
| 2003/0195851 A1 | 10/2003 | Ong | | 2006/0075327 A1 | 4/2006 | Sriver et al. |
| 2003/0200152 A1 | 10/2003 | Divekar | | 2006/0080314 A1 | 4/2006 | Hubert et al. |
| 2003/0214528 A1 | 11/2003 | Pierce et al. | | 2006/0081714 A1 | 4/2006 | King et al. |
| 2003/0218070 A1 | 11/2003 | Tsikos et al. | | 2006/0085477 A1 | 4/2006 | Phillips et al. |
| 2003/0220835 A1 | 11/2003 | Barnes, Jr. | | 2006/0098900 A1 | 5/2006 | King et al. |
| 2003/0223637 A1 | 12/2003 | Simske et al. | | 2006/0104515 A1 | 5/2006 | King et al. |
| 2003/0225547 A1 | 12/2003 | Paradies | | 2006/0119900 A1 | 6/2006 | King et al. |
| 2004/0001217 A1 | 1/2004 | Wu | | 2006/0122983 A1 | 6/2006 | King et al. |
| 2004/0015437 A1 | 1/2004 | Choi et al. | | 2006/0126131 A1 | 6/2006 | Tseng et al. |
| 2004/0015606 A1 | 1/2004 | Philyaw | | 2006/0136629 A1 | 6/2006 | King et al. |
| 2004/0036718 A1 | 2/2004 | Warren et al. | | 2006/0138219 A1 | 6/2006 | Brzezniak et al. |
| 2004/0042667 A1 | 3/2004 | Lee et al. | | 2006/0146169 A1 | 7/2006 | Segman |
| 2004/0044576 A1 | 3/2004 | Kurihara et al. | | 2006/0173859 A1 | 8/2006 | Kim et al. |
| 2004/0044627 A1 | 3/2004 | Russell et al. | | 2006/0195695 A1 | 8/2006 | Keys |
| 2004/0044952 A1 | 3/2004 | Jiang et al. | | 2006/0200780 A1 | 9/2006 | Iwema et al. |
| 2004/0052400 A1 | 3/2004 | Inomata et al. | | 2006/0224895 A1 | 10/2006 | Mayer |
| 2004/0059779 A1 | 3/2004 | Philyaw | | 2006/0229940 A1 | 10/2006 | Grossman |
| 2004/0064453 A1 | 4/2004 | Ruiz et al. | | 2006/0239579 A1 | 10/2006 | Ritter |
| 2004/0068483 A1 | 4/2004 | Sakurai et al. | | 2006/0256371 A1 | 11/2006 | King et al. |
| 2004/0073708 A1 | 4/2004 | Warnock | | 2006/0259783 A1 | 11/2006 | Work et al. |
| 2004/0073874 A1 | 4/2004 | Poibeau et al. | | 2007/0005570 A1 | 1/2007 | Hurst-Hiller et al. |
| 2004/0075686 A1 | 4/2004 | Watler et al. | | 2007/0009245 A1 | 1/2007 | Ito |
| 2004/0078749 A1 | 4/2004 | Hull et al. | | 2007/0061146 A1 | 3/2007 | Jaramillo et al. |
| 2004/0098165 A1 | 5/2004 | Butikofer | | 2007/0099636 A1 | 5/2007 | Roth |
| 2004/0121815 A1 | 6/2004 | Fournier et al. | | 2007/0170248 A1 | 7/2007 | Brundage et al. |
| 2004/0122811 A1 | 6/2004 | Page | | 2007/0173266 A1 | 7/2007 | Barnes, Jr. |
| 2004/0128514 A1 | 7/2004 | Rhoads | | 2007/0208561 A1 | 9/2007 | Choi et al. |
| 2004/0139400 A1 | 7/2004 | Allam et al. | | 2007/0208732 A1 | 9/2007 | Flowers et al. |
| 2004/0158492 A1 | 8/2004 | Lopez et al. | | 2007/0233806 A1 | 10/2007 | Asadi |
| 2004/0181688 A1 | 9/2004 | Wittkotter | | 2007/0238076 A1 | 10/2007 | Burstein et al. |
| 2004/0186766 A1 | 9/2004 | Fellenstein et al. | | 2007/0249406 A1 | 10/2007 | Andreasson |
| 2004/0186859 A1 | 9/2004 | Butcher | | 2007/0279711 A1 | 12/2007 | King et al. |
| 2004/0193488 A1 | 9/2004 | Khoo et al. | | 2007/0300142 A1 | 12/2007 | King et al. |
| 2004/0199615 A1 | 10/2004 | Philyaw | | 2008/0046417 A1 | 2/2008 | Jeffery et al. |
| 2004/0205534 A1 | 10/2004 | Koelle | | 2008/0071775 A1 | 3/2008 | Gross |
| 2004/0206809 A1 | 10/2004 | Wood et al. | | 2008/0072134 A1 | 3/2008 | Balakrishnan et al. |
| 2004/0208369 A1 | 10/2004 | Nakayama | | 2008/0082903 A1 | 4/2008 | McCurdy et al. |
| 2004/0208372 A1 | 10/2004 | Boncyk et al. | | 2008/0091954 A1 | 4/2008 | Morris et al. |
| 2004/0210943 A1 | 10/2004 | Philyaw | | 2008/0137971 A1 | 6/2008 | King et al. |
| 2004/0217160 A1 | 11/2004 | Silverbrook et al. | | 2008/0141117 A1 | 6/2008 | King et al. |
| 2004/0220975 A1 | 11/2004 | Carpentier et al. | | 2008/0170674 A1 | 7/2008 | Ozden et al. |
| 2004/0229194 A1 | 11/2004 | Yang | | 2008/0172365 A1 | 7/2008 | Ozden et al. |
| 2004/0230837 A1 | 11/2004 | Philyaw et al. | | 2008/0177825 A1 | 7/2008 | Dubinko et al. |
| 2004/0243601 A1 | 12/2004 | Toshima | | 2008/0235093 A1 | 9/2008 | Uland |
| 2004/0250201 A1 | 12/2004 | Caspi | | 2008/0313172 A1 | 12/2008 | King et al. |
| 2004/0254795 A1 | 12/2004 | Fujii et al. | | 2009/0012806 A1 | 1/2009 | Ricordi et al. |
| 2004/0256454 A1 | 12/2004 | Kocher | | 2009/0077658 A1 | 3/2009 | King et al. |
| 2004/0258274 A1 | 12/2004 | Brundage et al. | | 2010/0092095 A1 | 4/2010 | King et al. |
| 2004/0258275 A1 | 12/2004 | Rhoads | | 2010/0177970 A1 | 7/2010 | King et al. |
| 2004/0260470 A1 | 12/2004 | Rast | | 2010/0182631 A1 | 7/2010 | King et al. |
| 2004/0260618 A1 | 12/2004 | Larson | | 2010/0183246 A1 | 7/2010 | King et al. |
| 2004/0267734 A1 | 12/2004 | Toshima | | 2010/0185538 A1 | 7/2010 | King et al. |
| 2004/0268237 A1 | 12/2004 | Jones et al. | | 2010/0278453 A1 | 11/2010 | King et al. |
| 2005/0005168 A1 | 1/2005 | Dick | | 2010/0318797 A1 | 12/2010 | King et al. |
| 2005/0033713 A1 | 2/2005 | Bala et al. | | 2011/0019020 A1 | 1/2011 | King et al. |
| 2005/0076095 A1 | 4/2005 | Mathew et al. | | 2011/0019919 A1 | 1/2011 | King et al. |

| | | | |
|---|---|---|---|
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0209191 A1 | 8/2011 | Shah |
| 2011/0295842 A1 | 12/2011 | King et al. |
| 2011/0299125 A1 | 12/2011 | King et al. |

FOREIGN PATENT DOCUMENTS

| | | |
|---|---|---|
| EP | 0544434 | 6/1993 |
| EP | 0596247 | 5/1994 |
| EP | 0697793 | 2/1996 |
| EP | 0887753 | 12/1998 |
| EP | 1054335 | 11/2000 |
| EP | 1087305 | 3/2001 |
| EP | 1141882 | 10/2001 |
| EP | 1318659 | 6/2003 |
| EP | 1398711 | 3/2004 |
| GB | 2366033 | 2/2002 |
| JP | 3260768 | 11/1991 |
| JP | 10-133847 | 5/1998 |
| JP | H11-213011 | 8/1999 |
| JP | 2001-345710 | 12/2001 |
| JP | 2003216631 | 7/2003 |
| JP | 2004-500635 | 1/2004 |
| JP | 2004-050722 | 2/2004 |
| KR | 10-2000-0054339 | 9/2000 |
| KR | 10-2000-0054268 | 10/2002 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | WO9803923 A1 | 1/1998 |
| WO | 00/56055 | 9/2000 |
| WO | WO-00/67091 | 11/2000 |
| WO | 01/03017 | 1/2001 |
| WO | 01/24051 | 4/2001 |
| WO | 01/33553 | 5/2001 |
| WO | WO-02/11446 A2 | 2/2002 |
| WO | 02/061730 | 8/2002 |
| WO | WO-02/091233 A2 | 11/2002 |
| WO | WO-2004/084109 | 9/2004 |
| WO | WO-2005/071665 A1 | 8/2005 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/029259 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/014255 | 1/2008 |
| WO | WO-2008/002074 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

Henseler, Dr. Hans, "Functional and Document Level Security in ZyIMAGE," Zylab, the Paper Filing Company, ZyIMAGE Security, Whitepaper, Apr. 9, 2004, 27 pgs, ZyLAB Technologies, B.V.

Jacobson et al., "The Last Book", IBM Systems Journal, vol. 36, No. 3, 1997, pp. 457-463.

Macholl, R., "Translation Pen Lacks Practicality," BYTE.com, Jan. 1998, 2 pages.

Nagy et al. "A Prototype Document Image Analysis System for Technical Journals," Computer, vol. 25, issue 7, Jul. 1992, pp. 10-22.

O'Gorman, "Image and Document Processing Techniques for the Right Pages Electronic Library System," 11th International Conference on Pattern Recognition, Aug. 30-Sep. 3, 1992, The Hague, The Netherlands, pp. 260-263, IEEE Computer Society Press, Los Alamitos, CA.

Pellissippi Library, NetLibrary, Skills Guide #4, Sep. 21, 2001, 9 pages.

Schuuring, D., "Best practices in e-discovery and e-disclosure," ZyLAB Information Access Solutions, White Paper, Feb. 17, 2006, 72 pgs, ZyLAB Distributing, B.V.

Sheridon et al., "The Gyricon—A Twisting Ball Display," Proceedings of the Society for Information Display, Third and Fourth Quarter, May 1977, pp. 289-293, Boston, MA.

Stifelman,Lisa J., "Augmenting Real-World Objects: A Paper-Based Audio Notebook," Proceedings of CHI '96, 1996, pp. 199-200.

Story et al. "The Right Pages Image-Based Electronic Library for Alerting and Browsing," Computer, vol. 25, No. 9, Sep. 1992, pp. 17-26.

The Festival Speech Synthesis System, www.cstr.ed.ac.uk/projects/festival downloaded on Jul. 25, 2000, 2 pages [internet accessed Jan. 4, 2008].

Toshifumi et al., "PaperLink: A Technique for Hyperlinking from Real Paper to Electronic Content," Proceedings of CHI 1997, pp. 1-13, CHI 97 Electronic Publications: Papers.

Whittaker et al., "Filochat: Handwritten Notes Provide Access to Recorded Conversations," Human Factors in Computing Systems, CHI '94 Conference Proceedings, Apr. 24-28, 1994, pp. 271-277, Boston Massachusetts.

Whittaker et al., "Using Cognitive Artifacts in the Design of Mulimodal Interfaces," AT&T Labs-Research, May 24, 2004, 63 pages.

Wilcox et al., "Dynomite: A Dynamically Organized Ink and Audio Notebook," Conference on Human Factors in Computing Systems, Jun. 3, 1998, 9 pages.

International Search Report for International Application No. PCT/US05/25732 mailed Dec. 5, 2005; Applicant: ExBiblio B.V., 9 pgs.

Press Release, "Abera Introduces Truly Portable & Wireless Color Scanners: Capture Images Anywhere in the World without Connection to PC," PR Newswire, Oct. 9, 2000, New York, http://proquest.umi.com/pgdweb?did=62278377&sid=5&Fmt=7&clientid=19649&RQT=309&VName=PQD, 3 pages.

U.S. Appl. No. 10/676,881, Lee et al.

U.S. Appl. No. 60/201,570, Bengston.

Agilent Technologies. "Agilent ADNK-2133 Optical Mouse Designer's Kit: Product Overview." 2004, 6 pp.

Airclic. "Products." http://www.airclic.com/products.asp, accessed Oct. 3, 2005, 3pp.

Arai, Toshifumi, Dietmar Aust, Scott E. Hudson. "Paperlink: A Technique for Hyperlinking From Real Paper to Electronic Content." *Proceedings of the ACM Conference on Human Factors in Computing Systems (CHI 97)*, Addison-Wesley, Apr. 1997, pp. 327-334.

Aust, Dietmar. "Augmenting Paper Documents with Digital Information in a Mobile Environment" MS Thesis, University of Dortmund, Department of Computer Graphics, 1996. 47pp.

Bai, Zhen-Long, and Qiang Huo "An Approach to Extracting the Target Text Line from a Document Image Captured by a Pen Scanner." *Proceedings of the Seventh International Conference on Document Analysis and Recognition (ICDAR 2003)*, 2003, 5 pp.

Bell, Timothy, Ian H. Witten, John G. Cleary. "Modeling for Text Compression." *ACM Computing Surveys*, vol. 21, No. 4, Dec. 1989, pp. 557-591.

Bentley, Jon L. and Robert Sedgewick. "Fast Algorithms for Sorting and Searching Strings." *Proceedings of the 10th ACM-SIAM Symposium on Discrete Algorithms*. New York, NY: ACM Press, 1997, pp. 360-369.

Burle Technical Memorandum. "Fiber Optics: Theory and Applications." http://www.burle.com/cgi-bin/byteserver.pl/pdf/100r.pdf, 19pp.

C Technologies AB. "CPEN User's Guide." Jan. 2001, 130pp.

C Technologies AB. "User's Guide for C-Pen 10." Aug. 2001, 128pp.

Capobianco, Robert A. "Design Considerations for: Optical Coupling of Flashlamps and Fiber Optics." PerkinElmer, 1998-2003. .http://optoelectronics.perkinelmer.com/content/whitepapers/OpticalCoupling.pdf, 12 pp.

CASIO Computer Co. Ltd, ALPS Electric Co., Ltd. "Alliance Agreement on Development and Mass Production of Fingerprint Scanner for Mobile Devices." Press Release, Feb. 25, 2003. http://world.casio.com/pacific/news/2003/fingerprint.html, 2pp.

Cenker, Christian. "Wavelet Packets and Optimization in Pattern Recognition." *Proceedings of the 21st International Workshop of the AAPR*, Hallstatt, Austria, May 1997, 11pp.

Clancy, Heather. "Cell Phones Get New Job: Portable Scanning." C/Net News.com, http://news.com.com/2102-1039_5572897.html?tag=st.util.print, Accessed Feb. 13, 2005, 3pp.

Cybertracker. Homepage. http://www.cybertracker.co.za/, accessed Oct. 3, 2005, 2pp.

Digital Convergence. "CueCat." www.cuecat.com, accessed Oct. 3, 2005, 2 pp.

Docuport "DocuPen Operating Manual." Montreal, Quebec, 2004, 48pp.

Doermann, David, Huiping Li, Omid Kia, Kemal Kilic. "The Detection of Duplicates in Document Image Databases." Technical Report. LAMP-TR-005/CAR-TR-850/CS-TR-3739, University of Maryland College Park, Feb. 1997, 39pp.

Doermann, David. "The Indexing and Retrieval of Document Images: A Survey." Technical Report. LAMP-TR-0013/CAR-TR-878/CS-TR-3876. University of Maryland College Park, Feb. 1998, 39 pp.

Doermann, David, J. Sauvola, H. Kauniskangas, C. Shin, M. Pietikäinen & A. Rosenfeld. "The Development of a General Framework for Intelligent Document Image Retrieval." *Series in Machine Perception and Artificial Intelligence*, vol. 29: Document Analysis Systems II. Washington DC: World Scientific Press, 1997, 28 pp.

Duong, Jean, Myriam Côté, Hubert Emptoz, Ching Y. Suen. "Extraction of Text Areas in Printed Document Images." *Proceedings of the 2001 ACM Symposium on Document Engineering*. New York, NY: ACM Press, 2001, pp. 157-164.

Erol, Berna, Jonathan J. Hull, and Dar-Shyang Lee. "Linking Multimedia Presentations with their Symbolic Source Documents: Algorithm and Applications." *ACM Multimedia*. New York, NY: ACM Press, 2003, 10pp.

Fall, C.J., A Törcsvári, K. Benzineb, G. Karetka. "Automated Categorization in the International Patent Classification." *ACM SIGIR Forum*. vol. 37, Issue 1, Spring 2003: 10-25.

Ficstar. Homepage. www.ficstar.com, accessed Oct. 4, 2005, 1 p.

Fitzgibbon, Andrew, and Ehud Reiter. "Memories for Life: Managing Information Over a Human Lifetime." UK Computing Research Committee's Grand Challenges in Computing Workshop, May 22, 2003. 8pp.

Ghani, Rayid, Rosie Jones, and Dunja Mladenić. "Mining the Web to Create Minority Language Corpora." Proceedings of the 10th International Conference on Information and Knowledge Management (CIKM). Atlanta, Georgia, Nov. 5-10, 2001, pp. 279-286.

Google. "Google Search Appliance—Intranets." http://www.google.com/appliance/pdf/ds_GSA_intranets.pdf, 2004, 2 pp.

Google. "Simplicity and Enterprise Search.". 2003 http://www.google.com/enterprise/pdf/google_simplicity_enterprise_wp.pdf, 7pp.

Graham, Jamey, Berna Erol, Jonathan J. Hull, and Dar-Shyang Lee. "The Video Paper Multimedia Playback System." *Proceedings of the Eleventh ACM International Conference on Multimedia*. New York, NY: ACM Press, 2003, pp. 94-95.

Grossman, David A, Ophir Frieder, Nazli Goharian "Token Identification" Slideshow. 2002, 15 pp.

Guimbretière, François. "Paper Augmented Digital Documents." *Proceedings of Annual ACM Symposium on User Interface Software and Technology*. New York, NY: ACM Press, 2003, 10pp.

Hand Held Products "The HHP Imageteam (IT) 4410 and 4410ESD." Brochure, 2pp.

Hansen, Jesse. "A Matlab Project in Optical Character Recognition (OCR)." DSP Lab, University of Rhode Island. May 15, 2002, 6pp.

Heiner, Jeremy M., Scott E. Hudson, Kenichiro Tanaka. "Linking and Messaging from Real Paper in the Paper PDA." *ACM Symposium on User Interface Software and Technology*. New York, NY: ACM Press, 1999, pp. 179-186.

Hewlett-Packard Company. "HP Capshare 920 Portable E-Copier and Information Appliance User Guide, First Edition," 1999, 42 pp.

Hjaltason, Gisli R. and Hanan Samet. "Distance Browsing in Spatial Databases." *ACM Transactions on Database Systems*. vol. 24, No. 2, Jun. 1999: 265-318.

Hong, Tao and Jonathan H. Hull. "Degraded Text Recognition Using Word Collocation and Visual Inter-Word Constraints." *Fourth ACL Conference on Applied Natural Language Processing*, Stuttgart, Germany, 1994, 2pp.

Hopkins, George W., and Tad D. Simons. "A Semi-Imaging Light Pipe for Collecting Weakly Scattered Light." Hewlett Packard Company, Jun. 1998, 6 pp.

Hu, Jianying, Ramanujan Kashi, Gordon Wilfong, "Comparison and Classification of Documents Based on Layout Similarity." Lucent Technologies Bell Labs, Murray Hill, NJ, 2000, 21pp.

Hull, Jonathan J, and Dar-Shyang Lee. "Simultaneous Highlighting of Paper and Electronic Documents." *Proceedings of the International Conference on Pattern Recognition (ICPR '00)*, vol. 4. Barcelona, 2000, 4401-4404.

Hull, Jonathan J, Dar-Shyang Lee, John Cullen, Peter E. Hart. "Document Analysis Techniques for the Infinite Memory Multifunction Machine." DEXA Workshop, 1999. http://www.informatik.uni-trier.de/~ley/db/conf/dexaw/dexaw99.html, 5pp.

Inglis, Stuart and Ian H. Witten. "Compression-Based Template Matching." University of Waikato, Hamilton, New Zealand, 1994, 10 pp.

IPValue Management, Xerox Research Centre Europe. "Technology Licensing Opportunity: Xerox Mobile Camera Document Imaging." Slideshow, Mar. 1, 2004, 11pp.

IRIS. "IRIS Business Card Reader II." Brochure. 2 pp.

IRIS. "IRIS Pen Executive." Brochure, 2 pp.

ISRI Staff. "OCR Accuracy Produced by the Current DOE Document Conversion System." Technical Report Jun. 2002, Information Science Research Institute at the University of Nevada, Las Vegas. May 2002, 9pp.

Jainschigg, John and Richard "Zippy" Grigonis, "M-Commerce Alternatives," Communications Convergence.com, http://www.cconvergence.com/shared/article/showArticle.jhtml?articleId=8701069, May 7, 2001, 14pp.

Janesick, James. "Dueling Detectors." *Spie's OE Magazine*. Feb. 2002: 30-33.

Jenny, Reinhard. "Fundamentals of Fiber Optics: An Introduction for Beginners." Technical Report for Volpi AG, Apr. 26, 2000. http://www.volpiusa.com/whitepapers/FundamentalsofFiberOptics.pdf, 23pp.

Kahan, José and Marja-Riitta Koivunen. "Annotea: An Open RDF Infrastructure for Shared Web Annotations." Proceedings of the 10th International World Wide Web Conference, Hong Kong, 2001. http://www10.org/cdrom/papers/frame.html, pp. 623-632.

Kasabach, Chris, Chris Pacione, John Stivoric, Francine Gemperle, Dan Siewiorek. "Digital Ink: A Familiar Idea with Technological Might!" *CHI 1998 Conference*. New York, NY: ACM Press, 1998, pp. 175-176.

Keytronic. "F-SCAN-S001US Stand Alone Fingerprint Scanner." http://www.keytronic.com/home/shop/Productlist.asp?CATID=62&SubCATID=1, accessed Oct. 4, 2005, 2pp.

Khoubyari, Siamak. "The Application of Word Image Matching in Text Recognition." MS Thesis, State University of New York at Buffalo, Jun. 1992, 107pp.

Kia, Omid and David Doerman. "Integrated Segmentation and Clustering for Enhanced Compression of Document Images." International Conference on Document Analysis and Recognition, Ulm Germany Aug. 18-20, 1997 vol. 1. 6 pp.

Kia, Omid E. "Document Image Compression and Analysis." PhD Thesis, University of Maryland at College Park, 1997, 141pp.

Kia, Omid, David Doerman, Azriel Rosenfeld, Rama Chellappa. "Symbolic Compression and Processing of Document Images." Technical Report: LAMP-TR-004/CFAR-TR-849/CS-TR-3734, University of Maryland, College Park, Jan. 1997, 36pp.

Kia, Omid. "Integrated Segmentation and Clustering for Enhanced Compression of Document Images." International Conference on Document Analysis and Recognition, Ulm, Germany, Aug. 18-20, 1997, 7pp.

Kopec, Gary E. "Multilevel Character Templates for Document Image Decoding." IS&T/SPIE 1997 International Symposium on Electronic Imaging: Science & Technology, San Jose, CA, Feb. 8-14, 1997, 10pp.

Kopec, Gary E., Maya R. Said, Kris Popat. "N-Gram Language Models for Document Image Decoding." *Proceedings of IS&T/SPIE Electronics Imaging 2002: Document Recognition and Retrieval IX*, vol. 4670-20, Jan. 2002. 12pp.

Kukich, Karen. "Techniques for Automatically Correcting Words in Text." *ACM Computing Surveys*, vol. 24, No. 4, Dec. 1992: pp. 377-439.

Lee, Bongsoo, Won Y. Choi, James K. Walker. "Ultrahigh-Resolution Plastic Graded-index fused Image Plates." *Optics Letters*, vol. 24, No. 10, May 15, 2000: 719-721.

Lee, D.L, and F.H. Lochovsky. "Voice Response Systems." *ACM Computing Surveys*, vol. 15, Issue 4, Dec. 1983: pp. 351-374.

Lee, Dar-Shyang and Jonathan J. Hull. "Detecting Duplicates Among Symbolically Compressed Images in a Large Document Database." *Pattern Recognition Letters*, No. 22, 2001: 545-550.

Lee, Dar-Shyang and Jonathan J. Hull. "Duplicate Detection for Symbolically Compressed Documents." Fifth International Conference on Document Analysis and Recognition (ICDAR), 1999, 4pp.

Lee, Dar-Shyang. "Substitution Deciphering Based on HMMs with Applications to Compressed Document Processing." *IEEE Transactions on Pattern Analysis and Machine Intelligence*, vol. 24, No. 12.. Washington DC: IEEE Computer Society, Dec. 2002, pp. 1661-1666.

Lesher, G.W., Moulton, B.J. & Higginbotham, D.J. (1999) "Effects of Ngram Order and Training Text Size on Word Prediction." Proceedings of the RESNA '99 Annual Conference, 1999, 3pp.

Lieberman, Henry. "Out of Many, One: Reliable Results from Unreliable Recognition." ACM Conference on Human Factors in Computing Systems (CHI 2002); Apr. 20-25, 2000; Minneapolis; MN; 2 pp.

Lightsource Picture.

Liu, Lon-Mu, Yair M. Babad, Wei Sun, and Ki-Kan Chan. "Adaptive Post-Processing of OCR Text Via Knowledge Acquisition." *Proceedings of the ACM 1991 Computer Science Conference*. New York, NY: ACM Press, 1991, pp. 558-569.

Ljungstrand, Peter, Johan Redström, and Lars Erik Holmquist. "Webstickers: Using Physical Tokens to Access, Manage, and Share Bookmarks to the Web." Proceedings of Designing Augmented Reality Environments 2000, Elsinore, Denmark, Apr. 12-14, 2000, pp. 23-31.

LTI Computer Vision Library "LTI Image Processing Library Developer's Guide. Version Oct. 29, 2003." Aachen, Germany, 2002, 45 pp.

Manolescu, Dragos-Anton. "Feature Extraction—A Pattern for Information Retrieval" *Proceedings of the 5th Pattern Languages of Programming*, Monticello, Illinois, Aug. 1998, 18pp.

McNamee, Paul, James Mayfield, Christine Piatko. "Haircut: A System for Multilingual Text Retrieval in Java." *Journal of Computing Sciences in Small Colleges*. vol. 17, Issue 2, Feb. 2002: 8-22.

Mind Like Water. "Collection Creator." www.collectioncreator.com, accessed Oct. 2, 2005, 3pp.

Muddu, Prashant. "A Study of Image Transmission Through a Fiber-Optic Conduit and its Enhancement Using Digital Image Processing Techniques." Thesis, Florida State College of Engineering, Nov. 18, 2003, 93 pp.

Munich, Mario E, and Pietro Perona. "Visual Input for Pen-Based Computers." *Proceedings of the International Conference on Pattern Recognition (ICPR '96)* vol. III. Los Alamitos, CA: IEEE CS Press. Jun. 1996, 5pp.

Murdoch, Gregary and Nicholas Kushmerick. "Mapping Physical Artifacts to their Web Counterparts: A Case Study with Products Catalogs." MHCI-2004 Workshop on Mobile and Ubiquitous Information Access (Strathclyde, UK). 2004, 7pp.

Nabeshima, Shinji, Shinichirou Yamamoto, Kiyoshi Agusa, Toshio Taguchi. "Memo-Pen: A New Input Device." *CHI '95 Proceedings Short Papers*. New York, NY: ACM Press, 1995, pp. 256-257.

Nautilus Hyosung. "New Software for Automated Teller Machines." http://www.nautilus.hyosung.com/product_service/software_software05.html, accessed Oct. 4, 2005, 3pp.

Neomedia Technologies "Paperclick for Cellphones." 2004. brochure 2pp.

Neomedia Technologies "Paperclick Linking Services." Brochure. 2004, 1 page.

Neomedia Technologies. "For Wireless Communication Providers." Brochure. 2004, 1 page.

Neville, Sean. "Project Atom, Amazon, Mobile Web Services, and Fireflies at REST" Artima Weblogs, http://www.artima.com/weblogs/viewpost.jsp?thread=18731, Oct. 24, 2003, 4pp.

Newman, William and Pierre Wellner. "A Desk Supporting Computer-based Interaction with Paper Documents." *Proceedings of ACM CHI'92 Conference on Human Factors in Computing Systems*. New York, NY: ACM Press, 1992, pp. 587-592.

Newman, William. "Document DNA: Camera Image Processing." 4pp.

NSG America, Inc. "SELFOC Lens Arrays for Line Scanning Applications." *Intelligent Opto Sensor Designer's Notebook*, No. 2, 5 pp.

ONClick Corporation. "VIA Mouse VIA-251." Brochure, 2pp.

Pal, U. S. Sinha, and B.B. Chaudhuri. "Multi-Oriented Text Lines Detection and Their Skew Estimation." Indian Conference on Computer Vision, Graphics, and Image Processing, Ahmedabad, India, Dec. 16-18, 2002, 6pp.

Peacocks MD&B. "Peacocks MD&B, Releases Latest hands and Eyes Free Voice Recognition Barcode Scanner." http://www.peacocks.com.au/store/page.pl?id=457, Dec. 5, 2004, 2pp.

Peterson, James L. "Detecting and Correcting Spelling Errors." *Communications of the ACM*, vol. 23 No. 12, Dec. 1980, pp. 676-687.

Planon Systems Solutions. "Docupen 700." www.docupen.com, accesssed Oct. 3, 2005.

Podio, Fernando L. "Biometrics—Technologies for Highly Secure Personal Authentication," National Institute of Standards and Technology, http://whitepapers.zdnet.com/search.aspx?compid=3968, May 2001, 8pp.

Precise Biometrics. "Precise 200 MC." http://www.precisebiometrics.com/data/content/DOCUMENTS/200592691619553200%20MC.pdf. accessed Oct. 4, 2005, 2pp.

Price, Morgan N, Gene Golovchinsky, Bill N. Schilit. "Linking by Inking: Trailblazing in a Paper-like Hypertext." *Proceedings of Hypertext '98*. Pittsburgh, PA: ACM Press, 1998, 10 pp.

Psion Teklogix. "Workabout Pro." http://www.psionteklogix.com/public.aspx?s=uk&p=Products&pCat=128&pID=1058, accessed Oct. 3, 2005, 2pp.

Rao, Ramana, Stuart K. Card, Walter Johnson, Leigh Klotz, and Randall H. Trigg. "Protofoil: Storing and Finding the Information Worker's Paper Documents in an Electronic File Cabinet." *Proceedings of the ACM SIGCHI Conference on Human Factors in Computing Systems.* New York, NY: ACM Press, 1994, pp. 180-185, 477.

Roberts, David A. and Richard R.A. Syms. "1D and 2D Laser Line Scan Generation Using a Fibre Optic Resonant Scanner." Department of Electrical and Electrical Engineering, Imperial College of Science Technology and Medicine, 2003, 11pp.

Rus, Daniela, and Devika Subramanian. "Multi-media RISSC Informatics: Retrieving Information with Simple Structural Components." *Proceedings of the Second International Conference on Information and Knowledge Management.* New York, NY: 1993, pp. 283-294.

Samet, Hanan. "Data Structures for Quadtree Approximation and Compression." *Communications of the ACM*, vol. 28, No. 9, September 1985: pp. 973-993.

Sanderson, Mark and C.J. Van Rijsbergen. "The Impact on Retrieval Effectiveness of Skewed Frequency Distributions." *ACM Transactions on Information Systems*, vol. 17, No. 4, Oct. 1999: pp. 440-465.

Schilit, Bill N. Gene Golovchinsky, Morgan N. Price. "Beyond Paper: Supporting Active Reading with Free Form Digital Ink Annotations." *Proceedings of CHI 98.* new York, NY: ACM Press, 1998, 8pp.

Schott North America, "Clad Rod/ Image Conduit" Nov. 2004, 1 page.

Selberg, Erik, and Oren Etzioni. "On the Instability of Web Search Engines." In the Proceedings of RIAO, Paris, Apr. 2000, 14pp.

Smithwick, Quinn Y. J., Juris Vagners, Per G. Reinhall, Eric J. Seibel. "54.3: Modeling and Control of the Resonant Fiber Scanner for Laser Scanning Display or Acquisition." *SID Symposium Digest of Technical Papers*, vol. 34, Issue 1, May 2003: 1455-1457.

Sonka, Milan, Vaclav Hlavac, and Roger Boyle, *Image Processing, Analysis, and Machine Vision: (Second Edition).* International Thomson Publishing, 1998. Contents, Index, Preface, 37pp.

Sony. "Sony Puppy Fingerprint Identity Products." http://bssc.sel.sony.com/Professional/puppy/, 2002, 1 p.

Spitz, A. Lawrence. "Progress in Document Reconstruction." Document Recognition Technologies, Inc. 16th Internaional Conference on Pattern Recognition (ICPR '02), 2002, 4pp.

Spitz, A. Lawrence. "Shape-based Word Recognition." *International Journal on Document Analysis and Recognition*, Oct. 20, 1998, 13 pp.

Srihari, Sargur N., Jonathan J. Hull, and Ramesh Choudhari. "Integrating Diverse Knowledge Sources in Text Recognition." *ACM Transactions in Office Information Systems*. vol. 1, No. 1, Jan. 1983, pp. 68-87.

Stevens, Jacob, Andrew Gee, and Chris Dance. "Automatic Processing of Document Annotations." Xerox Research Centre Europe. http://www.bmva.ac.uk/bmvc/1998/pdf/p062.pdf, 1998, 11 pp.

Su, Guo-Dung J., Shi-Sheng Lee, and Ming C. Wu. "Optical Scanners Realized by Surface—Micromachined Vertical Torsion Mirror" *IEEE Photonics Technology Letters*, vol. 11, No. 5, May 1999, 3pp.

Syscan Imaging. "Travelscan 464." http://www.syscaninc.com/prod_ts_464.html, accessed Oct. 3, 2005, 2pp.

Taghva, Kazem, Julie Borsack, and Allen Condit. "Results of Applying Probabilistic IR to OCR Text." *Proceedings of the 17th Annual International ACM-SIGIR Conference on Research and Development in Information Retrieval.* New York, NY: Springer-Verlag New York, 1994, pp. 202-211.

Tan, Chew Lim, Sam Yuan Sung, Zhauhui Yum and Yi Xu. "Text Retrieval from Document Images Based on N-Gram Algorithm." PRICAI Workshop on Text and Web Mining, 2000. 2 pp.

Trusted Reviews. "Digital Pen Roundup." http://www.trustedreviews.com/article.aspx?art=183, Jan. 24, 2004. 5pp.

TYI Systems Ltd. "Bellus iPen." http://www.bellus.com.tw/pen_scanner.htm, accessed Oct. 3, 2005, 3pp.

U.S. Precision Lens, Inc. *The Handbook of Plastic Optics a User's Guide with Emphasis on Injection Molded Optics.* Cincinnati, Ohio: U.S. Precision Lens, Inc., 1983, 145pp.

Van Eijkelenborg, Martijn A. "Imaging with Microstructured Polymer Fibre." *Optics Express*, vol. 12, No. 2, Jan. 26, 2004, pp. 342-346.

Vervoort, Marco. "Emile 4.1.6 User Guide" University of Amsterdam, Jun. 12, 2003, 83 pp.

Vocollect. "Vocollect Voice for Handhelds." http://www.vocollect.com/offerings/voice_handhelds.php, accessed Oct. 3, 2005, 2pp.

Vossler, Charles M. and Neil M. Branston. "The Use of Context for Correcting Garbled English Text." Cornell Aeronautical Laboratory, Inc.. *Proceedings of the 1964 19th ACM National Conference.* NY, NY: ACM Press, 13 pp.

Wang, Jin, and Jack Jean. "Segmentation of Merged Characters by Neural Network and Shortest-Path." *Proceedings of the 1993 ACM/SIGAPP Symposium on Applied Computing: States of the Art and Practice.* New York, NY: ACM Press, 1993, pp. 762-769.

Wang, Wei-Chih, Mark Fauver, Jou Nhut Ho, Eric J. Siebel, Per G. Reinhall. "Micromachined Optical Waveguide Cantilever as a Resonant Optical Scanner." *Sensors and Actuators A (Physical)*, 102(1-2), 2002, pp. 165-175.

Wang, Yalin, Ihsin T. Phillips, and Robert M. Haralick. "A Study on the Document Zone Content Classification Problem." Proceedings of the 5th International Workshop on Document Analysis Systems. London: Springer-Verlag, 2002, 12pp.

WizCom Technologies Ltd. "QuickLink-Pen Elite." http://www.wizcomtech.com/Wizcom/products/product_info.asp?fid=101, Accessed Oct. 3, 2005, 2pp.

WizCom Technologies. "SuperPen Professional Product Page." http://www.wizcomtech.com/Wizcom/products/product_info.asp?fid=88&cp=1, accessed Oct. 3, 2005, 2pp.

Xerox "Patented Technology Could Turn Camera Phone Into Portable Scanner." Press release Nov. 15, 2004. http://www.xerox.com/go/xrx/template/inv_rel_newsroom.jsp?Xcntry=USA&Xlang=en_US&app=Newsroom&ed_name=NR_2004Nov15_MobileDocument_Imaging_Software&format=article&view=newsrelease&metrics=notrack, 2pp.

Hull, Jonathan and Dar-Shyang Lee, Simultaneous Highlighting of Paper and Electronic Documents, © 2000 IEEE, pp. 401-404.

PCT International Search Report for International Application No. PCT/US05/11017, date of mailing Jul. 15, 2008, 2 pages.

PCT International Search Report for International Application No. PCT/US05/11089, date of mailing Jul. 8, 2008, 3 pages.

Non-Final Office Action for U.S. Appl. No. 11/098,038, Mail Date Apr. 3, 2008, 11 pages.

Non-Final Office Action for U.S. Appl. No. 11/097,828, Mail Date May 22, 2008, 38 pages.

Non-Final Office Action for U.S. Appl. No. 11/098,014, Mail Date Jun. 18, 2008, 37 pages.

Non-Final Office Action for U.S. Appl. No. 11/097,833, Mail Date Jun. 25, 2008, 58 pages.

Non-Final Office Action for U.S. Appl. No. 11/097,836, Mail Date May 13, 2008, 56 pages.

Non-Final Office Action for U.S. Appl. No. 11/110,353, Mail Date Jun. 11, 2008, 24 pages.

Final Office Action for U.S. Appl. No. 11/097,835, Mail Date Jun. 23, 2008, 26 pages.

Final Office Action for U.S. Appl. No. 11/098,043, Mail Date Apr. 17, 2008, 45 pages.

Supplementary European Search Report for EP App. No. 05735008, dated Feb. 28, 2011.

U.S. Precision Lens, "The Handbook of Plastic Optics", 1983, $2^{nd}$ Edition.

European Search Report for EP Application No. 05731509 dated Apr. 23, 2009.

European Search Report for EP Application No. 05732913 dated Mar. 31, 2009.

European Search Report for EP Application No. 05733191 dated Apr. 23, 2009.

European Search Report for EP Application No. 05733819 dated Mar. 31, 2009.

European Search Report for EP Application No. 05733851 dated Sep. 2, 2009.

European Search Report for EP Application No. 05733915 dated Dec. 30, 2009.

European Search Report for EP Application No. 05734996 dated Mar. 23, 2009.

European Search Report for EP Application No. 05735008 dated Feb. 16, 2011.
European Search Report for EP Application No. 05737714 dated Mar. 31, 2009.
European Search Report for EP Application No. 05734796 dated Apr. 22, 2009.
European Search Report for EP Application No. 05734947 dated Mar. 20, 2009.
European Search Report for EP Application No. 05742065 dated Mar. 23, 2009.
European Search Report for EP Application No. 05745611 dated Mar. 23, 2009.
European Search Report for EP Application No. 05746428 dated Mar. 24, 2009.
European Search Report for EP Application No. 05746830 dated Mar. 23, 2009.
European Search Report for EP Application No. 05753019 dated Mar. 31, 2009.
European Search Report for EP Application No. 05789280 dated Mar. 23, 2009.
European Search Report for EP Application No. 05812073 dated Dec. 10, 2010.
European Search Report for EP Application No. 07813283 dated Dec. 10, 2010.
Fehrenbacher, Katie, "Quick Frucall Could Save You Pennies (Or $$$s)," Mobile, Startups, Web, http://gigaom.com/?p=6728&akst_action=share-this (Jul. 10, 2006).
Feldman, Susan, "The Answer Machine," The Magazine for Database Professional, 8(1):58 (Jan. 2000).
Computer Hope, "Creating a link without an underline in HTML:," as evidenced by Internet Archive Wayback Machine: http://web.archive.org/web/20010329222623/http://www.computerhope.com/iss- ues/ch000074.htm, Mar. 29, 2001.
Newman, et al. "Camworks: A Video-Based Tool for Efficient Capture from Paper Source Documents," Proceedings of the 1999 IEEE International Conferenceon Multimedia Computing and Systems, vol. 2, pp. 647-653 (1999).
International Search Report for PCT/EP2007/005038 dated Sep. 17, 2007.
International Search Report for PCT/EP2007/007824 dated May 25, 2009.
International Search Report for PCT/EP2007/008075 dated Oct. 10, 2008.
International Search Report for PCT/US2005/011012 dated Sep. 29, 2006.
International Search Report for PCT/US2005/011013 dated Oct. 19, 2007.
International Search Report for PCT/US2005/011014 dated May 16, 2007.
International Search Report for PCT/US2005/011015 dated Dec. 1, 2006.
International Search Report for PCT/US2005/011016 dated May 29, 2007.
International Search Report for PCT/US2005/011026 dated Jun. 11, 2007.
International Search Report for PCT/US2005/011042 dated Sep. 10, 2007.
International Search Report for PCT/US2005/011043 dated Sep. 20, 2007.
International Search Report for PCT/US2005/011084 dated Aug. 8, 2008.
International Search Report for PCT/US2005/011085 dated Sep. 14, 2006.
International Search Report for PCT/US2005/011088 dated Aug. 29, 2008.
International Search Report for PCT/US2005/011090 dated Sep. 27, 2006.
International Search Report for PCT/US2005/011533 dated Jun. 4, 2007.
International Search Report for PCT/US2005/011534 dated Nov. 9, 2006.
International Search Report for PCT/US2005/012510 dated Jan. 6, 2011.
International Search Report for PCT/US2005/013297 dated Aug. 14, 2007.
International Search Report for PCT/US2005/013586 dated Aug. 7, 2009.
International Search Report for PCT/US2005/017333 dated Jun. 4, 2007.
International Search Report for PCT/US2005/025732 dated Dec. 5, 2005.
International Search Report for PCT/US2005/029536 dated Apr. 19, 2007.
International Search Report for PCT/US2005/029537 dated Sep. 28, 2007.
International Search Report for PCT/US2005/029539 dated Sep. 29, 2008.
International Search Report for PCT/US2005/029680 dated Jul. 13, 2010.
International Search Report for PCT/US2005/030007 dated Mar. 11, 2008.
International Search Report for PCT/US2005/029534 dated May 15, 2007.
International Search Report for PCT/US2005/034319 dated Apr. 17, 2006.
International Search Report for PCT/US2005/034734 dated Apr. 4, 2006.
International Search Report for PCT/US2006/007108 dated Oct. 30, 2007.
International Search Report for PCT/US2006/018198 dated Sep. 25, 2007.
International Search Report for PCT/US2007/074214 dated Sep. 9, 2008.
International Search Report for PCT/US2010/000497 dated Sep. 27, 2010.
International Search Report for PCT/US2010/000498 dated Aug. 2, 2010.
International Search Report for PCT/US2010/000499 dated Aug. 31, 2010.
International Search Report for PCT/US2010/027254 dated Oct. 22, 2010.
International Search Report for PCT/US2010/027255 dated Nov. 16, 2010.
International Search Report for PCT/US2010/027256 dated Nov. 15, 2010.
International Search Report for PCT/US2010/028066 dated Oct. 26, 2010.
Ghaly et al., SAMS Teach Yourself EJB in 21 days, Sams Publishing, 2002-2003 (pp. 1-2, 123 and 135).
Sarre, et al. "HyperTex—A system for the automatic generation of Hypertext Textbooks from Linear Texts," Database and Expert Systems Applications, Proceedings of the International Conference, Abstract (1990).
Solutions Software Corp., "Environmental Code of Federal Regulations (CFRs) including TSCA and SARA," Solutions Software Corp., Enterprise, FL Abstract (Apr. 1994).
Non-Final Office Action for U.S. Appl. No. 11/004,637 dated Dec. 21, 2007.
Final Office Action for U.S. Appl. No. 11/004,637 dated Oct. 2, 2008.
Non-Final Office Action for U.S. Appl. No. 11/004,637 dated Apr. 2, 2009.
Notice of Allowance for U.S. Appl. No. 11/004,637 dated Dec. 11, 2009.
Non-Final Office Action for U.S. Appl. No. 11/096,704 dated Sep. 10, 2008.
Notice of Allowance for U.S. Appl. No. 11/096,704 dated Mar. 11, 2009.
Notice of Allowance for U.S. Appl. No. 11/096,704 dated Jun. 5, 2009.
Non-Final Office Action for U.S. Appl. No. 11/097,089 dated Aug. 13, 2008.
Final Office Action for U.S. Appl. No. 11/097,089 dated Mar. 17, 2009.
Non-Final Office Action for U.S. Appl. No. 11/097,089 dated Dec. 23, 2009.

Final Office Action for U.S. Appl. No. 11/097,089 dated Sep. 23, 2010.
Non-Final Office Action for U.S. Appl. No. 11/097,093 dated Jul. 10, 2007.
Non-Final Office Action for U.S. Appl. No. 11/097,103 dated Jun. 25, 2007.
Non-Final Office Action for U.S. Appl. No. 11/097,103 dated Jan. 28, 2008.
Non-Final Office Action for U.S. Appl. No. 11/097,103 dated Dec. 31, 2008.
Notice of Allowance for U.S. Appl. No. 11/097,103 dated May 14, 2009.
Final Office Action for U.S. Appl. No. 11/097,828 dated Feb. 4, 2009.
Notice of Allowance for U.S. Appl. No. 11/097,828 dated Feb. 5, 2010.
Final Office Action for U.S. Appl. No. 11/097,833 dated Jul. 7, 2009.
Notice of Allowance for U.S. Appl. No. 11/097,833 dated Jan. 10, 2011.
Non-Final Office Action for U.S. Appl. No. 11/097,835 dated Oct. 9, 2007.
Non-Final Office Action for U.S. Appl. No. 11/097,835 dated Feb. 19, 2009.
Final Office Action for U.S. Appl. No. 11/097,835 dated Dec. 29, 2009.
Notice of Allowance for U.S. Appl. No. 11/097,835 dated Sep. 1, 2010.
Final Office Action for U.S. Appl. No. 11/097,836 dated Jan. 6, 2009.
Non-Final Office Action for U.S. Appl. No. 11/097,836 dated Jul. 30, 2009.
Final Office Action for U.S. Appl. No. 11/097,836 dated May 13, 2010.
Non-Final Office Action for U.S. Appl. No. 11/097,961 dated Sep. 15, 2008.
Final Office Action for U.S. Appl. No. 11/097,961 dated Mar. 5, 2009.
Final Office Action for U.S. Appl. No. 11/097,961 dated Dec. 9, 2009.
Non-Final Office Action for U.S. Appl. No. 11/097,961 dated Jul. 9, 2010.
Non-Final Office Action for U.S. Appl. No. 11/097,981 dated Jan. 16, 2009.
Notice of Allowance for U.S. Appl. No. 11/097,981 dated Jul. 31, 2009.
Final Office Action for U.S. Appl. No. 11/098,014 dated Jan. 23, 2009.
Non-Final Office Action for U.S. Appl. No. 11/098,014 dated Jun. 30, 2009.
Non-Final Office Action for U.S. Appl. No. 11/098,014 dated Nov. 3, 2010.
Final Office Action for U.S. Appl. No. 11/098,014 dated Mar. 26, 2010.
Notice of Allowance for U.S. Appl. No. 11/098,014 dated Mar. 16, 2011.
Non-Final Office Action for U.S. Appl. No. 11/098,016 dated Apr. 24, 2007.
Notice of Allowance for U.S. Appl. No. 11/098,016 dated Apr. 22, 2008.
Non-Final Office Action for U.S. Appl. No. 11/098,038 dated Aug. 28, 2006.
Final Office Action for U.S. Appl. No. 11/098,038 dated Jun. 7, 2007.
Notice of Allowance for U.S. Appl. No. 11/098,038 dated Mar. 11, 2009.
Notice of Allowance for U.S. Appl. No. 11/098,038 dated May 29, 2009.
Non-Final Office Action for U.S. Appl. No. 11/098,042 dated Dec. 5, 2008.
Notice of Allowance for U.S. Appl. No. 11/098,042 dated Apr. 13, 2009.
Non-Final Office Action for U.S. Appl. No. 11/098,043 dated Jul. 23, 2007.
Non-Final Office Action for U.S. Appl. No. 11/098,043 dated Dec. 23, 2008.
Final Office Action for U.S. Appl. No. 11/098,043 dated Jul. 21, 2009.
Non-Final Office Action for U.S. Appl. No. 11/110,353 dated Jul. 27, 2007.
Final Office Action for U.S. Appl. No. 11/110,353 dated Jan. 6, 2009.
Non-Final Office Action for U.S. Appl. No. 11/110,353 dated Sep. 15, 2009.
Notice of Allowance for U.S. Appl. No. 11/110,353 dated Dec. 2, 2009.
Non-Final Office Action for U.S. Appl. No. 11/131,945 dated Jan. 8, 2009.
Notice of Allowance for U.S. Appl. No. 11/131,945 dated Oct. 30, 2009.
Non-Final Office Action for U.S. Appl. No. 11/185,908 dated Dec. 14, 2009.
Final Office Action for U.S. Appl. No. 11/185,908 dated Jun. 28, 2010.
Non-Final Office Action for U.S. Appl. No. 11/208,408 dated Oct. 7, 2008.
Final Office Action for U.S. Appl. No. 11/208,408 dated May 11, 2009.
Non-Final Office Action for U.S. Appl. No. 11/208,408 dated Apr. 23, 2010.
Non-Final Office Action for U.S. Appl. No. 11/208,457 dated Oct. 9, 2007.
Non-Final Office Action for U.S. Appl. No. 11/208,458 dated Mar. 21, 2007.
Notice of Allowance for U.S. Appl. No. 11/208,458 dated Jun. 2, 2008.
Non-Final Office Action for U.S. Appl. No. 11/208,461 dated Sep. 29, 2009.
Non-Final Office Action for U.S. Appl. No. 11/208,461 dated Nov. 3, 2010.
Notice of Allowance for U.S. Appl. No. 11/208,461 dated Mar. 15, 2011.
Non-Final Office Action for U.S. Appl. No. 11/209,333 dated Apr. 29, 2010.
Notice of Allowance for U.S. Appl. No. 11/210,260 dated Jan. 13, 2010.
Non-Final Office Action for U.S. Appl. No. 11/236,330 dated Dec. 2, 2009.
Notice of Allowance for U.S. Appl. No. 11/236,330 dated Jun. 22, 2010.
Non-Final Office Action for U.S. Appl. No. 11/236,440 dated Jan. 22, 2009.
Final Office Action for U.S. Appl. No. 11/236,440 dated Jul. 22, 2009.
Non-Final Office Action for U.S. Appl. No. 11/365,983 dated Jan. 26, 2010.
Final Office Action for U.S. Appl. No. 11/365,983 dated Sep. 14, 2010.
Non-Final Office Action for U.S. Appl. No. 11/547,835 dated Dec. 29, 2010.
Non-Final Office Action for U.S. Appl. No. 11/672,014 dated May 6, 2010.
Notice of Allowance for U.S. Appl. No. 11/672,014 dated Feb. 28, 2011.
Non-Final Office Action for U.S. Appl. No. 11/758,866 dated Jun. 14, 2010.
Non-Final Office Action for U.S. Appl. No. 11/972,562 dated Apr. 21, 2010.
Non-Final Office Action for U.S. Appl. No. 12/538,731 dated Jun. 28, 2010.
Notice of Allowance for U.S. Appl. No. 12/538,731 dated Oct. 18, 2010.
Non-Final Office Action for U.S. Appl. No. 12/541,891 dated Dec. 9, 2010.
Non-Final Office Action for U.S. Appl. No. 12/542,816 dated Jun. 18, 2010.
Notice of Allowance for U.S. Appl. No. 12/542,816 dated Jan. 3, 2011.
Non-Final Office Action for U.S. Appl. No. 12/721,456 dated Mar. 1, 2011.

D.P. Curtain, "Image Sensors—Capturing the Photograph," 2006, available at http://www.shortcourses.com/how/sensors/sensors.htm, (last visited Sep. 4, 2006).
King et al., U.S. Appl. No. 11/432,731, filed May 11, 2006.
King et al., U.S. Appl. No. 11/933,204, filed Oct. 21, 2007.
King et al., U.S. Appl. No. 11/952,885, filed Dec. 7, 2007.
King et al., U.S. Appl. No. 12/517,352, filed Jun. 2, 2009.
King et al., U.S. Appl. No. 12/517,541, filed Jun. 3, 2009.
King et al., U.S. Appl. No. 12/723,614, filed Mar. 12, 2010.
King et al., U.S. Appl. No. 12/728,144, filed Mar. 19, 2010.
King et al., U.S. Appl. No. 12/831,213, filed Jul. 6, 2010.
King et al., U.S. Appl. No. 12/884,139, filed Sep. 6, 2010.
King et al., U.S. Appl. No. 12/887,473, filed Sep. 21, 2010.
King et al., U.S. Appl. No. 12/889,321, filed Sep. 23, 2010.
King et al., U.S. Appl. No. 12/892,840, filed Sep. 28, 2010.
King et al., U.S. Appl. No. 12/894,059, filed Sep. 29, 2010.
King et al., U.S. Appl. No. 12/899,462, filed Oct. 6, 2010.
King et al., U.S. Appl. No. 12/902,081, filed Oct. 11, 2010.
King et al., U.S. Appl. No. 12/904,064, filed Oct. 13, 2010.
King et al., U.S. Appl. No. 12/961,407, filed Dec. 6, 2010.
King et al., U.S. Appl. No. 12/964,662, filed Dec. 9, 2010.
King et al., U.S. Appl. No. 13/031,316, filed Feb. 21, 2011.
Casey et al., "An Autonomous Reading Machine," IEEE Transactions on Computers, vol. C-17, No. 5, pp. 492-503 May 1968.
Brickman et al., "Word Autocorrelation Redundancy Match (WARM) Technology," IBM J. Res. Develop., 26 (6):681-686 (Jun. 1982).
Notice of Allowance for U.S. Appl. No. 12/542,816 dated Apr. 27, 2011.
Non-Final Office Action for U.S. Appl. No. 12/887,473 dated Feb. 4, 2011.
Non-Final Office Action for U.S. Appl. No. 12/889,321 dated Mar. 31, 2011.
Non-Final Office Action for U.S. Appl. No. 12/904,064 dated Mar. 30, 2011.
Bagley, et al., Editing Images of Text, Communications of the ACM, 37(12):63-72 (Dec. 1994).
King et al., U.S. Appl. No. 13/186,908, filed Jul. 20, 2011, all pages.
King et al., U.S. Appl. No. 13/253,632, filed Oct. 5, 2011, all pages.
Liddy, Elizabeth, "How a Search Engine Works," InfoToday.com, vol. 9, No. 5, May 2001, pp. 1-7.
Brin et al., "The Anatomy of a Large-Scale Hypertextual Web Search Engine," Computer Networks and ISDN Systems, vol. 30, Issue 1-7, Apr. 1, 1998, pp. 1-22.

* cited by examiner

DOCUMENT ENHANCEMENT SYSTEM AND METHOD

CROSS-REFERENCE TO RELATED APPLICATIONS

This application is a Continuation-In-Part of U.S. patent application Ser. No. 11/004,637 filed on Dec. 3, 2004 now U.S. Pat. No. 7,707,039, which is hereby incorporated by reference in its entirety.

This application is related to, and incorporates by reference in their entirety, the following U.S. Patent Applications, filed concurrently herewith: U.S. patent application Ser. No. 11/097,961, entitled METHODS AND SYSTEMS FOR INITIATING APPLICATION PROCESSES BY DATA CAPTURE FROM RENDERED DOCUMENTS, U.S. patent application Ser. No. 11/097,093, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, entitled CONTENT ACCESS WITH HANDHELD DOCUMENT DATA CAPTURE DEVICES, U.S. patent application Ser. No. 11/098,014, entitled SEARCH ENGINES AND SYSTEMS WITH HANDHELD DOCUMENT DATA CAPTURE DEVICES, U.S. patent application Ser. No. 11/097,103, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, entitled SEARCHING AND ACCESSING DOCUMENTS ON PRIVATE NETWORKS FOR USE WITH CAPTURES FROM RENDERED DOCUMENTS U.S. patent application Ser. No. 11/097,981, entitled INFORMATION GATHERING SYSTEM AND METHOD, U.S. patent application Ser. No. 11/097,835, entitled PUBLISHING TECHNIQUES FOR ADDING VALUE TO A RENDERED DOCUMENT, U.S. patent application Ser. No. 11/098,016, entitled ARCHIVE OF TEXT CAPTURES FROM RENDERED DOCUMENTS, U.S. patent application Ser. No. 11/097,828, entitled ADDING INFORMATION OR FUNCTIONALITY TO A RENDERED DOCUMENT VIA ASSOCIATION WITH AN ELECTRONIC COUNTERPART, U.S. patent application Ser No. 11/097,833, entitled AGGREGATE ANALYSIS OF TEXT CAPTURES PERFORMED BY MULTIPLE USERS FROM RENDERED DOCUMENTS, U.S. patent application Ser. No. 11/097,836, entitled ESTABLISHING AN INTERACTIVE ENVIRONMENT FOR RENDERED DOCUMENTS, U.S. patent application Ser. No. 11/098,042, entitled DATA CAPTURE FROM RENDERED DOCUMENTS USING HANDHELD DEVICE and U.S. patent application Ser. No. 11/096,704, entitled CAPTURING TEXT FROM RENDERED DOCUMENTS USING SUPPLEMENTAL INFORMATION This application claims priority to, and incorporates by reference in their entirety, the following U.S. Provisional Patent Applications: Application Ser. No. 60/559,226 filed on Apr. 1, 2004, application Ser. No. 60/558,893 filed on Apr. 1, 2004, application Ser. No. 60/558,968 filed on Apr. 1, 2004, application Ser. No. 60/558,867 filed on Apr. 1, 2004, application Ser. No. 60/559,278 filed on Apr. 1, 2004, application Ser. No. 60/559,279 filed on Apr. 1, 2004, application Ser. No. 60/559,265 filed on Apr. 1, 2004, application Ser. No. 60/559,277 filed on Apr. 1, 2004, application Ser. No. 60/558,969 filed on Apr. 1, 2004, application Ser. No. 60/558,892 filed on Apr. 1, 2004, application Ser. No. 60/558,760 filed on Apr. 1, 2004, application Ser. No. 60/558,717 filed on Apr. 1, 2004, application Ser. No. 60/558,499 filed on Apr. 1, 2004, application Ser. No. 60/558,370 filed on Apr. 1, 2004, application Ser. No. 60/558,789 filed on Apr. 1, 2004, application Ser. No. 60/558,791 filed on Apr. 1, 2004, application Ser. No. 60/558,527 filed on Apr. 1, 2004, application Ser. No. 60/559,125 filed on Apr. 2, 2004, application Ser. No. 60/558,909 filed on Apr. 2, 2004, application Ser No. 60/559,033 filed on Apr. 2, 2004, application Ser. No. 60/559,127 filed on Apr. 2, 2004, application Ser. No. 60/559,087 filed on Apr. 2, 2004, application Ser. No. 60/559,131 filed on Apr. 2, 2004, application Ser. No. 60/559,766 filed on Apr. 6, 2004, application Ser. No. 60/561,768 filed on Apr. 12, 2004, application Ser. No. 60/563,520 filed on Apr. 19, 2004, application Ser. No. 60/563,485 filed on Apr. 19, 2004, application Ser. No. 60/564,688 filed on Apr. 23, 2004, application Ser. No. 60/564,846 filed on Apr. 23, 2004, application Ser. No. 60/566,667, filed on Apr. 30, 2004, application Ser. No. 60/571,381 filed on May 14, 2004, application Ser. No. 60/571,560 filed on May 14, 2004, application Ser. No. 60/571,715 filed on May 17, 2004, application Ser. No. 60/589,203 filed on Jul. 19, 2004, application Ser. No. 60/589,201 filed on Jul. 19, 2004, application Ser. No. 60/589,202 filed on Jul. 19, 2004, application Ser. No. 60/598,821 filed on Aug. 2, 2004, application Ser. No. 60/602,956 filed on Aug. 18, 2004, application Ser. No. 60/602,925 filed on Aug. 18, 2004, application Ser. No. 60/602,947 filed on Aug. 18, 2004, application Ser. No. 60/602,897 filed on Aug. 18, 2004, application No. 60/602,896 filed on Aug. 18, 2004, application Ser. No. 60/602,930 filed on Aug. 18, 2004, application Ser. No. 60/602,898 filed on Aug. 18, 2004, application Ser. No. 60/603,466 filed on Aug. 19, 2004, application Ser. No. 60/603,082 filed on Aug. 19, 2004, application Ser. No. 60/603,081 filed on Aug. 19, 2004, application Ser. No. 60/603,498 filed on Aug. 20, 2004, application No. 60/603,358 filed on Aug. 20, 2004, application Ser. No. 60/604,103 filed on Aug. 23, 2004, application Ser. No. 60/604,098 filed on Aug. 23, 2004, application Ser. No. 60/604,100 filed on Aug. 23, 2004, application Ser. No. 60/604,102 filed on Aug. 23, 2004, application Ser. No. 60/605,229 filed on Aug. 27, 2004, application Ser. No. 60/605,105 filed on Aug. 27, 2004, application No. 60/613,243 filed on Sep. 27, 2004, application Ser. No. 60/613,628 filed on Sep. 27, 2004, application Ser. No. 60/613,632 filed on Sep. 27, 2004, application Ser. No. 60/613,589 filed on Sep. 27, 2004, application Ser. No. 60/613,242 filed on Sep. 27, 2004, application No. 60/613,602 filed on Sep. 27, 2004, application Ser. No. 60/613,340 filed on Sep. 27, 2004, application Ser. No. 60/613,634 filed on Sep. 27, 2004, application Ser. No. 60/613,461 filed on Sep. 27, 2004, application Ser. No. 60/613,455 filed on Sep. 27, 2004, application No. 60/613,460 filed on Sep. 27, 2004, application Ser. No. 60/613,400 filed on Sep. 27, 2004, application Ser. No. 60/613,456 filed on Sep. 27, 2004, application Ser. No. 60/613,341 filed on Sep. 27, 2004, application Ser. No. 60/613,361 filed on Sep. 27, 2004, application Ser. No. 60/613,454 filed on Sep. 27, 2004, application Ser. No. 60/613,339 filed on Sep. 27, 2004, application Ser. No. 60/613,633 filed on Sep. 27, 2004, application Ser. No. 60/615,378 filed on Oct. 1, 2004, application Ser. No. 60/615,112 filed on Oct. 1, 2004, application Ser. No. 60/615,538 filed on Oct. 1, 2004, application Ser. No. 60/617,122 filed on Oct. 7, 2004, application No. 60/622,906 filed on Oct. 28, 2004, application Ser. No. 60/633,452 filed on Dec. 6, 2004, application Ser. No. 60/633,678 filed on Dec. 6, 2004, application Ser. No. 60/633,486 filed on Dec. 6, 2004, application Ser. No. 60/633,453 filed on Dec. 6, 2004, application No. 60/634,627 filed on Dec. 9, 2004, application Ser. No. 60/634, 739 filed on Dec. 9, 2004, application Ser. No. 60/647,684 filed on Jan. 26, 2005, application Ser. No. 60/648,746 filed on Jan. 31, 2005, application Ser. No. 60/653,372 filed on Feb. 15, 2005, application Ser. No. 60/653,663 filed on Feb. 16, 2005, application Ser. No. 60/653,669 filed on Feb. 16, 2005, application No. 60/653,899 filed on Feb. 16, 2005, application Ser. No. 60/653,679 filed on Feb. 16, 2005, application Ser. No. 60/653,847 filed on Feb. 16, 2005, application Ser. No. 60/654,379 filed on Feb. 17, 2005, application Ser. No. 60/654,368 filed on Feb. 18, 2005, application No. 60/654,326 filed on Feb. 18, 2005, application Ser. No. 60/654,196 filed on Feb. 18, 2005, application Ser. No. 60/655,279 filed on Feb. 22, 2005, application Ser. No. 60/655,280 filed on Feb. 22, 2005, application Ser. No. 60/655,987 filed on Feb. 22, 2005, application Ser. No. 60/655,697 filed on Feb. 22, 2005, application Ser. No. 60/655,281 filed on Feb. 22, 2005, and application Ser. No. 60/657,309 filed on Feb. 28, 2005.

TECHNICAL FIELD

The described technology is directed to the field of document processing.

The present invention relates to the field of electronic data/information processing. More specifically, the present invention relates to methods and apparatuses for enhancing documents.

BACKGROUND

Paper documents have an enduring appeal, as can be seen by the proliferation of paper documents in the computer age. It has never been easier to print and publish paper documents than it is today. Paper documents prevail even though electronic documents are easier to duplicate, transmit, search and edit.

Given the popularity of paper documents and the advantages of electronic documents, it would be useful to combine the benefits of both.

DETAILED DESCRIPTION

Overview

Figure 1:
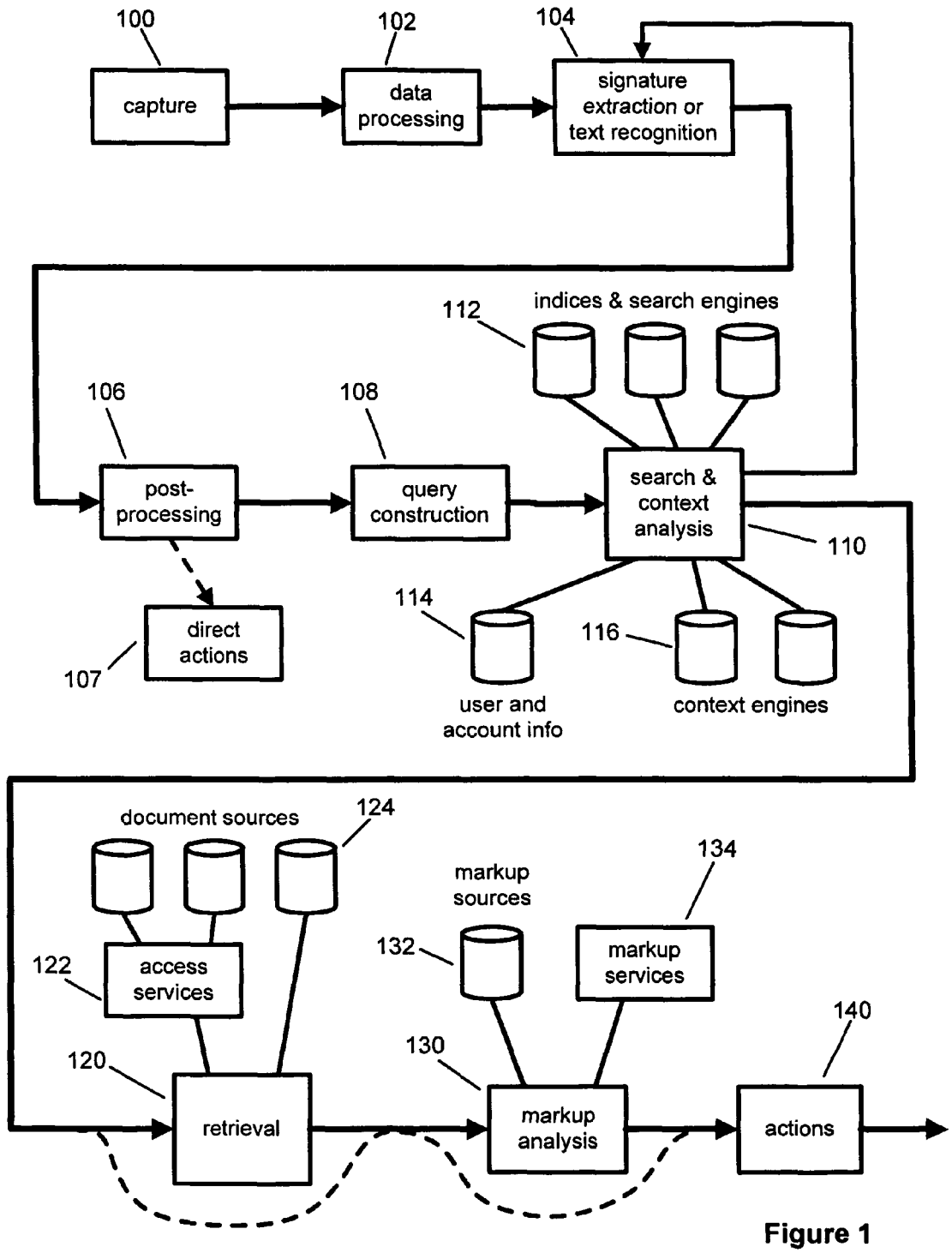
FIG. 1 is a data flow diagram that illustrates the flow of information in one embodiment of the core system.

In this description, reference is made to the accompanying drawings that form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Various embodiments include a user-friendly technique for filling forms (such as forms on paper, in catalogs, displayed on web pages, other dynamic displays, in advertisements, in books, in magazines, on signs and the like) using a graphical capture device (such as a scanner, digital camera, or other device capable of capturing at least a portion of the rendered form) or other devices. Embodiments may be practiced to engage in many forms of information gathering utilizing a device to interface with human and machine-readable materials.

In this description, various aspects of selected embodiments are described. However, it will be apparent to those of ordinary skill in the art and others that alternate embodiments may be practiced with only some or all of the aspects. For purposes of explanation, specific numbers, materials and configurations are set forth in order to provide a thorough understanding of the embodiments. However, it will be apparent to those of ordinary skill in the art and others that alternate embodiments may be practiced without the specific details. In other instances, well-known features are omitted or simplified in order not to obscure the illustrated embodiments.

Various operations may be described herein as multiple discreet steps in turn, in a manner that is helpful to understanding of the embodiments. However, the order of description should not be construed to imply that these operations are necessarily order dependent. In particular, these operations may not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Part I—Introduction

1. Nature of the System

For every paper document that has an electronic counterpart, there exists a discrete amount of information in the paper document that can identify the electronic counterpart. In some embodiments, the system uses a sample of text captured from a paper document, for example using a handheld scanner, to identify and locate an electronic counterpart of the document. In most cases, the amount of text needed by the facility is very small in that a few words of text from a document can often function as an identifier for the paper document and as a link to its electronic counterpart. In addition, the system may use those few words to identify not only the document, but also a location within the document.

Thus, paper documents and their digital counterparts can be associated in many useful ways using the system discussed herein.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audio-book version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor. It is a document that is perceptible to a human, whether in permanent form or on a transitory display.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, for example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup." The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
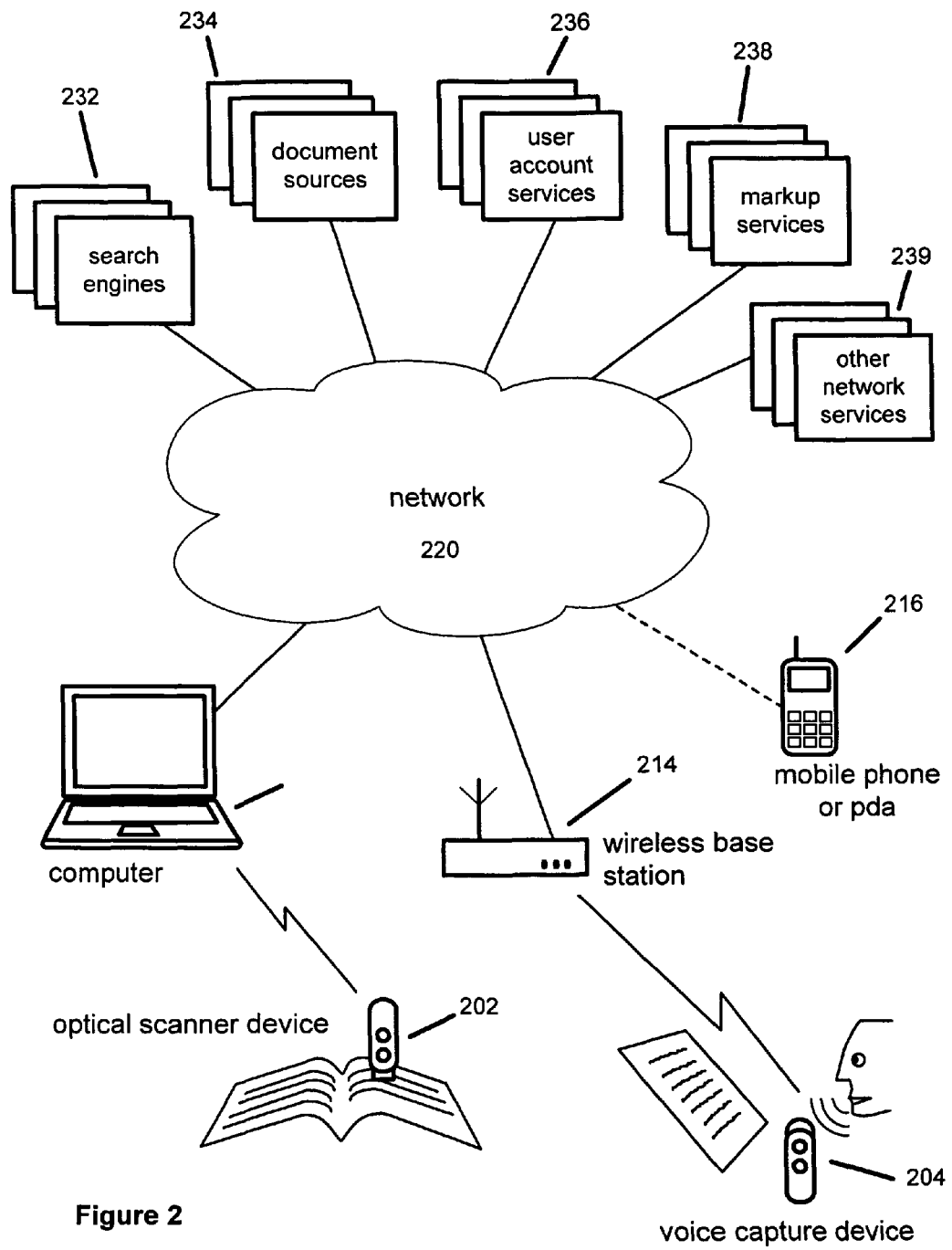
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc, from rendered documents. In addition to documents that have been printed on paper, in some embodiments, rendered documents include documents that have been displayed on a screen such as a CRT monitor or LCD display.

Figure 3:
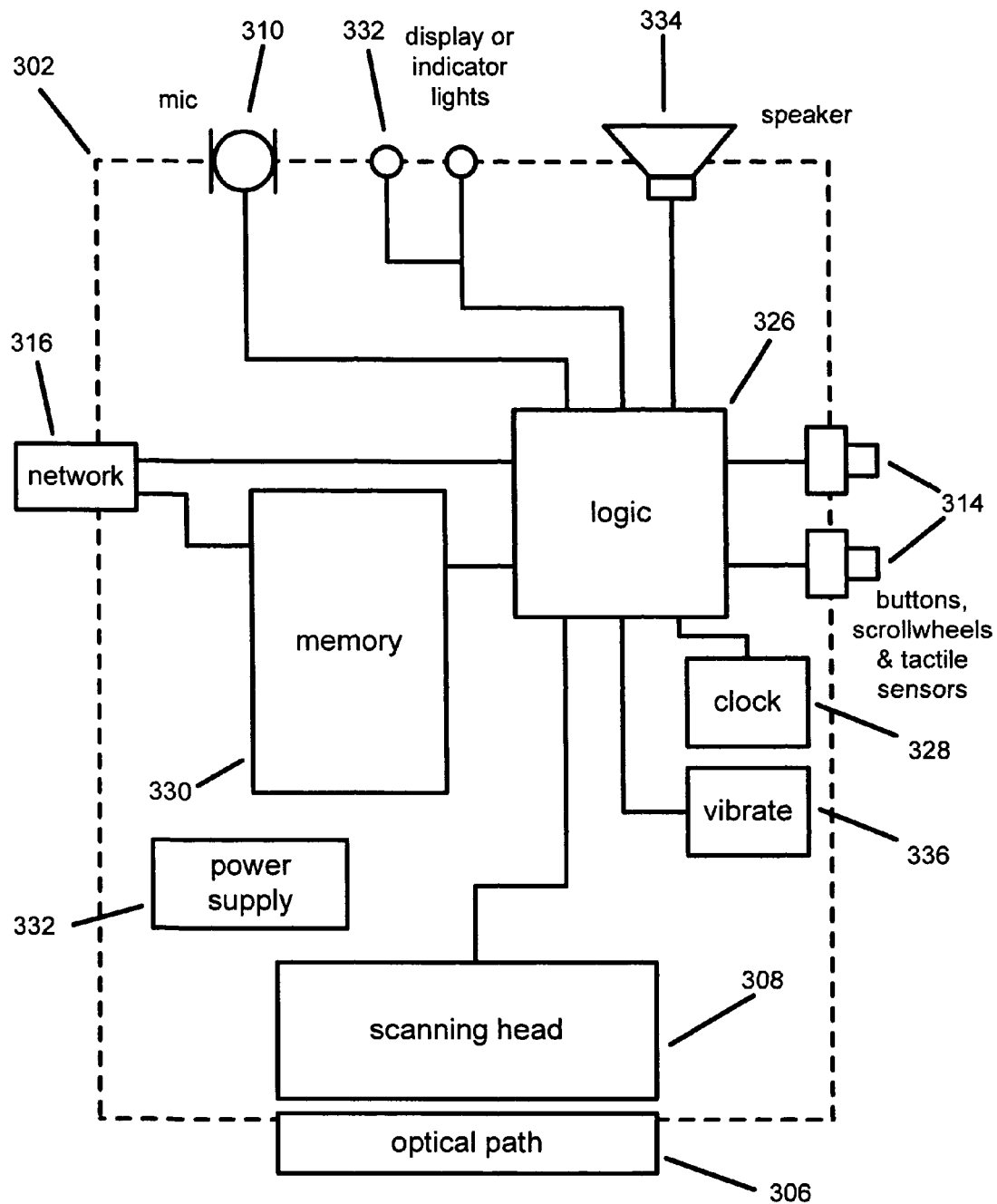
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308.

Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors etc)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, May Be Recorded and Acted on Later

If there are likely to be delays or cost associated with communicating a query or receiving the results, this pre-loaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge About the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, even each file on a user's hard disk. Indexes are published and subscribed to by users and by systems. It will be important, then, to construct indices that can be distributed, updated, merged and separated efficiently.

4.2. Handling the Queries

4.2.1. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document.

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the user's recent use of particular electronic documents. Such factors are referred to herein as "context."

Some of the context may be handled by the search engine itself, and be reflected in the search results. For example, the search engine may keep track of a user's scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup."

5.1. Overlays, Static and Dynamic

One way to think of the markup is as an "overlay" on the document, which provides further information about-and may specify actions associated with-the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-In" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations, Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on Other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . " The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity," where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result.

This stored history is beneficial for both the user and the system.

6.1.1. For the User

The user can be presented with a "Life Library," a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions.

6.2.1. Associate Scanner with Phone or Other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the facility for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce."

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g. "the second line of page 46."

7.5. Documents Which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their scanning of a printed copy owned by a friend who is a subscriber.

8.5. Replacing Photocopying with Scan-and-Print

The process of capturing text from a paper document, identifying an electronic original, and printing that original, or some portion of that original associated with the capture, forms an alternative to traditional photocopying with many advantages:

- the paper document need not be in the same location as the final printout, and in any case need not be there at the same time
- the wear and damage caused to documents by the photocopying process, especially to old, fragile and valuable documents, can be avoided
- the quality of the copy is typically be much higher
- records may be kept about which documents or portions of documents are the most frequently copied
- payment may be made to the copyright owner as part of the process
- unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics-this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the present invention are different; they employ a variety of methods that use the rendered text itself to assist in the recognition process. These embodiments use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents As has been noted earlier, a similar token-correlation process may be applied to speech fragments when the capture process consists of audio samples of spoken words.

9.7. Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f," etc. The OCR process is enhanced by use of this relationship to construct templates for letters that have not been scanned yet. For example, where a reader scans a short string of text from a paper document in a previously unencountered font such that the system does not have a set of image templates with which to compare the scanned images the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from Their Physical Printed Copies

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (When Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc. 11.2.4. Interpretation of Gestures and Mapping into Standard Actions In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-Standard) Iconic/Text Printed Menu Items In a similar way, certain items of text or other symbols may, when scanned, cause standard actions to occur, and the OS may provide a selection of these. An example might be that scanning the text "[print]" in any document would cause the OS to retrieve and print a copy of that document. The OS may also provide a way to register such actions and associate them with particular scans.

11.3. Support in System GUI Components for Typical Scan-Initiated Activities Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

- Saving the digital rendered version of every document printed along with information about the source from which it was printed
- Saving a subset of useful information about the printed version—for example, the fonts used and where the line breaks occur—which might aid future scan interpretation
- Saving the version of the source document associated with any printed copy
- Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. The most obvious types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:
- feedback on the scanning process—user scanning too fast, at too great an angle, or drifting too high or low on a particular line
- sufficient content—enough has been scanned to be pretty certain of finding a match if one exists—important for disconnected operation
- context known—a source of the text has been located
- unique context known—one unique source of the text has been located
- availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures."

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline." It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

- The details of the capture may be stored in the user's history. (Section 6.1)
- The document may be retrieved from local storage or a remote location. (Section 8)
- The operating system's metadata and other records associated with the document may be updated. (Section 11.1)
- Markup associated with the document may be examined to determine the next relevant operations. (Section 5)
- A software application may be started to edit, view or otherwise operate on the document. The choice of application may depend on the source document, or on the contents of the scan, or on some other aspect of the capture. (Section 11.2.2, 11.2.3)
- The application may scroll to, highlight, move the insertion point to, or otherwise indicate the location of the capture. (Section 11.3)
- The precise bounds of the captured text may be modified, for example to select whole words, sentences or paragraphs around the captured text. (Section 11.3.2)
- The user may be given the option to copy the capture text to the clipboard or perform other standard operating system or application-specific operations upon it.
- Annotations may be associated with the document or the captured text. These may come from immediate user input, or may have been captured earlier, for example in the case of voice annotations associated with an optical scan. (Section 19.4)
- Markup may be examined to determine a set of further possible operations for the user to select.

12.2.2. Contextual Popup Menus

Sometimes the appropriate action to be taken by the system will be obvious, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context," and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-world Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the Data-Stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club. p 14.5. Types of Data that may be Captured In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The SimpleScanner—a Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The SuperScanner—a High-End Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title and have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the facility to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with Other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:
- an existing peripheral such as a mouse, a stylus, a USB "webcam" camera, a Bluetooth™ headset or a remote control
- another processing/storage device, such as a PDA, an MP3 player, a voice recorder, a digital camera or a mobile phone
- other often-carried items, just for convenience—a watch, a piece of jewelry, a pen, a car key fob

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adaptor or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications 16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customer's credit card for the purchase. The Life Library service provider would get a percentage of the purchase price or a small fixed fee for facilitating the transaction.

The system can archive the document in the subscriber's personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified). Embodiments of the system can keep a copy of the source document in each subscriber's library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver," where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items scanned.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear," the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In one embodiment, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar," play a short audio clip that demonstrates the proper Spanish pronunciation, and display a complete list of the various conjugations of "hablar." In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customer's selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications

19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service provider's subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some embodiments, the system has a portable scanner that contains the user's information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help In Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet cafe, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System Details

In this description, reference is made to the accompanying drawings that form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Various embodiments include a user-friendly technique for filling forms (such as forms on paper, in catalogs, displayed on web pages, other dynamic displays, in advertisements, in books, in magazines, on signs and the like) using a graphical capture device (such as a scanner, digital camera, or other device capable of capturing at least a portion of the rendered form) or other devices. Embodiments may be practiced to engage in many forms of information gathering utilizing a device to interface with human and machine-readable materials.

In this description, various aspects of selected embodiments are described. However, it will be apparent to those of ordinary skill in the art and others that alternate embodiments may be practiced with only some or all of the aspects. For purposes of explanation, specific numbers, materials and configurations are set forth in order to provide a thorough understanding of the embodiments. However, it will be apparent to those of ordinary skill in the art and others that alternate embodiments may be practiced without the specific details. In other instances, well-known features are omitted or simplified in order not to obscure the illustrated embodiments.

Various operations may be described herein as multiple discreet steps in turn, in a manner that is helpful to understanding of the embodiments. However, the order of description should not be construed to imply that these operations are necessarily order dependent. In particular, these operations may not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Figure 4:
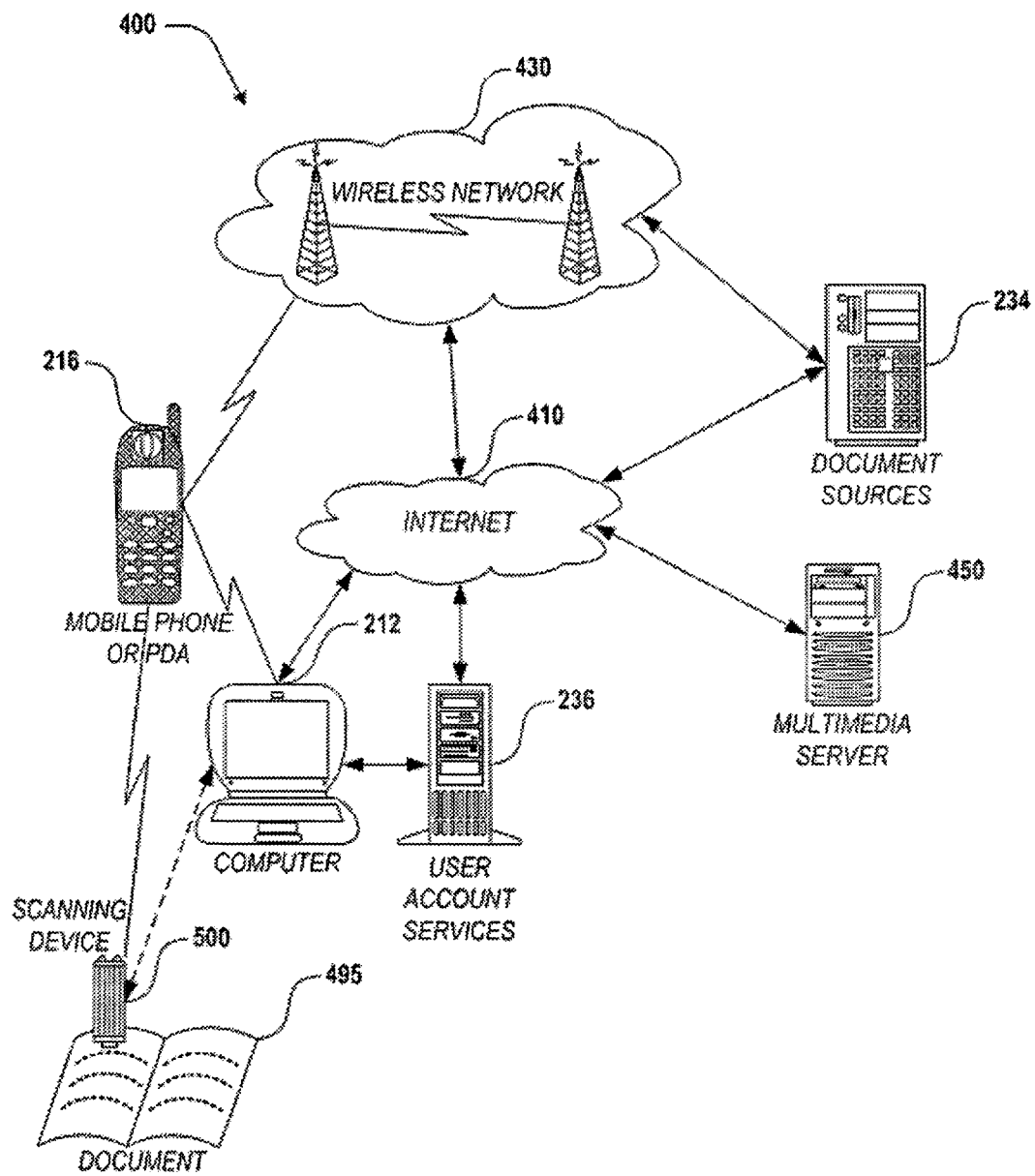
FIG. 4 illustrates a system view of an example operating environment suitable for use, in accordance with one embodiment.
Figure 5:
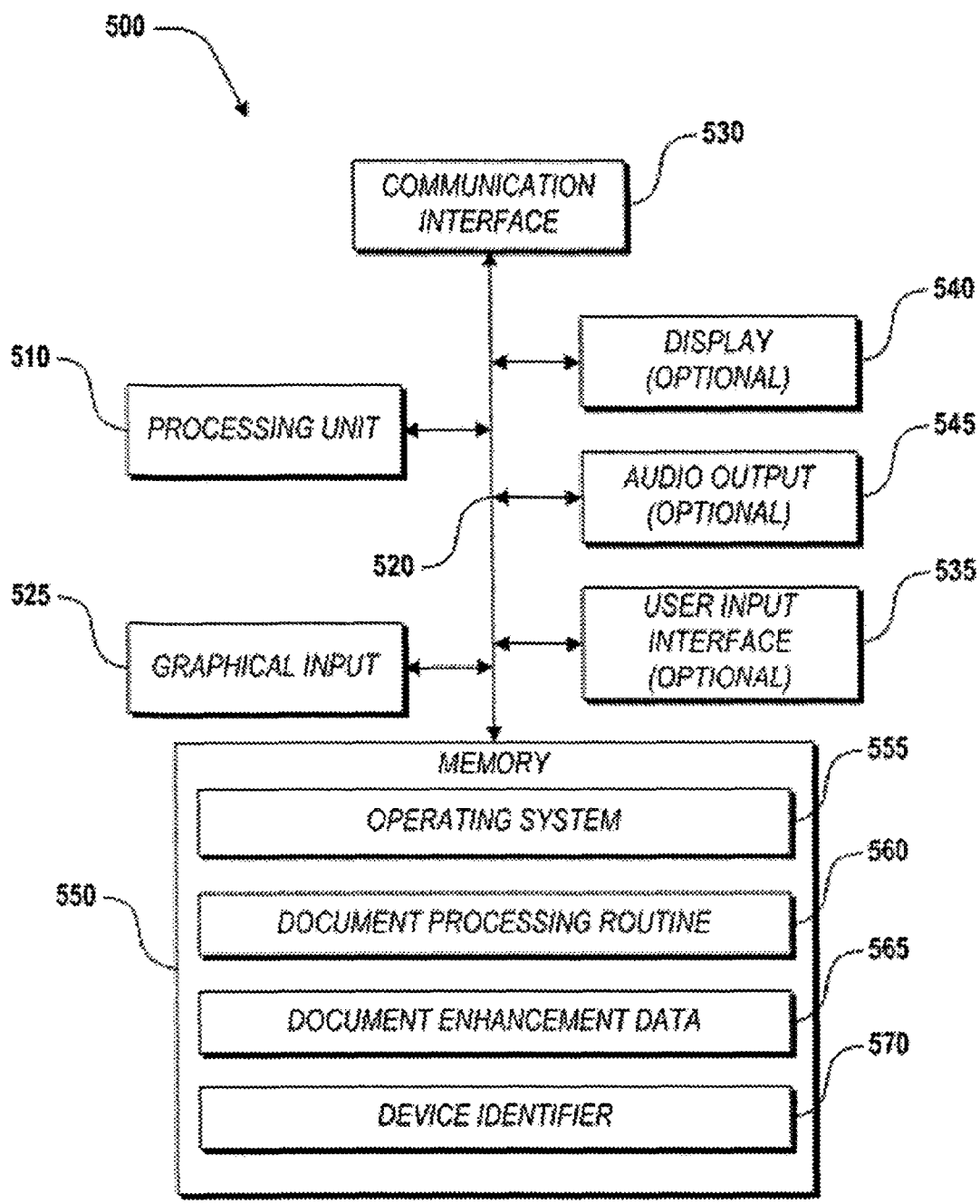
FIG. 5 illustrates an architectural view of a device suitable for use as a scanning device, in accordance with one embodiment.
Figure 6:
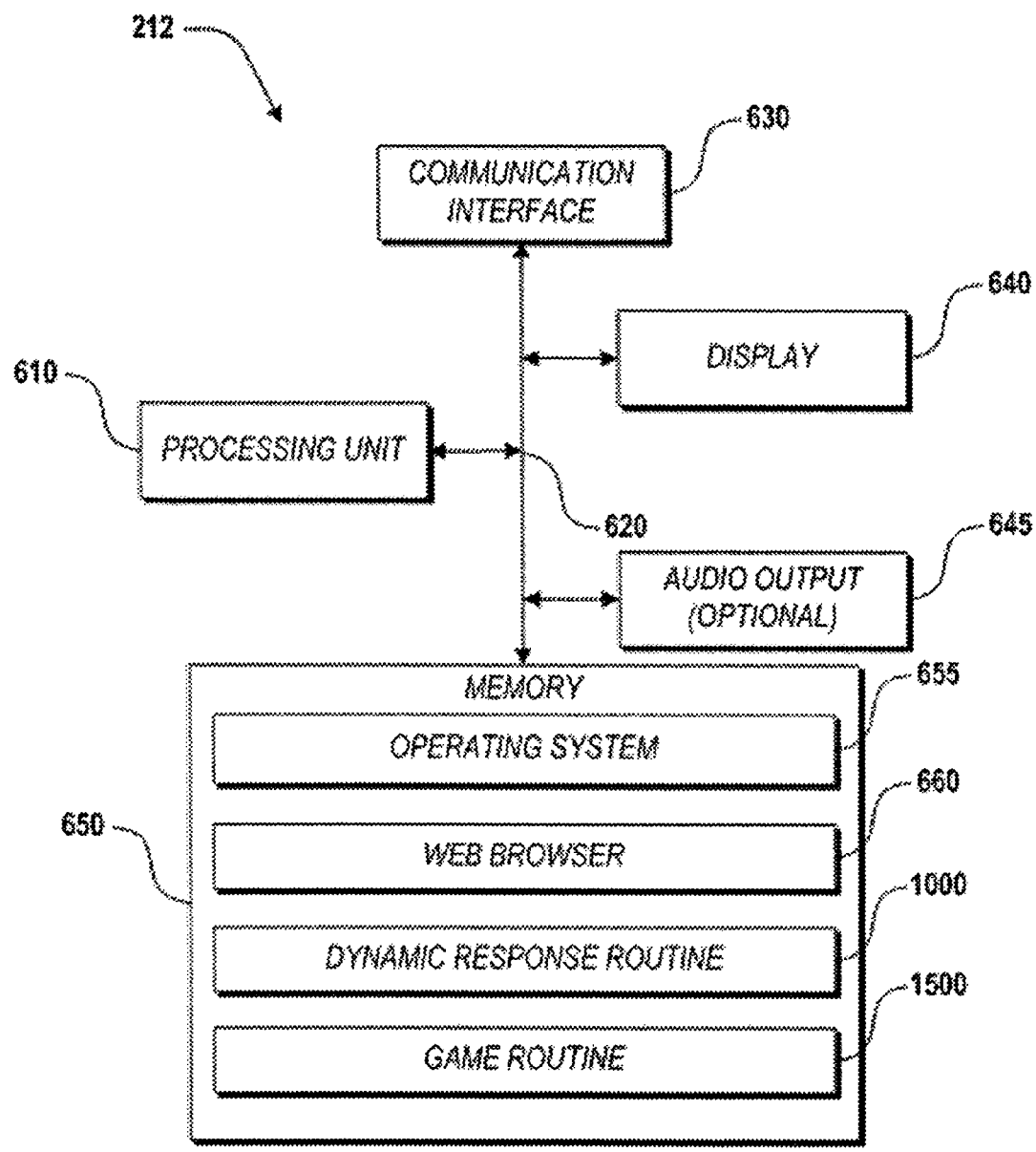
FIG. 6 illustrates an architectural view of a device suitable for use as a computer, in accordance with one embodiment.

Referring now to FIG. 4, wherein an overview of an alternate example operating environment in accordance with one embodiment, is shown. The operating environment may also be considered and/or referred to as a system or a cluster of systems. As illustrated, example operating environment of a document enhancement system 400 includes a scanning device 302, 500 (operative to graphically capture a portion of document 495), computer 212, mobile phone or PDA 210, document sources 234, user account services 236 and multimedia server 450 all interconnected via a network such as the Internet 410 and/or wireless network 430. In alternate embodiments, operating environment 400 may include more or less components. The devices of operating environment 400 may comprise a number of components. FIG. 5 illustrates one exemplary embodiment of a scanning device 302, 500, which is described below. Similarly, FIG. 6 illustrates one exemplary embodiment of a computer 212, which is described below. FIGS. 7-13 illustrate exemplary communication protocols and processes, for operating environment 400.

In various embodiments, the scanning device 302, 500, computer 212, mobile phone or PDA 210, user account services 236, document sources 234 and multimedia server 450 are coupled to each other wirelessly, i.e., they are members of a wireless network 430. In other embodiments, the scanning device 302, 500, computer 212, mobile phone or PDA 210, user account services 236, document sources 234 and multimedia server 450 are coupled to each other as members of a wire-based or mixed wireless and wire-based network (e.g., as in the Internet 410). Regardless of the manner the devices are coupled to each other, for various embodiments, scanning device 302, 500, computer 212, mobile phone or PDA 210, user account services 236, document sources 234 and multimedia server 450 are each equipped to operate in accordance with at least one communication transaction protocol. In various embodiments, scanning device 302, 500, computer 212 and mobile phone or PDA 210 may be wholly or partially integrated. Thus, the terms scanning device, computer and mobile phone or PDA, as used herein, for the purpose of this specification, including the claims, shall be interpreted with the meaning of an appropriately equipped device, operating in accordance with one or more of the scanning device 302, 500, computer 212 and mobile phone or PDA 210 roles.

Additionally, in various embodiments, computer 212, document sources 234, multimedia server 450 and user account services 236 may be wholly or partially integrated. Thus, the terms computer, document sources, and multimedia server and user account services, as used herein, for the purpose of this specification, including the claims, shall be interpreted with the meaning of an appropriately equipped device, operating in accordance with a computer, document sources, multimedia server or a user account services role. It may be useful for a user to have document enhancement data on file so that some or all of the document enhancements of a document may be invokes without a user having to initiate a remote connection when a document enhancement is encountered. This may be helpful with common document enhancements. In some embodiments, such common document enhancements may be cached at devices closer to a user. Less common document enhancements may also be stored within one or more devices within the system 400 and optionally made available to enhance documents.

FIG. 5 illustrates an exemplary alternate embodiment of a scanning device 500 suitable for use in various embodiments. In other embodiments, scanning device 302 may be more suitable. Likewise, still further capture devices may be employed in other embodiments. One non-limiting example of such a device is a pen scanner, but many other forms of a scanning device may be employed by various embodiments. In alternate embodiments, the scanning device 302, 500 may include many more components (or fewer) than those shown in FIGS. 3 and 5. However, it is not necessary that all of these generally conventional computing components be shown in order to disclose an enabling embodiment. Furthermore, while scanning device 302, 500 is referred to as a scanning device, in various embodiments it may be any form of device suitable for capturing portions of rendered documents. As shown in FIG. 5, the scanning device 302, 500 includes a communications interface 530, which, in some embodiments, may be a Network Interface Controller ("NIC"). The inter-device communications of the communications interface 530 may be designed to support a local area network, wide area network, personal area network, telephone network, power line network, serial bus or wireless (e.g., Bluetooth, IEEE 802.11 or 802.16 and the like) connection. Such a communications interface 530 would also include the necessary circuitry, driver(s) and/or transceiver for such a connection and would be constructed for use with the appropriate transmission protocols for such connections.

The scanning device 302, 500 also includes a processing unit 510, a display 540, a graphical input 525, an optional audio output 545, an optional user input interface 535 and a memory 550, all interconnected along with the communications interface 530 via a bus 520. The memory 550 generally comprises a random access memory ("RAM"), a read only memory ("ROM") and a permanent mass storage device, such as a disk drive, flash RAM or the like. The memory 550 stores an operating system 555, document processing routine 560, document enhancement data 565 and device identifier 570. In alternate embodiments, bus 520 may be a hierarchy of bridged buses. For ease of understanding, operating system 555, document processing routine 560, document enhancement data 565 and device identifier(s) 570 are illustrated as separate software components, in alternate embodiments, they may be comprised of multiple software components, implemented in hardware, or may be subparts of one or more integrated software components.

In one embodiment, the document processing routine 560 is adapted to process graphically captured portions of a rendered document 495. In various embodiments, a document 495 may be any rendered version of human-readable text and or images that is susceptible to graphical capture by a scanning device 302, 500. Exemplary, non-limiting example of rendered documents 495 include materials from, but not limited to, paper catalogs, magazines, books, printed text, television or computer displays, posters, signs and the like. In various embodiments, document processing routine 560 may simply be an analog to digital converter where graphically captured information from the graphical input 525 is stored as document data.

Various embodiments may employ scanning devices 302, 500 having enhanced capabilities to allow still further transactions. For example, in one such embodiment, scanning device 302, 500 comprises Global Positioning System ("GPS") circuitry or other positioning circuitry (not shown), thereby enabling transactions based on the geographic location of the graphical capture of a rendered document.

In alternate embodiments, document processing routine 560 may include enhanced image analysis. For example, document processing routine 560 may process graphically captured information from the graphical input 525 to extract image information. One possible form of document processing may include determining the position, orientation and size of elements of a pattern in an image (such as text or other human-readable symbols).

Another form of document processing may include identifying differences between an image and a stored pattern. Methods for identifying these differences are generally referred to as pattern inspection methods and may be used for a number of purposes. One early, widely used method for pattern location and inspection is known as blob analysis. In this method, the pixels of a digital image are classified as "object" or "background," typically by comparing pixel gray-levels to a threshold. Pixels classified as object are grouped into blobs using the rule that two object pixels are part of the same blob if they are neighbors; this is known as connectivity analysis. Each such blob is analyzed to determine properties such as area, perimeter, center of mass, principal moments of inertia, principal axes of inertia and the like. In one specific implementation, the position, orientation and size of a blob are taken to be its center of mass, angle of first principal axis of inertia, and area, respectively. These and the other blob properties can be compared against a known ideal for proposes of inspection. Blob analysis is relatively inexpensive to compute, allowing for fast operation on inexpensive hardware.

Another document processing method that may be employed by document processing routine 560 is template matching. Template matching uses one or more training images that contain examples of the patterns to be located. The subset of the training image containing the example is processed to produce a pattern and then stored in a memory. Images are presented that may contain the object to be found. The stored pattern is compared with like-sized subsets of the presented images at all or selected positions and the position(s) that best match the stored pattern may then be considered the position(s) of the object. Degree of match at a given position of the pattern is simply the proportion of pattern pixels that match their corresponding image pixel, thereby providing pattern inspection information. In some embodiments, template matching may be employed to locate electronic instances of documents as described below.

Template matching may be applied to a variety of document processing analyses. It also is able to tolerate missing or extra pattern features without severe loss of accuracy, and it is able to detect fine differences between the pattern and the object.

A further alternate form of document processing is the use of gray-level normalized correlation for pattern location and inspection. Gray-level normalized correlation and template matching are similar, except that the full range of image gray-levels are considered with gray-level normalized correlation, and the degree of match becomes the correlation coefficient between the stored pattern and the image subset at a given position.

Gray-level correlation may be used in applications where significant variation in orientation and/or size is expected. Accordingly, the stored pattern is rotated and/or scaled by digital image re-sampling methods before being matched against the image. By matching over a range of angles, sizes and x-y positions, one can locate an object in the corresponding multidimensional space.

Still further versions of document processing routine 560 may include conventional Optical Character Recognition ("OCR") processing to extract textual and/or symbolic information from a graphically captured portion of a rendered document 495.

While the document processing routine 560 is described as residing on the scanning device 302, 500, in alternate embodiments, document processing routine 560 may optionally reside on other devices of the operating environment 400, such as the computer 212, mobile phone or PDA 210 or document sources 234.

It will be appreciated that the software components of scanning device 302, 500 may be loaded from a computer-readable medium into memory 550 of the scanning device 302, 500 using a mechanism (not shown) associated with the computer-readable medium such as a floppy, tape, DVD (Digital Versatile Disk) drive, CD (Compact Disk) drive, flash RAM or communications interface 530. In various embodiments, the loading may be performed during the manufacturing of scanning device 302, 500, or subsequently. In other embodiments, the software components may be downloaded from one or more networked servers.

In various embodiments, the communications interface 530 may facilitate the connection of remote devices to the scanning device 302, 500; for example, devices for reading and/or writing in machine-readable media, digital cameras, printers and the like. Various user-input interfaces 535 may also be coupled to the scanning device 302, 500, such as, for example, keyboards, keypads, touch-pads, mice and the like.

FIG. 6 illustrates an exemplary computer 212 suitable for use in one embodiment. In alternate embodiments, the computer 212 may include many more components (or fewer) than those shown in FIG. 6. However, it is not necessary that all of these generally conventional computing components be shown in order to disclose an enabling embodiment. As shown in FIG. 6, the computer 212 includes a communications interface 630, which, in some embodiments, may be a NIC. The inter-device communications of the communications interface 630 may be designed to support a local area network, wide area network, personal area network, telephone network, power line network, serial bus or wireless (e.g., Bluetooth, IEEE 802.11 or 802.16 and the like) connection. Such a communications interface 630 would also include the necessary circuitry, driver(s) and/or transceiver for such a connection and would be constructed for use with the appropriate transmission protocols for such connections.

The computer also includes a processing unit 610, an optional display 640 and a memory 650, all interconnected along with the communications interface 630 via a bus 620. The memory 650 generally comprises RAM, ROM and a permanent mass storage device, such as a disk drive, flash RAM or the like. The memory 650 stores an operating system 655, web browser 660, dynamic response routine 1000 and game routine 1500.

In alternate embodiments, bus 620 may be a hierarchy of bridged buses. For ease of understanding, operating system 655, web browser 660, dynamic response routine 1000 and game routine 1500 are illustrated as separate software components; in alternate embodiments, they may be comprised of multiple software components, implemented in hardware, or may be subparts of one or more integrated software components.

It will be appreciated that the software components may be loaded from a computer-readable medium into memory 650 of the computer 212 using a mechanism (not shown) associated with the computer-readable medium such as a floppy, tape, DVD drive, CD drive, flash RAM or communications interface 630. In various embodiments, the loading may be performed during the manufacturing of computer 212, or subsequently. In other embodiments, the software components may be downloaded from one or more networked servers.

In various embodiments, the communications interface 630 may facilitate the connection of remote devices to the computer 212; for example, devices for reading and/or writing in machine-readable media, digital cameras, printers and the like. Various input mechanisms may also be coupled to the computer 212, such as, for example, keyboards, keypads, touch-pads, mice and the like (not shown).

In various embodiments, an electronic instance of a document may be associated with document 495. In one such embodiment, the document 495 is associated with a document identifier. A document identifier may be an explicit identifier or may be a derived identifier from the contents of the document itself. In some embodiments, various types of explicit document identifiers may be used to distinguish documents. The type of document may determine the choice of the type of identifier used. The generation and assignment of the identifiers may follow industry standard practices. Accordingly, in some embodiment it may be desirable that document identifiers are unique for a document (or group of documents). One method for generating document identifiers is to take a title and append extra characters (e.g., "Tax-Form-1040-5435873934"). Another method is to generate a Globally Unique Identifier ("GUID") using conventional algorithms. The location of document identifier generation may be at any of a variety of devices in the operating environment 400, such as user account services 236, scanning device 302, 500, computer 212, mobile phone or PDA 210, document sources 234 and the like. The appropriate document identifier may be generated on demand or may be predetermined. Furthermore, document identifiers may comprise supplemental information associated with a specific document or even a specific instance of a document.

Derived identifiers may be determined from the contents of a document 495. One type of derived document identifier is a digest (such as a hash) of one or more fragments (e.g., title, document text, document elements, names or the like) of the document 495. In some such embodiments, electronic instances and documents 495 contain substantially the same content. However, an electronic instance may or may not be the actual source document employed to generate document 495. In other words, an electronic instance may be a copy instance or cousin descendant instance from a common ancestor of the source document employed to generate document 495. Further, in various embodiments, the document 495 may be a document of any type, and the term "document," as used herein, includes but is not limited to, a printed version, a displayed version, a Braille version and other versions of the like of a document. The term "digest" (of a document fragment) as used herein, in the specification and later in the claims, refers to a derived result outputted from a process that includes acquiring information or knowledge of the document fragment, where the derived result comprises information about the document fragment. In other words, a digest may also be considered as a representation or specification of the document fragment. Non-limiting example algorithms for producing digests include MD5, SHA, SHA-1 and the like.

In various embodiments, each document fragment includes a number of characters, and the corresponding digest is generated based at least in part on the characters of the document fragment. The term "character" as used herein is intended to be broadly interpreted, encompassing alphabets, numerals, punctuation, symbols and glyphs of non-character based languages. As will be described in further detail below, in various embodiments, each digest may be generated without awareness of the language and/or the character/glyph set employed to express the content of the document, including the document fragment itself. Further, an electronic instance may be located employing a digest generated using a relatively short document fragment, as short as a handful of words.

In one embodiment, the scanning device 302, 500 is suitably equipped to generate at least a representation of a document fragment of the document 495. For embodiments where document 495 is a printed instance, scanning device 302, 500 may be an optical scanner unit capable of generating at least an image of the document fragment.

In other embodiments, scanning device 302, 500 may be further endowed with the ability to generate a digest of a document fragment, using the generated image of the document fragment.

In various embodiments, a document identifier or electronic instance may be located and associated with a document 495, based at least in part on the digest of a fragment of the document 495.

In further embodiments, the content/characters of a document fragment, may be determined from its digest, and may be used to cause an electronic instance or document identifier to be located.

In various embodiments, an electronic instance may be located, and associated with document 495, by providing an image of a document fragment to search service, or by causing a search query having either a digest or the determined contents/characters as the search criteria, to be submitted to a search service (not shown). Resultantly, an electronic instance or document identifier may be located, and associated with a document 495.

The process of generating a digest for a document fragment, in accordance with various embodiments may be practiced by scanning device 302, 500 or other devices such as computer 212 or mobile phone or PDA 210. Further, for these embodiments, the content, more specifically, the characters, of a document fragment may be analyzed without awareness of the language and/or the character set employed to express the content of the document 495, including the document fragment.

In one embodiment, locating an electronic instance or document identifier of a document involves abstractedly identifying the characters of document fragment. The phrase "abstractedly identifying the characters" as used herein, is intended to include in its meaning "the identification of the presence of the various characters in the document fragment, without precisely recognizing the nature of the characters." For example, when processing a document fragment having the content "this is a string of characters", the process identifies the presence of 25 characters (not counting spaces), of which, 12 are distinct, i.e., "t", "h", "i", "s", "a", "n", "g", "o", "f", "c", "e", but, the process does not recognize the exact nature of the distinct characters, i.e., they are "s", "t", and so forth.

In various embodiments, the presence of the various characters is identified by comparing an image of the document fragment with a replicate of the image (also referred to as the template). In various embodiments, the process may also include pre-processing of the received image of document fragment, removing extraneous information, e.g., all or portions of the characters of the line above and/or the line below. Removal of such extraneous information may be effectuated employing anyone of a number of image/text processing techniques.

In various embodiments, identification of the presence of various characters in document fragment is effectuated by incrementally comparing the ending characters of document fragment with the beginning characters of document fragment. The process may be visualized as sliding a template along from the beginning to the end of the document fragment and comparing the overlapping sections of document fragment and the template. Resultantly, the character "s" is first compared to the letter "t", then the letters "rs" are compared to the letters "th", and so forth.

Eventually, when the letters "characters" are compared to the letters "this is a s", the presence of the letter "s" is identified. Again, the fact that the character is the alphabetic "s" is not appreciated, nor is the appreciation necessary. However, in alternate embodiments, the alphabetic nature of the character may be fully appreciated.

For various embodiments, on identification of the presence of a new character (again without appreciating the nature of the new character), a token is assigned to identify the new character. Thus, for the example document fragment "This is a string of characters", the characters are identified by corresponding token tokens or token identifiers.

For various embodiments, the presence of the characters "e", "f", "o", "g" and "n" are substantially identified at the same time, when the entire document fragment is compared to template. For some embodiments, white space analysis is further performed at the end of the comparison analysis, to ensure the characters within a non-repeating pair or multiple characters, such as "o" and "f" in the case of "of", are recognized as separate characters, although again they need not be fully recognized as the alphabet "o" or "f". For some embodiments, tokens for the last characters detected are simply assigned tokens without recognizing the nature of each of the characters.

Thus, for the example document fragment, tokenization results in the generation of the token vector of "5261 61 4 1536CB A9 7243475831" as "this is a string of characters" is compared to it template as described above.

Next, for various embodiments, an analysis is performed using the token vector to generate a digest comprised of presence characters. A value is assigned to each presence character, based at least in part on its occurrence pattern. For the embodiments, the re-occurrence value is equal to the character distance between a token, and its first subsequent re-occurrence in the remainder of the token vector. Further, for the embodiments, a presence character is attributed with a value of zero if it does not re-occur in the remainder of the token vector. Finally, the digest is outputted for the document fragment. Accordingly, for the exemplary document fragment "this is a string of characters", its digest is given by a vector "0, 20, 3, 3, 3, 8, 4, 7, 14, 7, 19, 15, 11, 0, 0, 0, 3, 0, 0, 0, 5, 0, 2, 5, 0, 0, 0, 0, 0, 0."

In alternate embodiments, various modifications may be made to generate digests. For examples, the occurrence values may be attributed without first tokenizing the characters. Another value other than "0" may be attributed to a character, if the character does not reoccur in the remainder of the document fragment. Hexadecimal values A, B etc. may be employed. More complex, non-linear value attribution approach may be employed instead. The attributed value may be based on other factors beside the re-occurrence of the character. Space may be included as a character. Further, as described earlier, other techniques to recognize the nature of the characters may be employed. Yet further, the process may be modified to analyze and assign attributes to the characters, abstractedly, by groups of characters having two or more characters.

Figure 7:
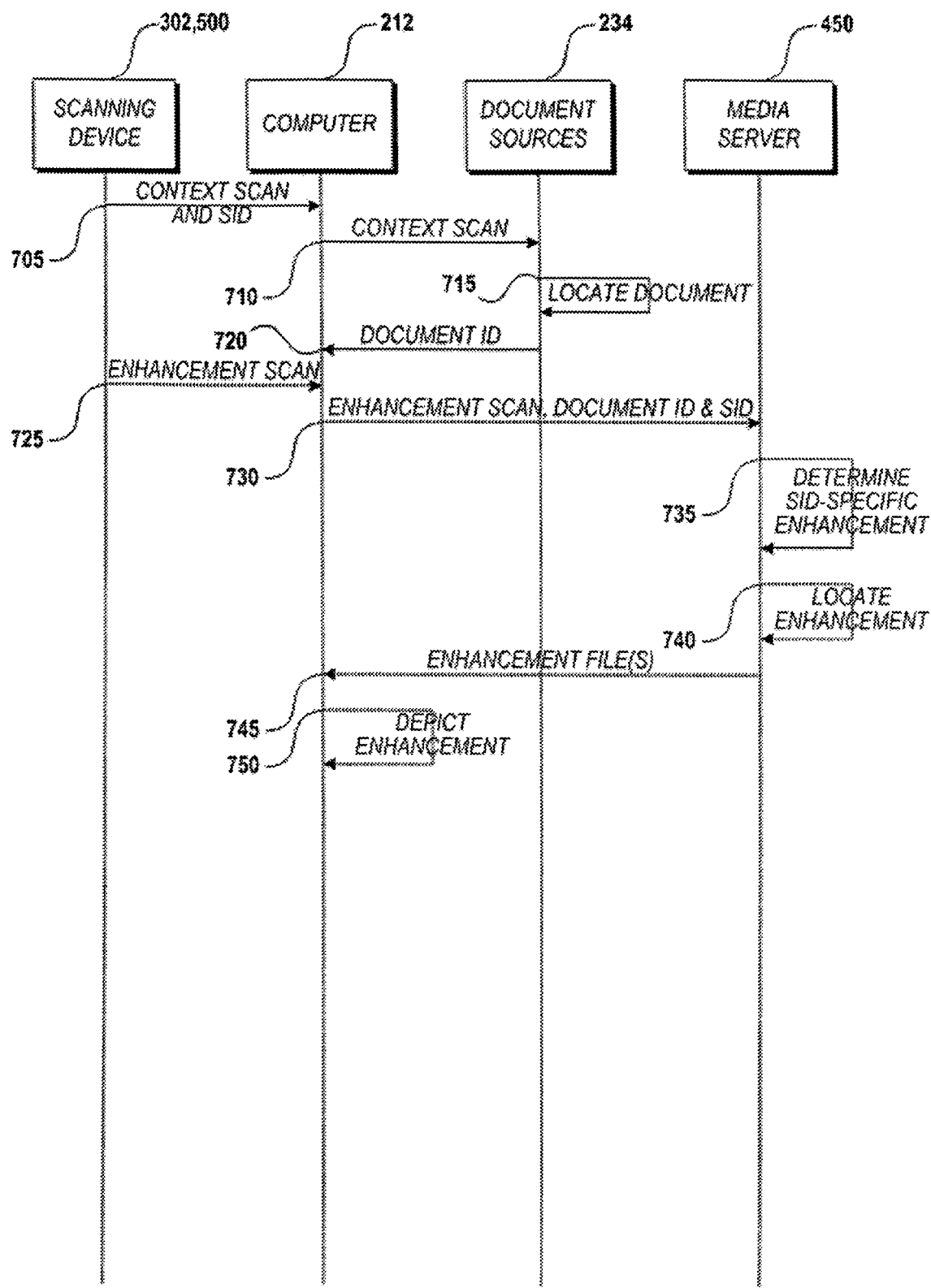
FIGS. 7-9 illustrate overviews of protocols and methods for the various devices to interact with the scanning device for enhancing a document, in accordance with various embodiments.

In some embodiments, the scanning device 302, 500 initiates a document enhancing transaction involving the computer 212 by scanning a portion of a rendered document 495. FIG. 7 illustrates one exemplary series of communications between a scanning device 302, 500, computer 212, document sources 234 and multimedia server 450 in accordance with various embodiments.

FIG. 7 shows the flow of a document enhancement transaction, including the parameters, for some devices of operating environment 400. In this embodiment, scanned information is sent from the scanning device 302, 500 to begin a document enhancement transaction. The specific communications between the devices are described in more detail below.

In FIG. 7, the document enhancement begins with a graphical image capture of a context scan of document 495. While some portion of the document 495 may include human-readable information, in some embodiments, a document identifier may be captured using machine-readable information such as barcode (1D, 2D, and/or multi-colored) information. Such barcode (or other machine-readable information) may also be used to contain checksum information to verify graphically captured human-readable portions of the rendered document. The context scan and a scanning device identifier ("SID", such as device identifier 570) are sent 705 to the computer 212. Next, the computer 212 sends 710 the context scan to document sources 234. The document sources 234 locates 715 a document corresponding to the context scan (see FIG. 12 and accompanying description) and returns 720 a document identifier of the located document to the computer 212.

Meanwhile, a user scans a portion of the document 495 that includes a document enhancement (such as an audio, image, video, dynamic display or other enhancement). The enhancement scan is sent 725 from the scanning device 302, 500 to the computer 212. The enhancement scan, located document identifier and the SID are sent 730 to a multimedia server 450. The multimedia server 450 determines 735 if there is any SID-specific enhancement and then locates 740 the enhancement corresponding to the enhancement scan, document identifier and SID. The located enhancement file(s) are returned 745 to the computer 212, where they are depicted 750 (displayed, played or otherwise presented). Each subsequent media scan in the same document 495 does not require a new context scan.

In some embodiments, depicting the enhancement may comprise displaying the enhancement on a dynamic display, while in other embodiments, depicting the enhancement may comprise playing an audio file, still other embodiments may combine audio and visual elements in an enhancement.

In various embodiments, the communications described above and shown in FIG. 7 are merely one exemplary set of communications between the scanning device 302, 500, computer 212, document sources 234 and multimedia server 450. Other communications, both more and fewer, may be employed in other embodiments. For example, in one alternate embodiment, the document enhancement process includes delivering a record of a transaction to an account associated with the scanning device identifier 570 at the user account services 236 (and/or a separate e-mail address account). Such an embodiment would allow a user to review the selected enhancements.

Similarly, while the document enhancement process is shown as occurring in a series of steps, it may occur in other sequences, and the steps may occur after protracted periods. In one "asynchronous" example, a user may graphically capture a document fragment as a document context and may also capture a document fragment including a desired enhancement, but not transmit the graphically captured document fragments until a later point in time. Such asynchronous communications allow users of various embodiments to practice the embodiments, even when not connected to a network.

For example when a user is not connected to a network, and a scanning device 302, 500 does not have information about this user's context (e.g., location, time of day, recent documents viewed, recently viewed documents, occupation and any of a myriad of other contextual clues that may be used to provide context to a user's action), or when a user does not have access to a display—then resolving questions about which document was actually scanned can be resolved at a later time. Accordingly, a document enhancement process might be finished by directing a user to a web site later, or by sending them an e-mail that requests further action—possibly confirming by clicking on or otherwise following a hyperlink. Such an e-mail-based enhancement process might also include an explanation or list of data enhancements being offered.

Expanding briefly on user context, in some embodiments a user's context is tracked rigorously to aid in resolving ambiguous document selections. For example, if a user submits one positively identified document from a particular magazine, then another ambiguously matched document that also appears in the same magazine may be given a higher priority as a likely correct choice on a subsequent submission. Similarly, if a user located in London scans a document that ambiguously matches both an American document and a British document; the British document will be given precedence. Likewise, if the user owns a boat, but not an airplane, and one of the ambiguously matched documents relates to boats and another to airplanes, priority may be given to the document relating to boats when disambiguating between the two documents. These are merely illustrative and non-limiting examples of how user context may be used to resolve ambiguous matches between documents. See FIG. 12 and the description below for a simplified document matching process.

In some embodiments, document submission communications are performed over connections using a Hypertext Transfer Protocol ("HTTP") connection in communication with one or more Common Gateway Interface ("CGI") or other HTTP-accessible applications. In other embodiments, different transmission protocols and/or connections for document submissions may be employed. Various types of document submission protocols are anticipated being employed by various embodiments.

In general, a context scan contains the information necessary to identify the document 495 and element data for enhancing one or more document elements. This may be accomplished by a variety of different document models in accordance with various embodiments.

Figure 8:
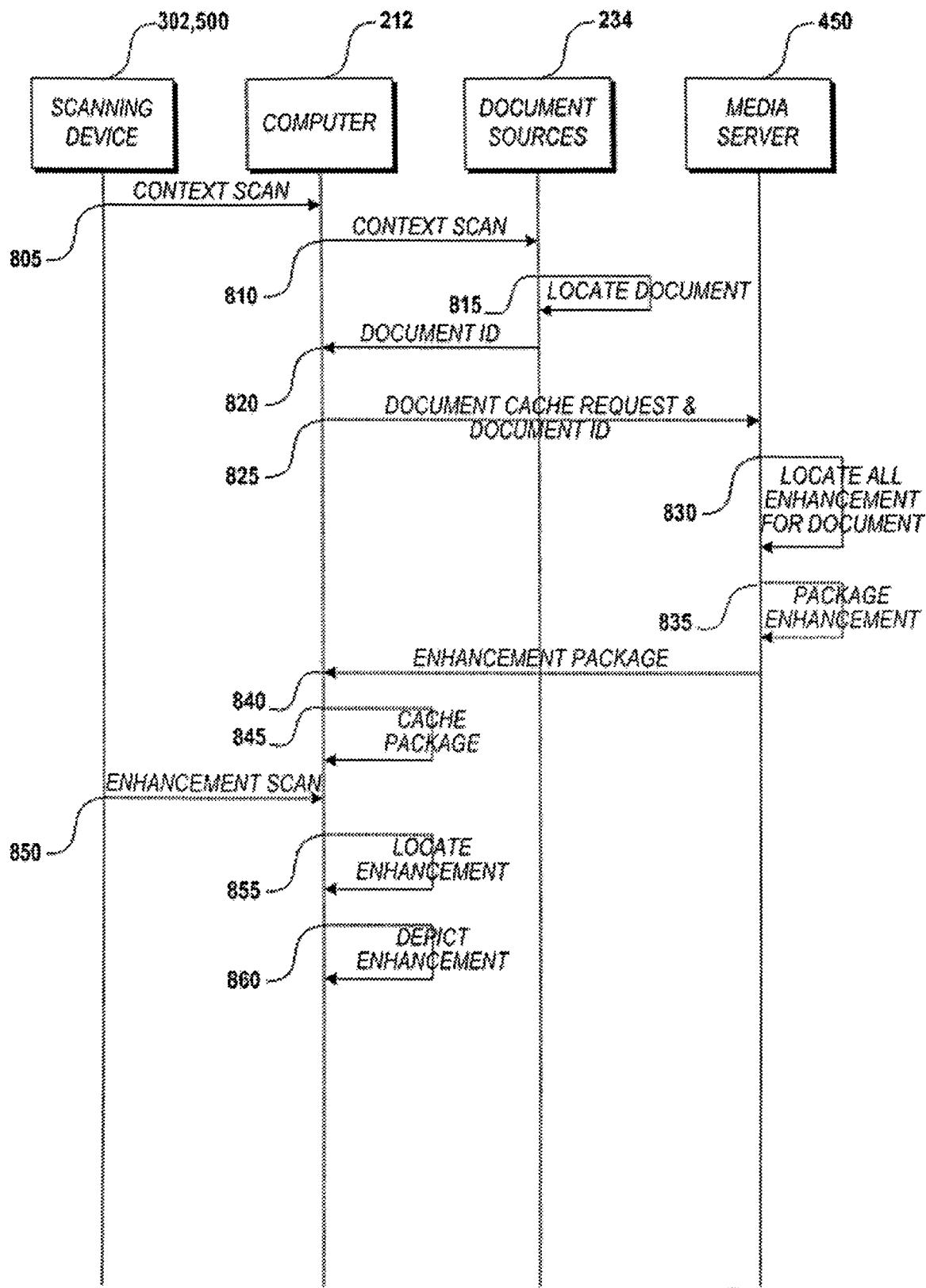
Figure 9:
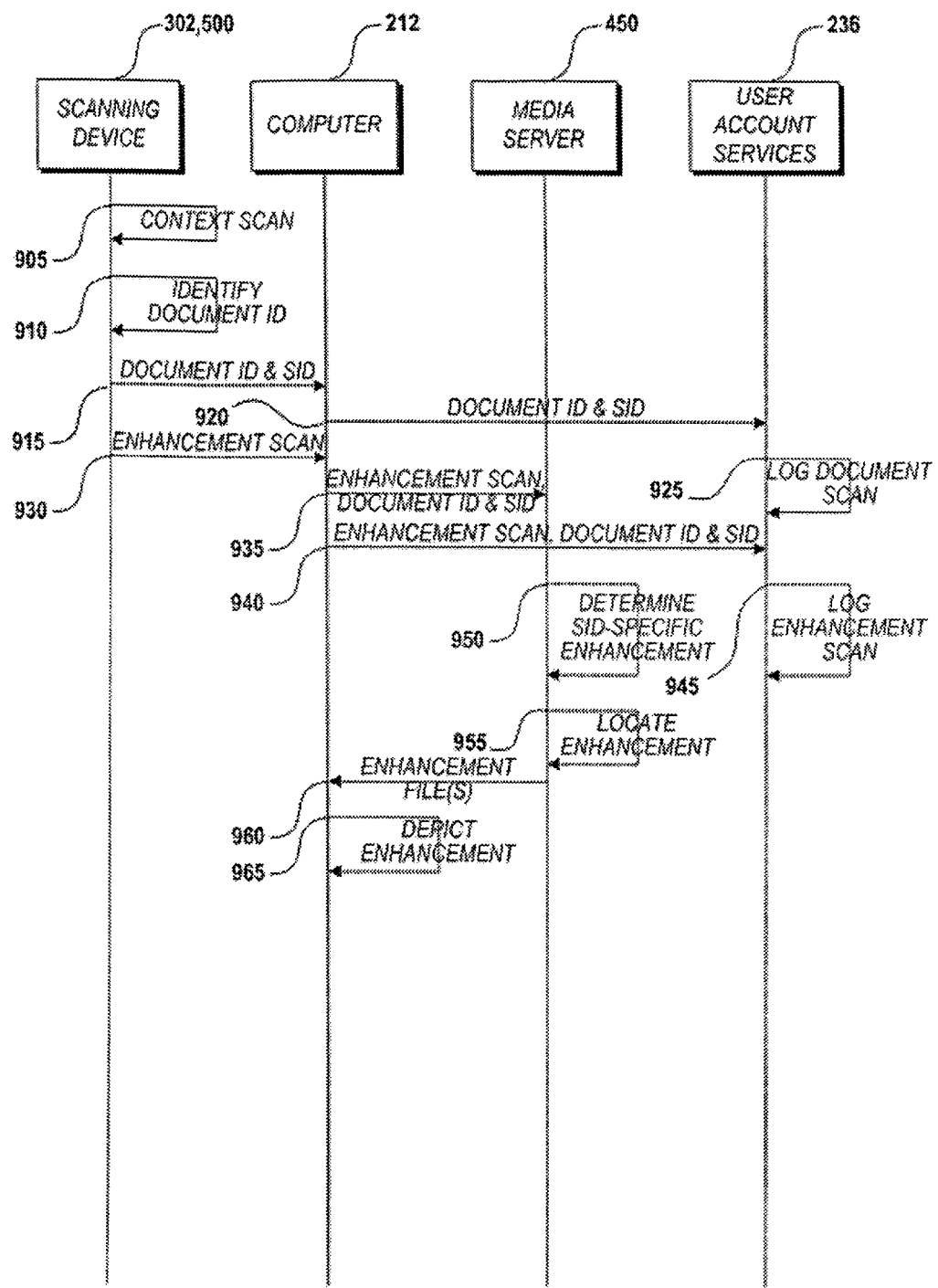

FIGS. 8-9 illustrate alternate embodiments for document enhancement. FIGS. 8-9 additionally illustrate that various devices within the operating environment 400 may, in different embodiments, reallocate processing of portions of document enhancement transactions.

Accordingly, FIG. 8 illustrates a similar document enhancement transaction to the one shown in FIG. 7 between a scanning device 302, 500, computer 212, document sources 234 and multimedia server 450. In FIG. 8, in like manner, the document enhancement transaction begins with the scanning device 302, 500 sending 805 a context scan to the computer 212. Next, the computer 212 sends 810 the context scan to document sources 234. The document sources 234 locates 815 a document corresponding to the context scan (see FIG. 12 and accompanying description) and returns 820 a document identifier of the located document to the computer 212. A document cache request, including the document identifier, is sent 825 from the computer 212 to the multimedia server 450. The multimedia server 450 locates 830 all document-identifier-specific enhancements and packages 835 the enhancements. The located enhancements are returned 840 to the computer 212 as an enhancement package. The computer 212 caches 845 the enhancement package.

Meanwhile, a user scans a portion of the document 495 that includes a document enhancement (such as an audio, image, video, dynamic display or other enhancement). The enhancement scan is sent 850 from the scanning device 302, 500 to the computer 212. The computer then locates 855 the enhancement corresponding to the enhancement scan within the cached enhancement package and depicts the enhancement. Each subsequent media scan in the same document 495 does not require a new context scan.

FIG. 9 likewise illustrates a similar document enhancement transaction to the one shown in FIG. 7; however, between a scanning device 302, 500, computer 212, multimedia server 450 and user account services 236. In FIG. 9, in like manner, the document enhancement transaction begins with the scanning device 302, 500 performing a context scan 905 on a document 495. The document identifier is identified 910 from the context scan (e.g., identified from a machine-readable indication of the document identifier). The scanning device 302, 500 next sends 915 the document identifier and a SID to the computer 212. The document identifier and SID are sent 920 to a user account services 236, where they are logged 925 as a document scan.

Meanwhile, the scanning device 302, 500 is used to scan an enhancement region of the document and the enhancement scan is sent 930 to the computer 212. The enhancement scan, document identifier and the SID are sent 935 to a multimedia server 450. The enhancement scan, document identifier and the SID are also sent 940 to the user account services 236, where they are logged 945 as an enhancement scan. The multimedia server 450 determines 950 if there is any SID-specific enhancement and then locates 955 the enhancement corresponding to the enhancement scan, document identifier and SID. The located enhancement file(s) are returned 960 to the computer 212, where they are depicted 955. Each subsequent media scan in the same document 495 does not require a new context scan.

The communications described above and shown in FIGS. 8-9 are merely exemplary sets of communications between the devices of the document enhancement system 400. Other communications, both more and fewer, may be employed in various embodiments.

Figure 10:
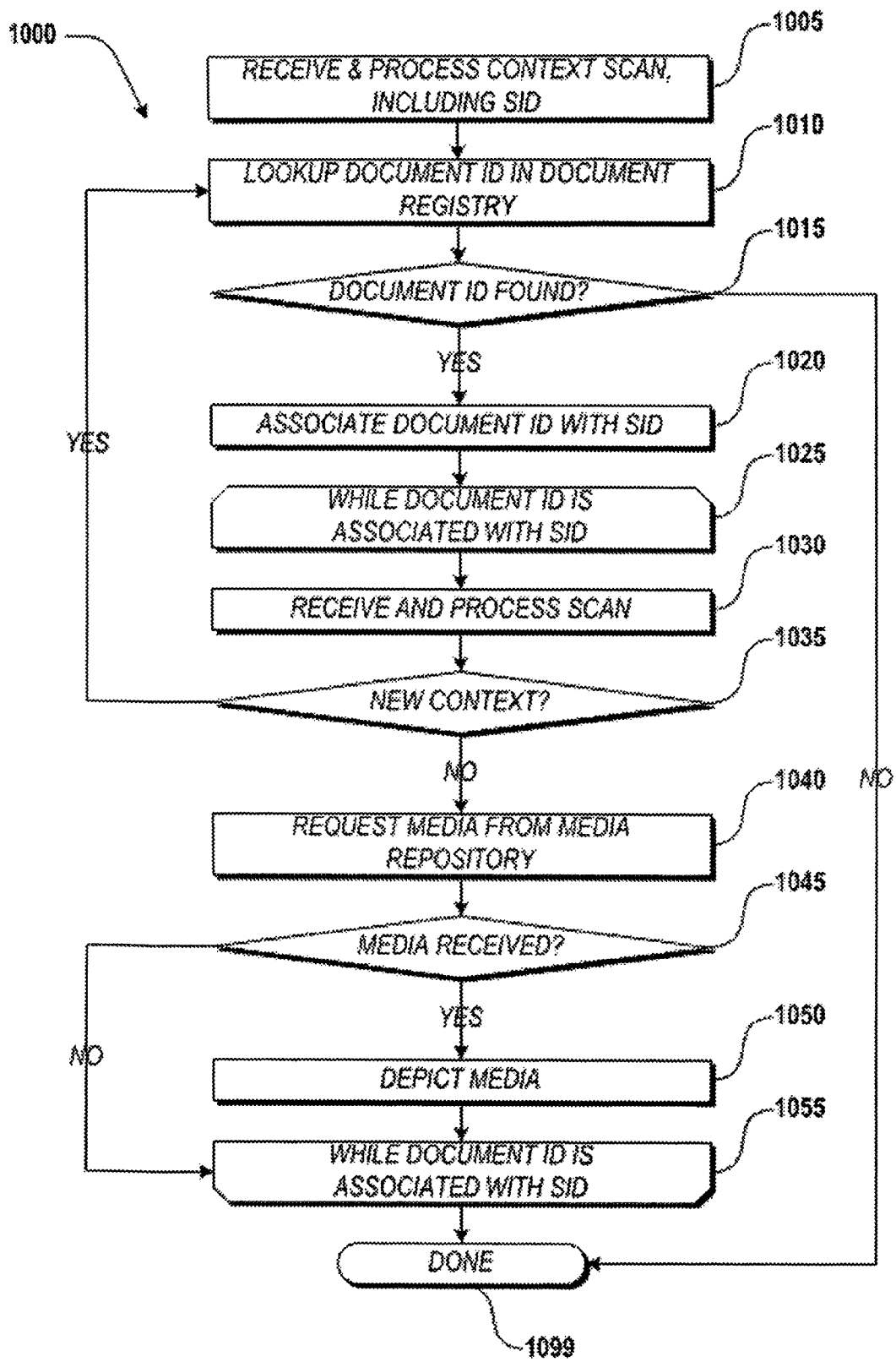
FIG. 10 illustrates the operational flow of relevant aspects of a process for enhancing a document, in accordance with one embodiment.
Figure 11:
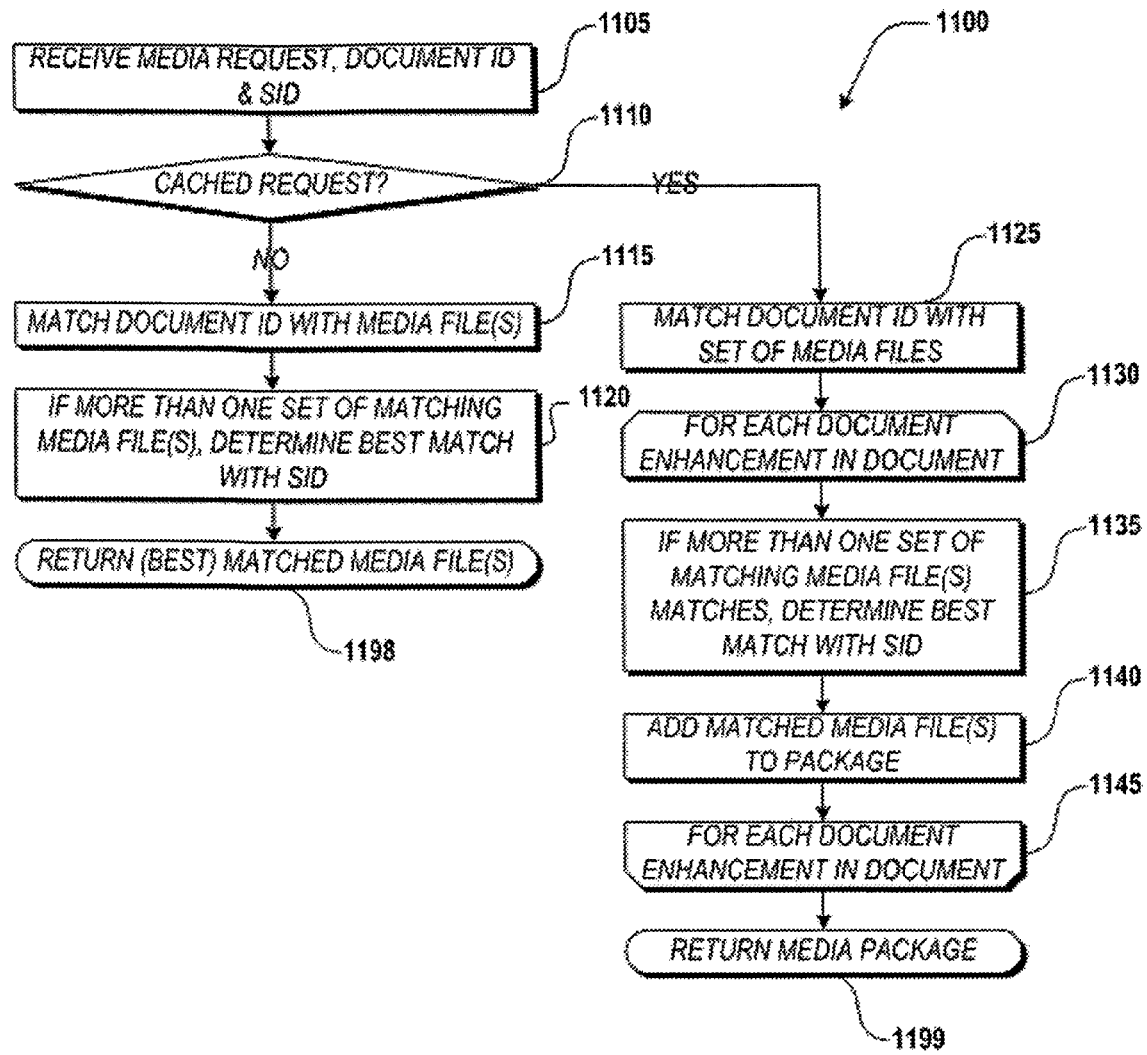
FIG. 11 illustrates the operational flow of relevant aspects of a process for providing media for enhancing a document, in accordance with one embodiment.

In accordance with the various above-described communications between the devices of the document enhancement system 400, FIG. 10 illustrates a process within the computer 212 for enhancing a document. The document enhancement process 1000 begins at block 1005 where a context scan and SID are obtained. In block 1010, the document identifier is looked up in a document registry (possibly on a remote device, such as document sources 234). In decision block 1015, a determination is made whether a document identifier was located. If so, processing proceeds to block 1020. Otherwise, processing proceeds to block 1099 where document enhancement routine 1000 ends.

In block 1020, the document identifier is associated with the SID, thereby establishing a relationship between a scanning device 302, 500 and a current document. Next, in looping block 1025, processing iterates until the document identifier is no longer associated with the SID (e.g., a new document context is scanned, the scanning device 302, 500 is turned off, or the like). In block 1030, a new scan is processed. If in decision block 1035 it is determined that the new scan is for a new document context, looping ceases, and processing loops back to block 1010. Otherwise, processing proceed to block 1040 where document enhancement media is requested from a media repository (e.g., from multimedia server 450 or from a local repository or cache). In decision block 1045, a determination is made whether media was located for the document enhancement. If no media was located, then processing proceeds to looping block 1055 for a new iteration. Otherwise, if enhancement media was located, then in block 1050, the enhancement media is depicted and processing proceeds to looping block 1055. Once the document identifier is no longer associated with the SID, processing proceeds to block 799 where document enhancement routine 1000 ends.

Optionally, a user may request that a particular document, or a document enhancement, be presented or delivered in another fashion. For example, a user might request that a separate paper copy of a document be mailed to their home or work address, that information shown on a document be requested via an email, or that a URL identifying a web-based version of this document be sent to this user by email other methods.

In various embodiments, when a user scans a document, e.g., by scanning a document identifier or other identifying text or marking, the user may be presented with options. This presentation may occur later, for example when this user connects to a user account (e.g., on user account services 236), or when they check their email or a website. Options available to a user might include:

Get additional information about this document enhancement in this context.

Execute instructions to enhance the document.

Other document enhancements.

Furthermore, in some embodiments, a user may be presented with feedback (audible, visual, tactile or the like) while obtaining document identifiers. For example, in one exemplary embodiment, if a document 495 unambiguously matched from a document identifier, a first light emitting diode ("LED") may light up. Additional, when a user scans a document enhancement element within the document 495, a second LED may light up once the scanning device 302, 500 (either alone or in combination with one or more other devices within the system 400) determines the scanned location within the document 495. Likewise, other indicators may be employed to indicate that a document was not unambiguously identified.

In assorted embodiments, various type of documents may be encountered by a user, and optionally processed in some way by different embodiments, a non-exclusive listing might include documents for:

children's books;
textbooks;
language books;
travel books;
game books;
magazines;
packaging;
translated documents; and
other documents with document enhancements.

Note that a scanning device 302, 500 or account might be associated with a group of people (e.g., classroom, a school, a club, a company or other association).

The description of a document enhancement transactions illustrated in FIGS. 7-10 is one of a myriad of possible document enhancement systems and methods employed by various embodiments.

In some embodiments, there may be a fee or other financial transaction associated with various steps of enhancing a document. For example, a user might receive a charge for this service. Such a charge might be automatically billed to a credit card or deducted from a debit card or bank account or prepaid account associated with a particular user, with a scanning device 302, 500 or with a location. Alternately, such a charge might be levied on and paid by a recipient of this information or a party in association with them.

In one embodiment, a user may initiate an enhancement event for a part of a document or an entire document simply by scanning (or otherwise entering) an identifier associated with this document. In some cases a document identifier may also be readable by a human, for example as a serial number or URL, so that users who cannot or do not want to graphically capture a document may still enhance it by entering an identifier manually. In these instances, it may be helpful if a document or accompanying material includes information about how to submit data by other methods. Such methods may include going to a specific URL with a web-browser. Another may be via a phone call to a specific number and an interaction with an interactive voice response server (not shown). These last two examples indicate how it may be useful in some cases for individuals to have a way to identify themselves separately from a scanning device 302, 500. Such a user identifier may associate an individual with a collection of data so that an individual may respond to a particular enhancement data request by submitting or relating only their identifier. In one example, a user could respond to a printed document by dialing a number associated with this document and then entering their (possibly numeric) identifier via voice or DTMF or other phone commands or actions. In one embodiment, a user might be able to use their email address, social security number, or other pre-existing data item as a key associated with document enhancements to be used with a document.

In accordance with the above description and the interactions shown between a scanning device 302, 500, document sources 234, user account services 236 and multimedia server 450 in FIG. 7-9, FIG. 11 illustrates a process for retrieving document enhancement media from a multimedia server 450. The document enhancement media routine 1100 begins at block 1105 where a media request, including a document identifier and a SID are received. In block 1110, a determination is made whether the media request is a cached request. If so, processing proceeds to block 1125. Otherwise, processing proceeds to block 1115, where the media request and document identifier are matched with document enhancement media file(s). Next, in block 1120 the SID is used to select between matching media file(s) if more than one set is found. In block 1198, the matched media file(s) are returned that best match the media request, document identifier and SID.

Alternately, in block 1125, the media request and document identifier are matched with a set of media files. In looping block 1130, processing iterates through each document enhancement associated with the document identifier and in block 1135 matches the best media file(s) to the SID. In block 1140, the match media file(s) are added to a packet. Looping block 1145 then cycles back to looping block 1130 until all document enhancements have been iterated through. In block 1199, the media package is returned.

In alternate embodiments, a user with a scanning device 302, 500 may optionally select document portions or groups of portions by individually scanning portion labels (or symbols) or title text associated with a portion or portions. This might allow a user easily choose which enhancements to depict and which to skip. A suitable system may have an ability to recognize various frequently used names, titles and/or symbols. Optionally, an association between a title or other mark and a meaning of a particular portion or group of portions may be separately established by a party setting up a document.

In some cases, special marks may accompany documents, document names, document portions or other document elements that a document enhancement system 400 may want or need to recognize. These marks may be recognizable by a scanning device 302, 500 and or other device within the system 400. Optionally the special marks may have characteristics recognizable by a user. In some embodiments, only these special marks will need to be scanned to indicate an enhancement or object to file all or part of a document. In some cases it may be helpful if these marks appear next to or near a given element name.

Figure 12:
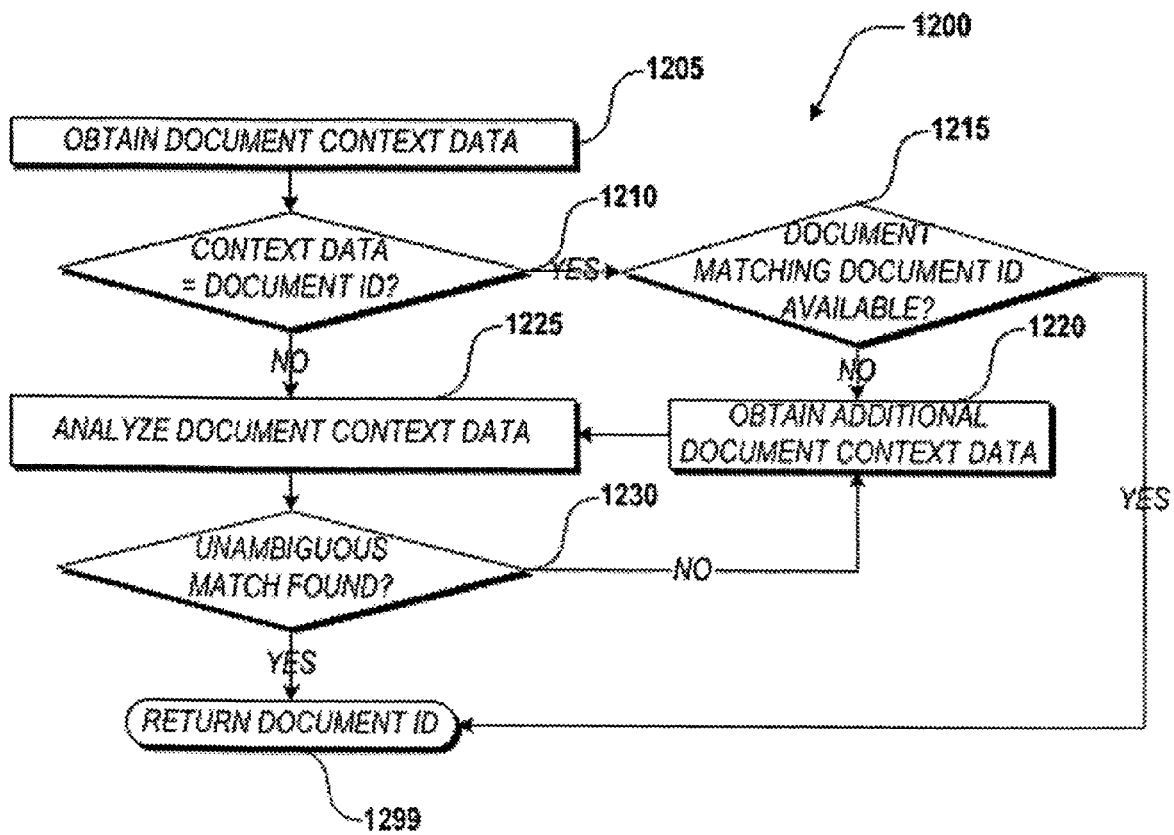
FIG. 12 illustrates the operational flow of relevant aspects of a process for identifying a document identifier, in accordance with one embodiment.

The descriptions of document enhancement transactions illustrated in FIGS. 7-11 illustrate transactions generally showing explicit document identifiers as part of the document enhancement process. Such embodiments may also be compatible with implicit document identifiers as illustrated in the process shown in FIG. 12 and described below. FIG. 12 illustrates that a document identifier may be derived from document context information (i.e. the context data is the document identifier).

Accordingly, FIG. 12 illustrates a document matching routine 1200. The document matching routine 1200 begins at block 1205 where document context data (e.g., text, images, symbols, bar codes, document elements, signature blocks and the like) is obtained. Next, in decision block 1210 a determination is made whether the context data contains an explicit document identifier. If so, then processing proceeds to decision block 1215. If however, the context data does not contain an explicit document identifier, then an implicit document identifier may be derived. Accordingly, processing proceeds to block 1225 where the document context data is analyzed and compared against known documents. In decision block 1230, a determination is made whether the analysis in block 1225 located an unambiguously matching document. If so, then processing proceeds to block 1299 where the unambiguously matching document's document ID is returned and the document matching routine 1200 ends in block 1299.

If, in decision block 1215, no document matching the explicit document identifier was available or if no unambiguous match was determined in decision block 1230, processing proceeds to block 1220 where additional document context information is obtained. For example, a user may be queried for additional information from the document in real-time, or may have a query for additional information sent to an associated user account (e.g., on user account services 236). Processing then proceeds to block 1225 for re-analysis.

If, however, in decision block 1215 a document matching the explicit document identifier was located, processing proceeds to block 1299 where the unambiguously matching document's document ID is returned and the document matching routine 1200 ends in block 1299.

In addition to enhancing documents with media representations, various embodiments provide additional enhancements. The additional enhancements may be user-specific and accordingly may have restricted access. A password, PIN or other private code may be associated with a user's identifier to permit restricted access.

Additionally, stored document enhancement data might be located on a scanning device 302, 500, or other device associated with an individual user (such as computer 212 or user account services 236). Data may be stored encrypted, and/or with other security measures to prevent theft and/or accidental release of data.

Note that in some embodiments, scanning a document identifier conveys that a user specifically wants information sent—e.g., this user is giving consent. In such a case one or more devices within a document enhancement system 400 may make a record of this scan, for example by preserving a captured image, time, date, or other meta-data, from this event as proof of consent. In some cases, a document identifier may include supplemental information that in some measure verifies that a user scanned a document. In one embodiment, the supplemental information might be a unique code associated with each individual document 495, or with a specific portion of a document. This code might be associated with a specific document mailed or otherwise delivered to a specific individual. This code might optionally only be readable by a machine programmed with specific data or a specific algorithm.

In some embodiments it may be desirable for the document sources 234 to process (or preprocess) documents when registering them for later retrieval. Such a registration might include data such as where and how to send certain data, specific document enhancements for a document, how these document enhancement services are to be paid for, security and/or privacy ratings of providers of document enhancements, a copy of a provider's privacy policy, specific instructions for handling various processes and/or circumstances in this document enhancing process (optionally as computer code or instructions) and optionally other data as well. Other data associated with or registered with a document may include information about a document identifier, a symbol or other representation of some graphical element or elements by which this document may be recognized, which individual users or groups of users or situations or contexts this document is intended for, an electronic copy of this document (for example, in printable PDF format) or where to locate such a copy, valid dates, times, or other qualifying circumstances in which this document may be submitted. Other data may be associated or submitted with a document as well, optionally including all data that is useful or necessary to various parties participating in a document enhancement process.

For example, a document may carry additional coded, machine-readable or human-readable data. This data might include a specific user for whom this document was intended. Such additional data may be incorporated in a document identifier such that this additional data is included when a user scans the document identifier. Optionally, a document or group of documents may have a unique document identifier. Data may be separately associated with this identifier. Such data might be stored in document sources 234 or stored elsewhere within the document enhancement system 100. If a document is registered with document sources 234, such data might be entered and/or associated with a document when the document is registered.

Figure 13:
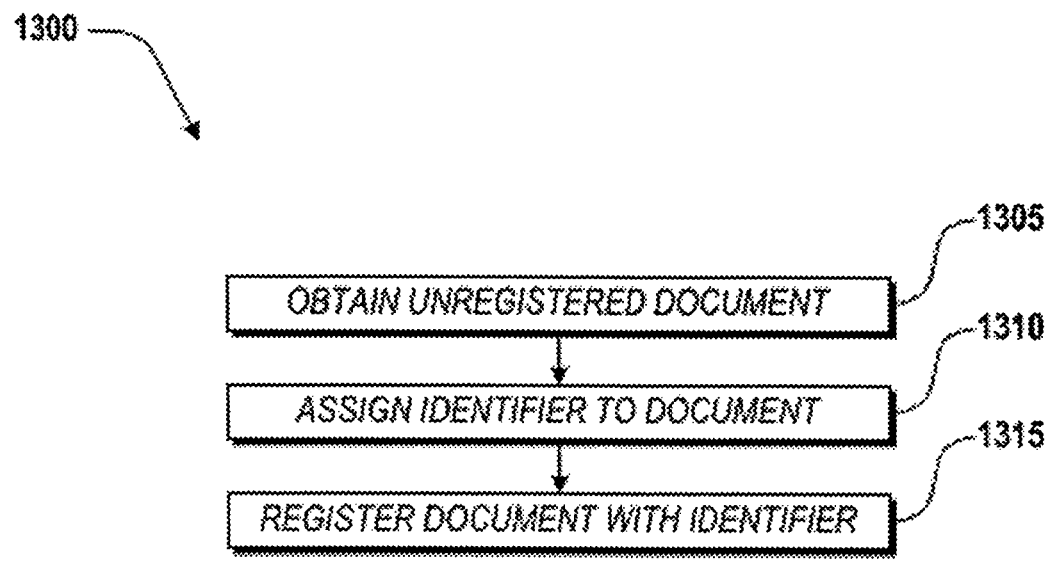
FIG. 13 illustrates the operational flow of relevant aspects of a process for registering a document, in accordance with one embodiment.

Accordingly, FIG. 13 illustrates one exemplary simplified document registration routine 1300. Document registering routine 1300 begins at block 1305 where an unregistered document is obtained. A document identifier is assigned to (or derived from) the document in block 1310. The document is registered in the document server (e.g., document sources 234) with its identifier in block 1315.

In some embodiments, if a user encounters a document not known to document sources 234, they might mail, fax, email or otherwise deliver this document so that it may be registered. The document sources 234 may optionally contain expert knowledge and instructions for automatically analyzing and recognizing various elements of documents. Thus, a new document may be analyzed and made available to be automatically enhanced if subsequent users request it.

In some embodiments, the first user to submit a copy of a document previously unknown to document sources 234 may be rewarded in some way, for example by receiving a small payment when subsequent users interact with this document, or by not having to pay a fee to have the document enhanced. In some systems, these incentive payments might instead appear as credits to document authors or publishers who submit and/or register their document directly with document sources 234 before a user submits it—for example, these credits might be used to reduce a per-user charge that registered document publishers may be assessed for use of this system.

Figure 14:
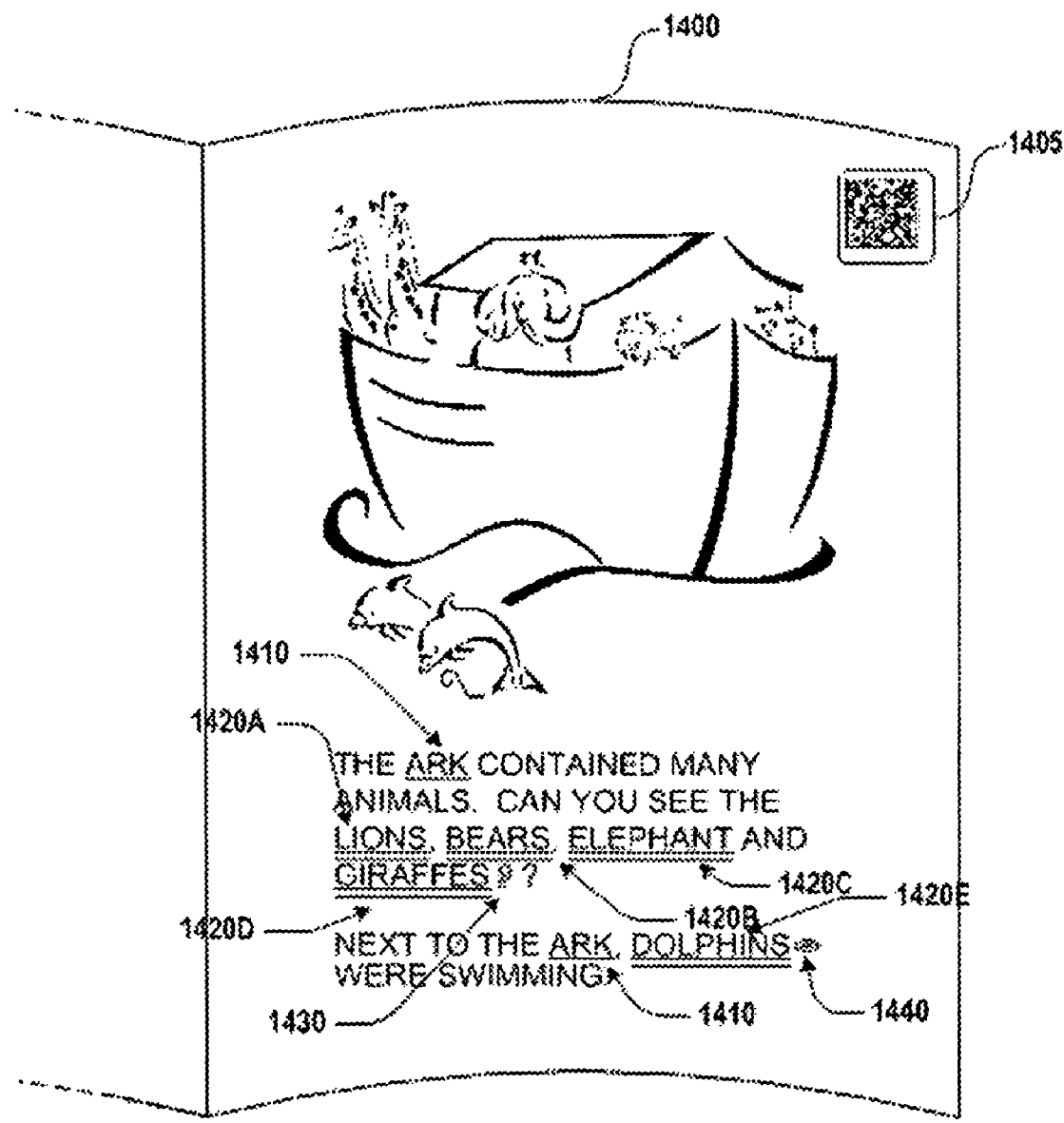
FIG. 14 illustrates an exemplary enhanced document, in accordance with one embodiment.
Figure 15:
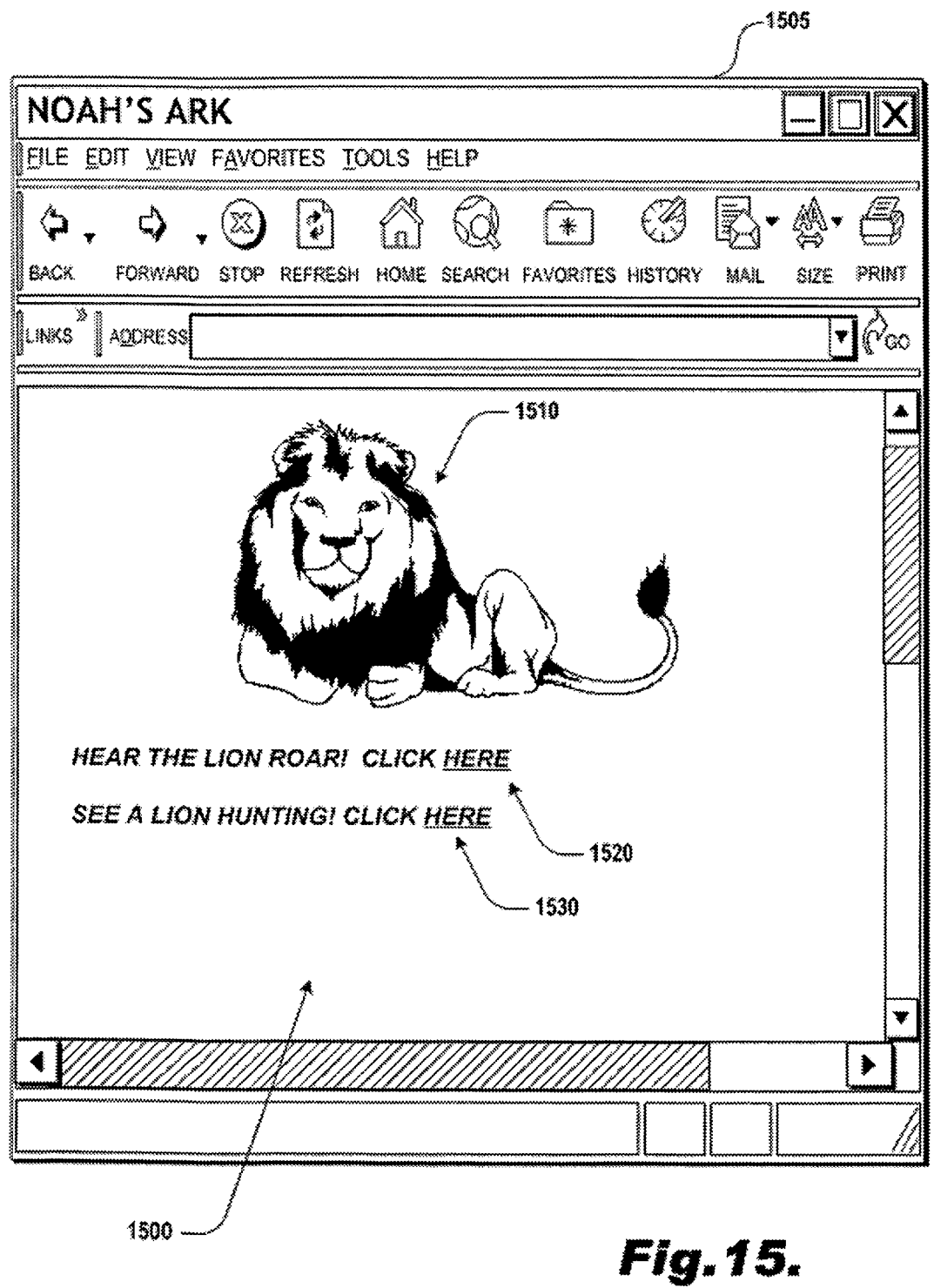
FIG. 15 illustrates an exemplary document enhancement web page, in accordance with one embodiment.

FIGS. 14-15 illustrate a variety of exemplary enhanced documents suitable for use with various embodiments. FIG. 14 illustrates a conventional document 1400 with a document identifier in 2D barcode 1405 format. Document 1400 includes a number of indications of document enhancements. In one exemplary explanation for the indicated enhancements in FIG. 14, the single underlined "ark" 1410 indicates a textual description associated with the underlined word. The double-underlined words 1420A-E indicate audio or visual enhancements associated with the double-underlined words. The ear symbol 1430 may indicate a verbal description, and the eye symbol 1440 may indicate an image description. There are merely exemplary explanations, and the indications may include both additional and fewer indications (including no indications) of document enhancements in various embodiment. Additionally, other indication of enhancements may be used in other embodiments.

In addition, in a further exemplary embodiment, a dynamic display allows further functionality for dynamically displayed documents. In the dynamically displayed example, actions associated with ordering enhancements from a document, such as document 1400, could be reflected in a dynamically updated portion of the dynamic display. In one such example, as a user scans the double-underlined word "lions" 1420A and a document enhancement web page is activated in accordance with the above descriptions.

One example web page 1500 is shown in FIG. 15. In such an exemplary embodiment, the scanning device 302, 500 may be used in conjunction with an associated display, such as display 640 of a computer 212. Accordingly, FIG. 15 illustrates such an embodiment where the display is used to assist in displaying a document enhancement. The web page 1500 is displayed within a browser window 1505 (e.g., in a browser 660 of a computer 212). Included in the web page is an image 1510 (of a lion) and additional links for hearing a lion roar 1520 or viewing an image of a lion hunting 1530. It will be appreciated that FIG. 15 is presented for illustrative purposes and is in no way meant to be limiting to the scope of the present invention.

In many cases when interacting with documents, it may be helpful to know the location of the user. This would be useful, for example, when the user has access to a display device and wants their document displayed there. A label or other scanning-device-readable indicator (not shown) that identifies the specific display and or device may be available to the user. Scanning this label informs document sources 234 (or a user account services) of the user's location. In some cases, the identifying label can be generated and displayed on a computer 212. Generally, only the user physically at the display device would then be able to scan this information, thereby providing an additional layer of security.

The document enhancements described above may be employed in a myriad of applications. In various embodiments, they may be employed with games and puzzles in documents. Once such exemplary game system is illustrated in FIGS. 16-17 and described below.

Figure 16:
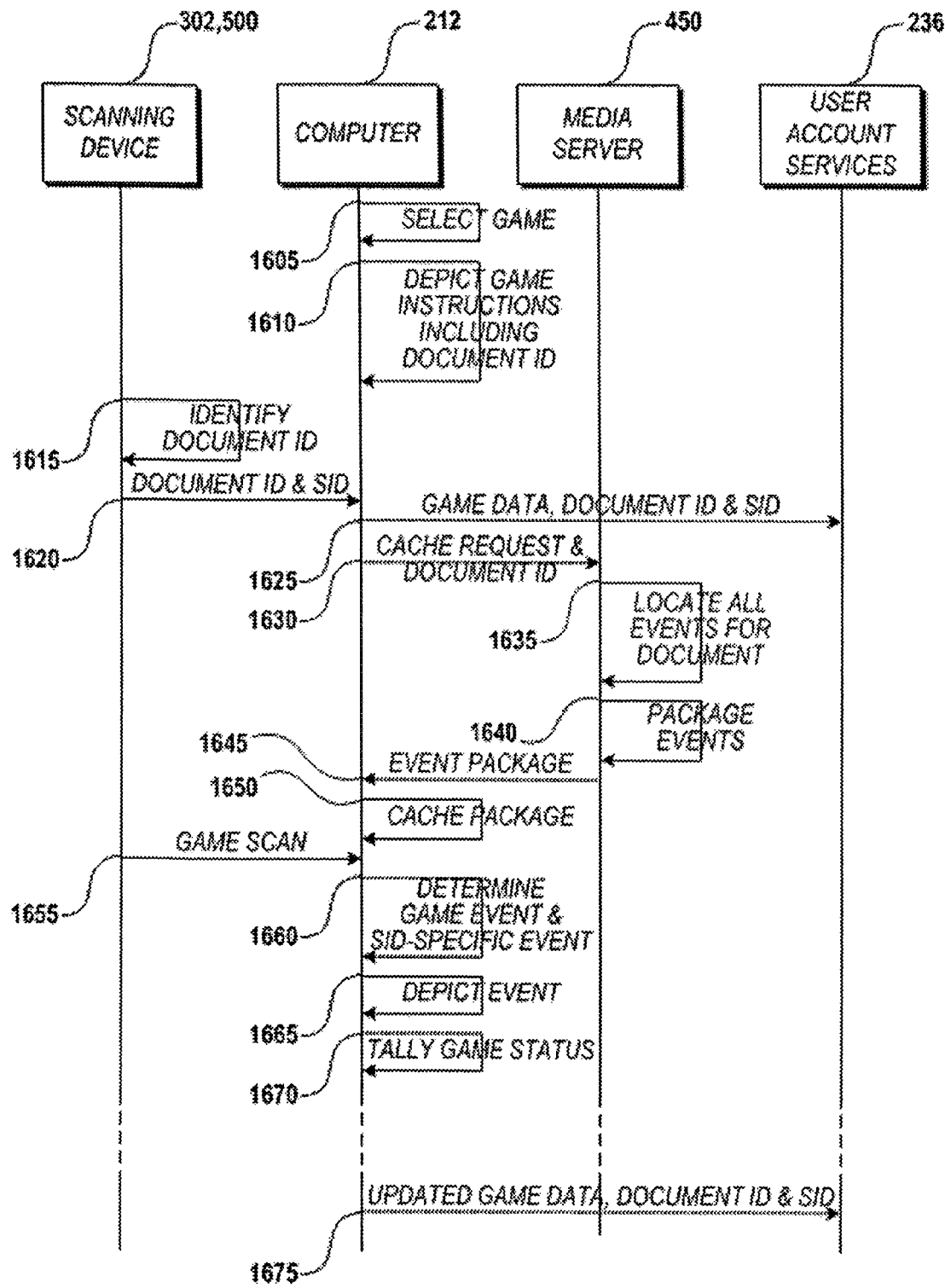
FIG. 16 illustrates an overview of protocols and methods for the various devices to interact with the scanning device for enhancing a document in a game fashion, in accordance with one embodiment.
Figure 17:
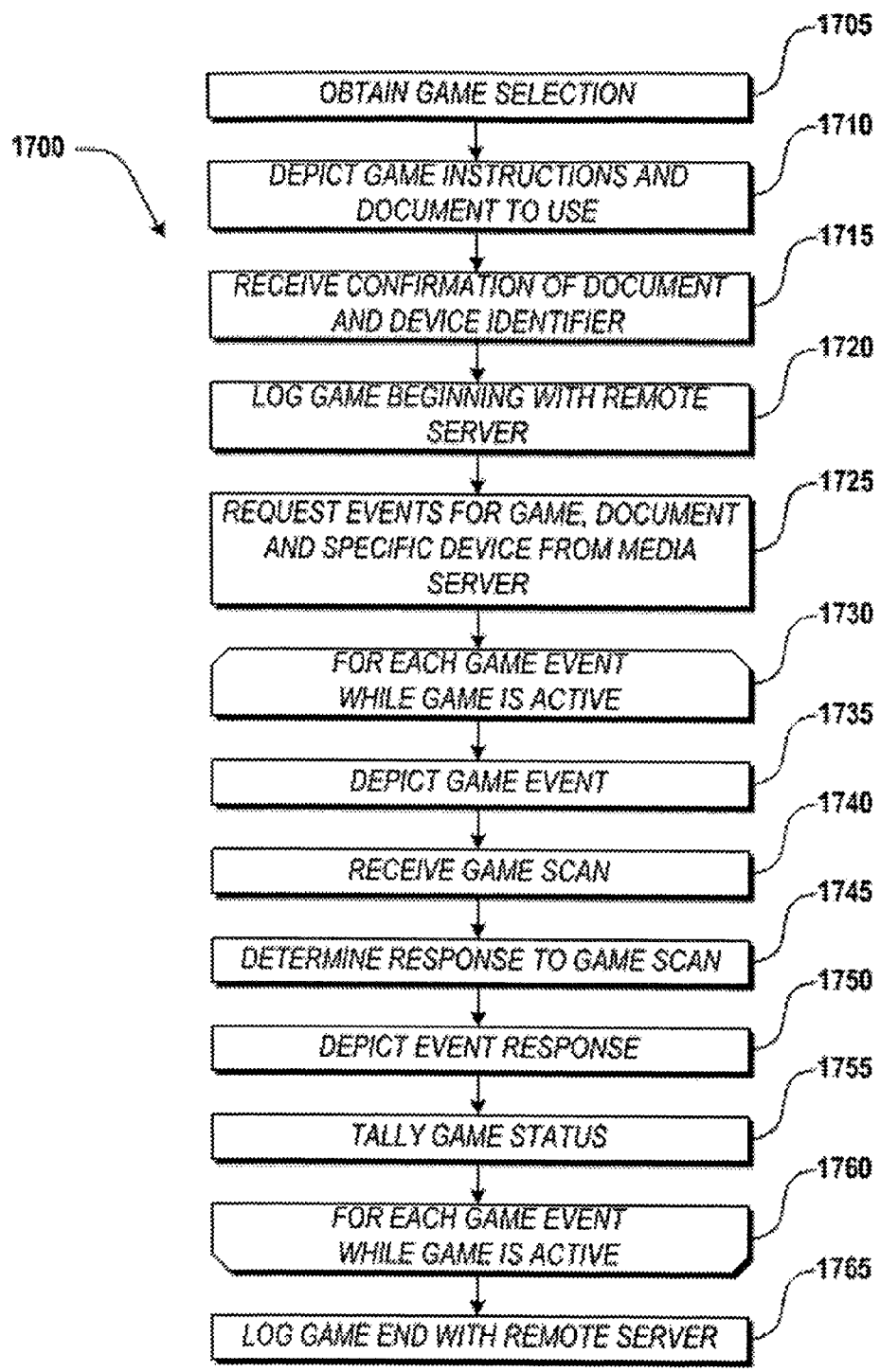
FIG. 17 illustrates the operational flow of relevant aspects of a process for enhancing a document with a game, in accordance with one embodiment.

FIG. 16 shows the flow of a document enhancement game transaction, including the parameters, for some devices of operating environment 400. In this embodiment, scanned information is sent from the scanning device 302, 500 to begin a document enhancement game transaction. The specific communications between the devices are described in more detail below.

In FIG. 16, the document enhancement game begins with a user selecting 1605 a game on the computer 212. The computer depicts 1610 games instructions and a document identifier. Next the scanning device 302, 500 performing an identifying scan 1615 on a document corresponding to the document identifier where the document identifier is confirmed by sending 1620 the document identifier and a SID to the computer 212. Next, game data, the document identifier and SID are sent 1625 to a user account services 236 as a game beginning. On the computer 212 a document cache request, including the document identifier is sent 1630 from the computer 212 to the multimedia server 450. The multimedia server 450 locates 1635 all document-identifier-specific game events and packages 1640 the events. The located events are returned 1645 to the computer 212 as an event package. The computer 212 caches 1650 the enhancement package.

Meanwhile, the scanning device 302, 500 is used to scan a game event region of the document and the game scan is sent 1635 to the computer 212. The computer 212 determines 1660 if the game scan matches the correct SID-specific game event (e.g., if a game event required a scan of an animal, does a scan of the word "lion" qualify? Yes.). The result of the determination is depicted 1665 and the current game status is tallied. Eventually, once all game events have been tallied, updated game data (including the last tally) and the document identifier and SID are sent to the user account services 236 as a record of the game.

In various embodiments, the communications described above and shown in FIG. 16 are merely one exemplary set of communications between the scanning device 302, 500, computer 212, user account services 236 and multimedia server 450. Other communications, both more and fewer, may be employed in other embodiments.

Similarly, while the document enhancement game process is shown as occurring in a series of steps, it may occur in other sequences, and the steps may occur after protracted periods. In one "asynchronous" example, a user may graphically capture a document fragment as a document context and may also capture a document fragment including a desired game enhancement, but not transmit the graphically captured document fragments until a later point in time. Such asynchronous communications allow users of various embodiments to practice the embodiments, even when not connected to a network. Additionally, the scanning device 302, 500 may recognize portions of a document 495 while in an asynchronous mode, and may be operative to tally a score for a game in accordance with one exemplary embodiment.

FIG. 17 illustrates an exemplary game routine 1700 on a computer 212. Exemplary game routine 1700 begins at block 1705 where a game selection is obtained. In block 1720, game instructions are depicted along with an indication of the document to be used with the game (for example, today's newspaper). Next, in block 1715, a confirmation of a document and a SID are obtained. The document identifier and SID are optionally sent to a remote server in block 1720 to log the start of the game. In block 1725 game events (puzzle elements, other game components or the like) for a specific game, document and SID are requested from a remote server (or local source if available). In looping block 1730, the game cycles through each game event while the game is active. In block 1735, a game event is depicted (for example, "scan the name of a politician within 30 seconds"). In block 1740 a game scan is receive. Depending on the accuracy and/or game compliance, the event response is depicted in block 1750. The current game status is tallied in block 1755. In looping block 1760, game routine 1700 cycles back to looping block 1730 for each remaining game event while the game is active. After which, processing optionally proceeds to block 1765 there the end of the game is logged with a remote server.

Conclusion

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein.

It will be appreciated by those skilled in the art that the above-described system may be straightforwardly adapted or extended in various ways. While the foregoing description makes reference to particular embodiments, the scope of the invention is defined solely by the claims that following and the elements recited therein.

We claim:

1. A computer-implemented method of providing a media presentation associated with a rendered document, the method comprising:
   optically or acoustically capturing a portion of the rendered document containing human-readable text using a portable data capture device;
   generating a digest of the captured portion based at least in part on content of the text of the captured portion using the portable data capture device;
   locating a document identifier associated with an electronic counterpart to the rendered document based at least in part on the digest of the captured portion;
   sending an enhancement package request including the document identifier to a media server;
   receiving from the media server an enhancement package associated with the document identifier, wherein the enhancement package includes multiple media presentations associated with multiple words of the rendered document, wherein each word of the multiple words is associated with a respective media presentation of the multiple media presentations;
   optically or acoustically capturing another portion of the rendered document containing human-readable text using the portable data capture device;
   locating within the enhancement package a media presentation associated with one or more identified words within the another captured portion; and
   presenting the associated media presentation using a display or speaker of the portable data capture device.

2. The method of claim 1, wherein the media presentation comprises an audio presentation.

3. The method of claim 1, wherein the media presentation comprises a video presentation.

4. The method of claim 1, wherein the media presentation comprises an image presentation.

5. The method of claim 1, wherein the media presentation comprises a combined audio and video presentation.

6. A computer-readable storage medium whose contents cause a mobile phone to perform a method for retrieving a media presentation associated with a rendered document, the method comprising:
   optically capturing an image of a human-readable text-based portion of the rendered document using a mobile phone;
   generating a digest of the captured portion based at least in part on content of the text of the captured portion;
   locating a document identifier associated with an electronic counterpart to the rendered document based at least in part on the digest of the captured portion;
   sending an enhancement package request including the document identifier to a media server;
   receiving from the media server an enhancement package associated with the document identifier, wherein the enhancement package includes multiple media presentations associated with multiple words of the rendered document, wherein each word of the multiple words is associated with a respective media presentation of the multiple media presentations;
   optically or acoustically capturing another image of a human-readable text-based portion of the rendered document;
   locating within the enhancement package a media presentation associated with one or more words identified within the another captured image; and
   presenting the media presentation via a display of the mobile phone.

7. The computer-readable medium of claim 6, wherein optically capturing an image of a text-based portion of the rendered document includes capturing an image of text within the rendered document; and
   wherein generating a digest of the captured portion includes identifying characters of the text within the captured image.

8. The computer-readable medium of claim 6, wherein optically capturing an image of a text-based portion of the rendered document includes capturing an image of textual elements and non-textual elements within the rendered document; and
   wherein generating a digest of the captured portion includes identifying characters of the text within the captured image.

9. The computer-readable medium of claim 6, wherein optically capturing an image of a text-based portion of the rendered document includes capturing an image of at least a portion of an advertisement printed on the rendered document; and
   wherein locating a document identifier associated with an electronic counterpart includes identifying an advertiser associated with the advertisement within the captured image and identifying a document identifier of an electronic counterpart associated with the identified advertiser.

10. A system in a mobile device for retrieving a media presentation associated with a rendered document, the system comprising:
    a data capture subsystem that optically or acoustically captures a first human-readable text-based portion of a rendered document and a second human-readable text-based portion of a rendered document;
    a digest subsystem that generates a digest of the first captured portion based at least in part on content of the text of the captured portion;
    an identification subsystem that locates a document identifier associated with an electronic counterpart to the rendered document based at least in part on the digest of the first captured portion;
    an enhancement subsystem that:
      sends an enhancement package request including the document identifier to a media server; and
      receives from the media server an enhancement package associated with the document identifier, wherein the enhancement package includes multiple media presentations associated with multiple words of the rendered document, wherein each word of the multiple words is associated with a respective media presentation of the multiple media presentations;
    a location subsystem that locates within the enhancement package media associated with one or more words identified within the second captured portion; and
    a presentation subsystem that presents the identified.

11. The system of claim 10, wherein the data capture subsystem includes a camera or microphone of the mobile device.

12. The system of claim 10, wherein the presentation subsystem includes a display or speaker of the mobile device.

* * * * *